(12) United States Patent
Imai et al.

(10) Patent No.: US 8,320,828 B2
(45) Date of Patent: Nov. 27, 2012

(54) RADIO COMMUNICATION SYSTEM, RADIO COMMUNICATION APPARATUS, AND RETRANSMISSION CONTROL METHOD

(75) Inventors: Tomohiro Imai, Kanagawa (JP); Masayuki Hoshino, Kanagawa (JP); Yasuaki Yuda, Kanagawa (JP); Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 697 days.

(21) Appl. No.: 12/523,280

(22) PCT Filed: Jan. 25, 2008

(86) PCT No.: PCT/JP2008/051120
§ 371 (c)(1),
(2), (4) Date: Jul. 15, 2009

(87) PCT Pub. No.: WO2008/093619
PCT Pub. Date: Aug. 7, 2008

(65) Prior Publication Data
US 2010/0075703 A1 Mar. 25, 2010

(30) Foreign Application Priority Data

Jan. 29, 2007 (JP) .............................. P2007-017992
Apr. 11, 2007 (JP) .............................. P2007-103953

(51) Int. Cl.
*H04B 7/15* (2006.01)
(52) U.S. Cl. ................... 455/11.1; 455/7; 455/8; 455/9; 455/15; 455/22
(58) Field of Classification Search ................. 455/7–10, 455/15, 17, 19–21, 24, 25
See application file for complete search history.

(56) References Cited

U.S. PATENT DOCUMENTS
7,937,057 B2 5/2011 Kishigami et al.
(Continued)

FOREIGN PATENT DOCUMENTS
JP 2006-197403 A 7/2006
(Continued)

OTHER PUBLICATIONS
Samsung; 3GPP TSG RAN WG1 Meeting #45, "Dynamic Switching between Single and Multi-User MIMO", Shanghai, China, May 8-12, 2006.

(Continued)

*Primary Examiner* — Fayyaz Alam
(74) *Attorney, Agent, or Firm* — Pearne & Gordon LLP

(57) ABSTRACT

In a multiuser MIMO system, entire system throughput achieved during retransmission is significantly enhanced. When an interference signal addressed to another user equipment (UE2) 200b has been demodulated successfully, a user equipment (UE1) 200a holds the demodulated data pertaining to the interference signal, and feeds back ACK information about the UE2 and CQI information achieved after elimination of the interference signal to a radio base station (BS) 100. When the UE2 performs retransmission after ended in a receiving failure and when the UE1 has demodulated the interference signal addressed to the UE2 successfully, the BS changes the distribution of communication resources in such a way that communication resources for the UE2 become larger than those for the UE1. At the time of retransmission, the UE1 eliminates the interference signal from a newly-received signal by use of previously-held demodulated data pertaining to the interference signal, and the UE2 combines data pertaining to the desired signal held during previous receiving failure with data pertaining to the retransmitted signal by means of soft combining.

20 Claims, 33 Drawing Sheets

U.S. PATENT DOCUMENTS

| | | | |
|---|---|---|---|
| 2007/0066241 A1* | 3/2007 | Hart | 455/69 |
| 2008/0293371 A1 | 11/2008 | Kishigami et al. | |
| 2009/0268621 A1 | 10/2009 | Hoshino et al. | |

FOREIGN PATENT DOCUMENTS

| | | |
|---|---|---|
| JP | 2006-238423 A | 9/2006 |
| JP | 2007-129697 A | 5/2007 |
| WO | 2006/075453 A1 | 7/2006 |
| WO | 2006/080352 A1 | 8/2006 |
| WO | 2006/095829 A1 | 9/2006 |
| WO | 2006/129749 A1 | 12/2006 |

OTHER PUBLICATIONS

International Search Report for PCT/JP2008/051120.

* cited by examiner

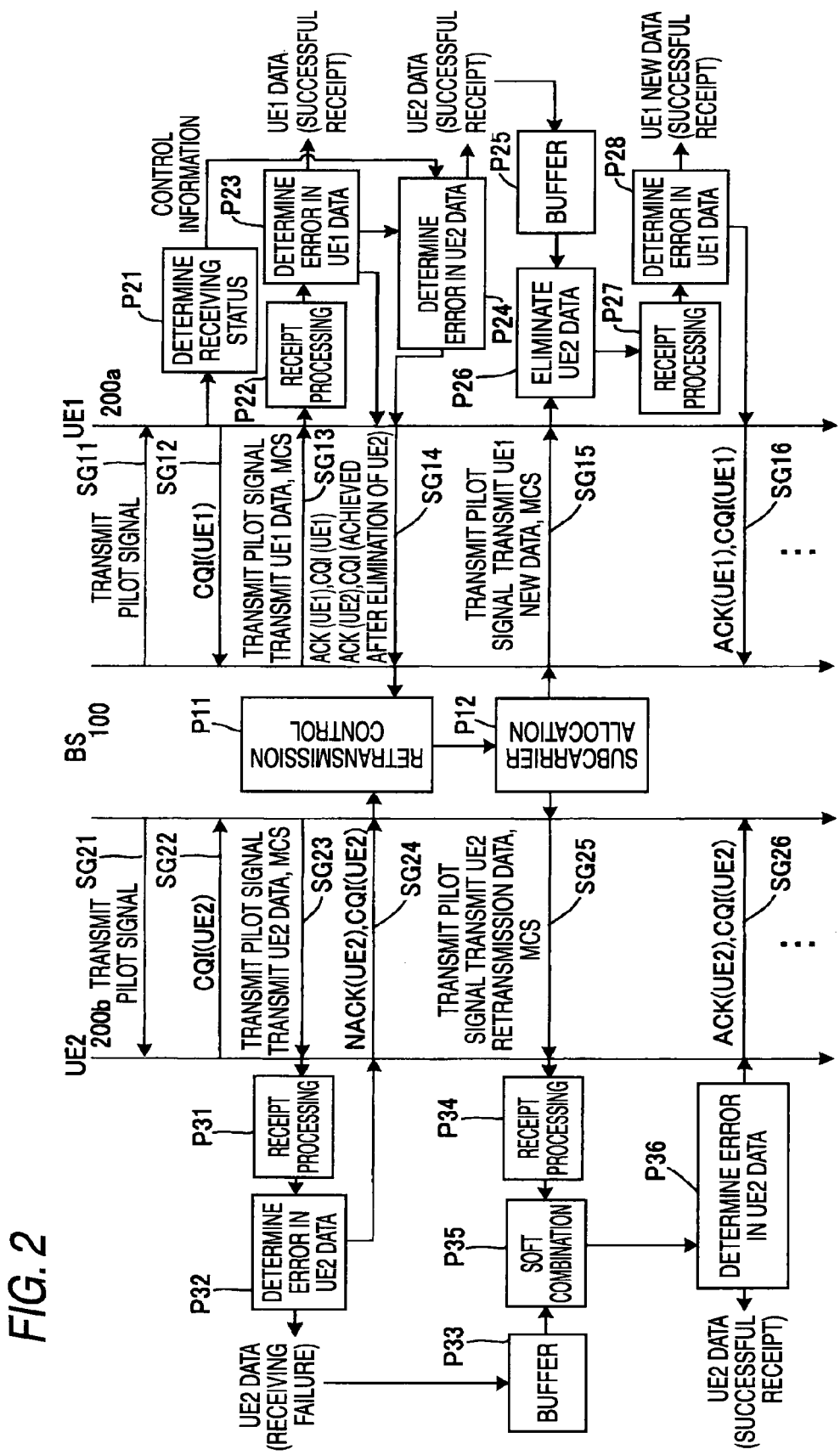

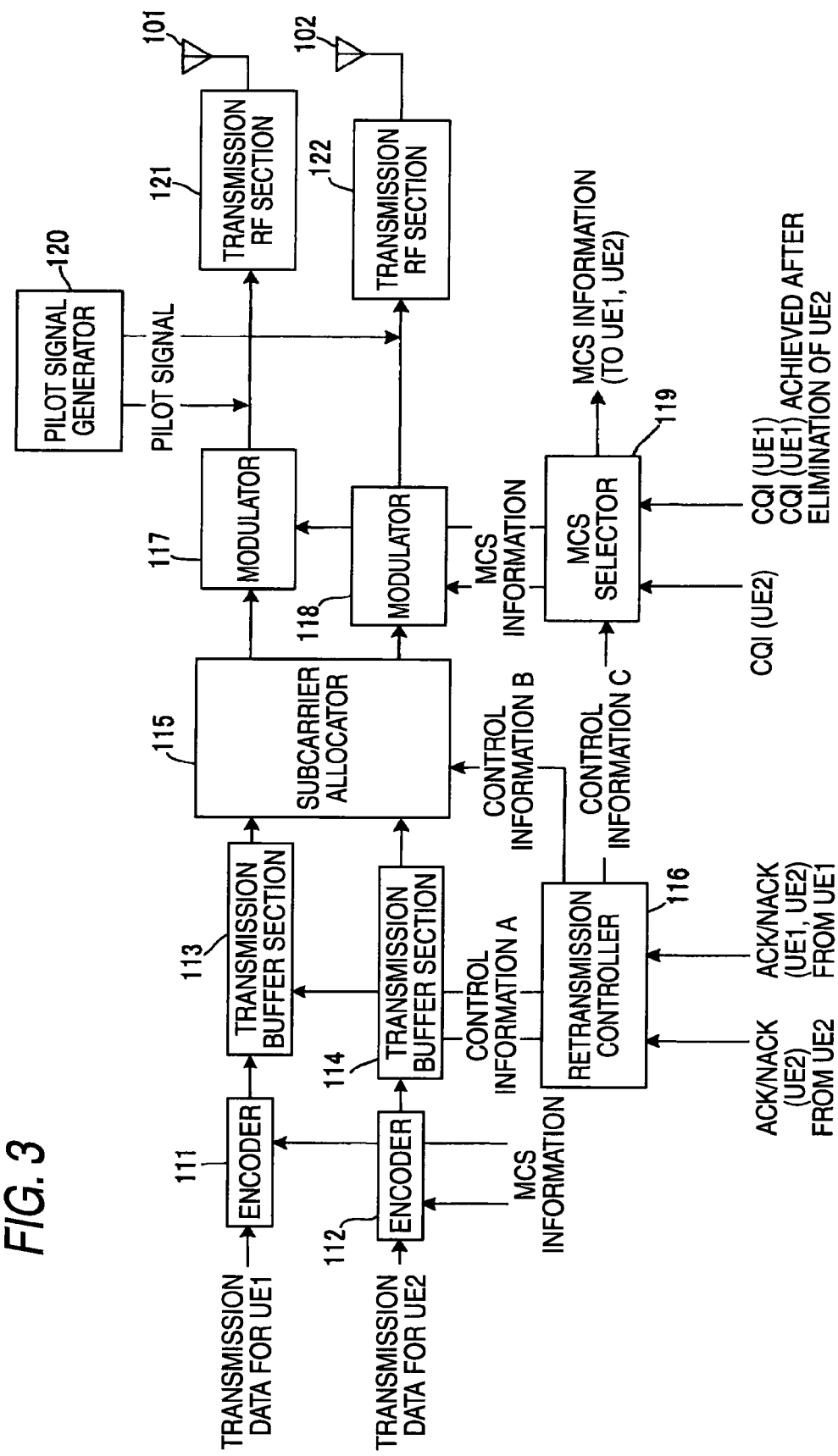

TRANSMISSION DATA FOR UE1

TRANSMISSION DATA FOR UE2

NEW TRANSMISSION DATA FOR UE1

RETRANSMISSION DATA FOR UE2

FIG. 6A
TRANSMISSION DATA FOR UE1

FIG. 6B
TRANSMISSION DATA FOR UE2

FIG. 6C
NEW TRANSMISSION DATA FOR UE1

FIG. 6D
RETRANSMISSION DATA FOR UE2

FIG. 10

| CONTROL INFORMATION | UE2: RETRANSMISSION | UE2: NEW TRANSMISSION |
|---|---|---|
| SELECT DESIRED STREAM | DESIRED STREAM OUTPUT FROM REPLICA CANCELLER PROCESSOR | DESIRED STREAM OUTPUT FROM SIGNAL SEPARATION PROCESSOR |

FIG. 11

| RECEIVING STATUS | RECEIVING SINR ASSUMES REFERENCE VALUE OR MORE | RECEIVING SINR ASSUMES VALUE THAT IS LESS THAN REFERENCE VALUE |
|---|---|---|
| CONTROL INFORMATION | PERFORM INTERFERENCE STREAM PROCESSING | DO NOT PERFORM INTERFERENCE STREAM PROCESSING |

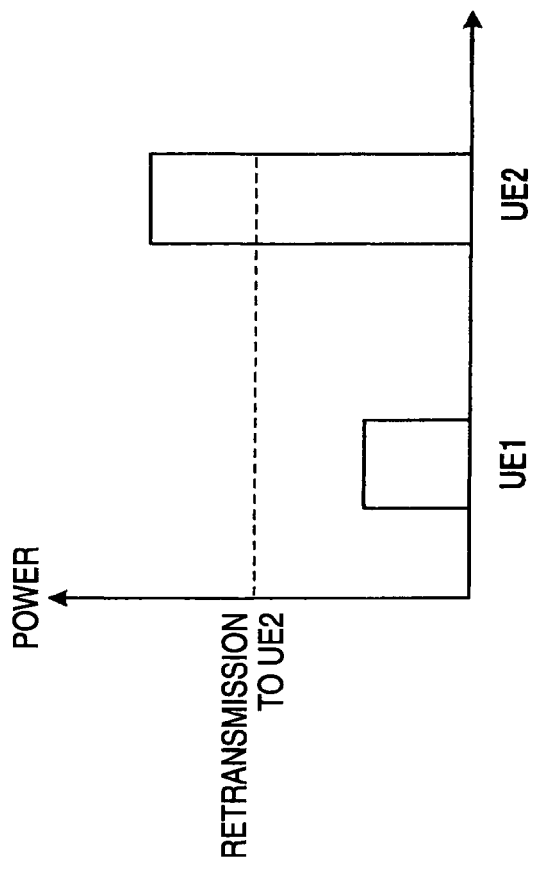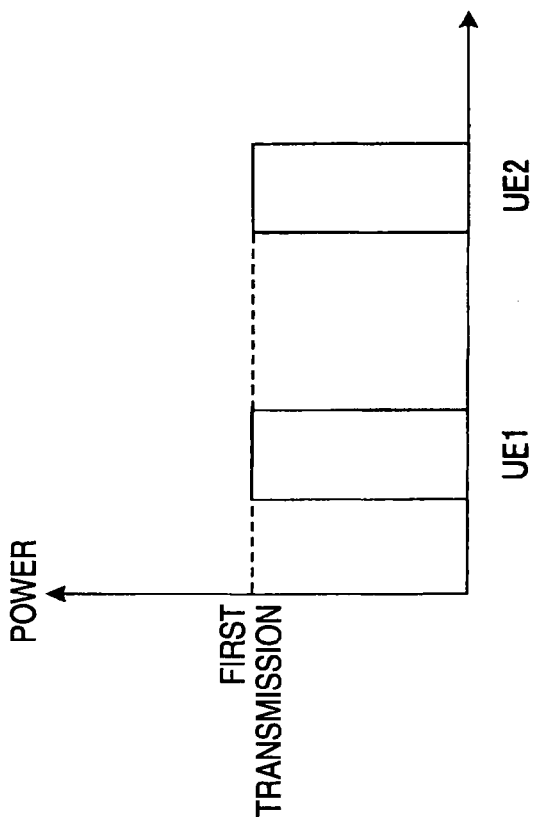

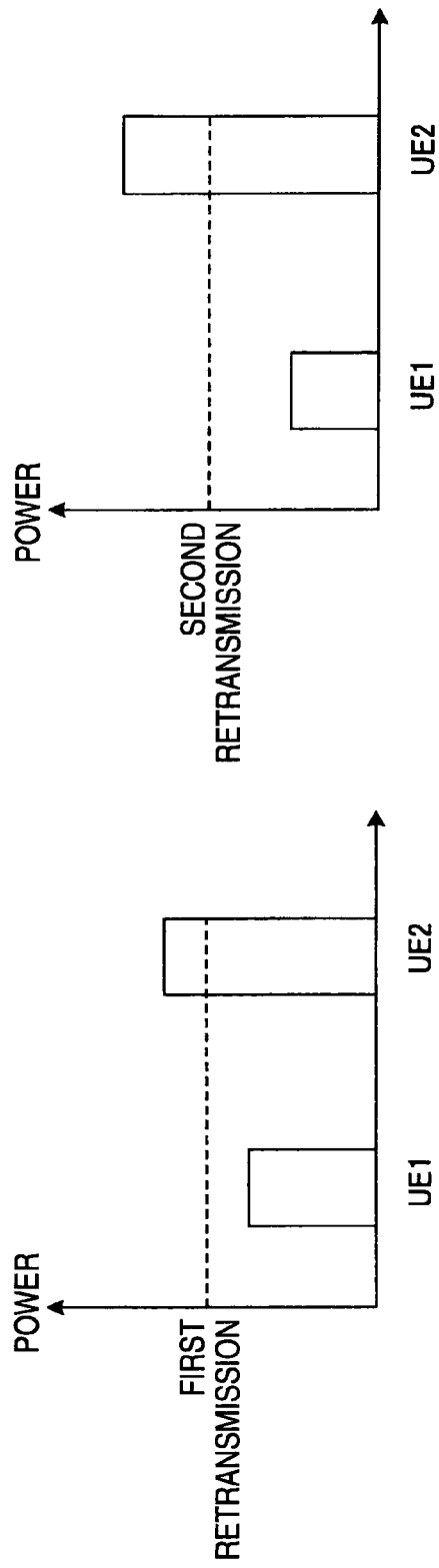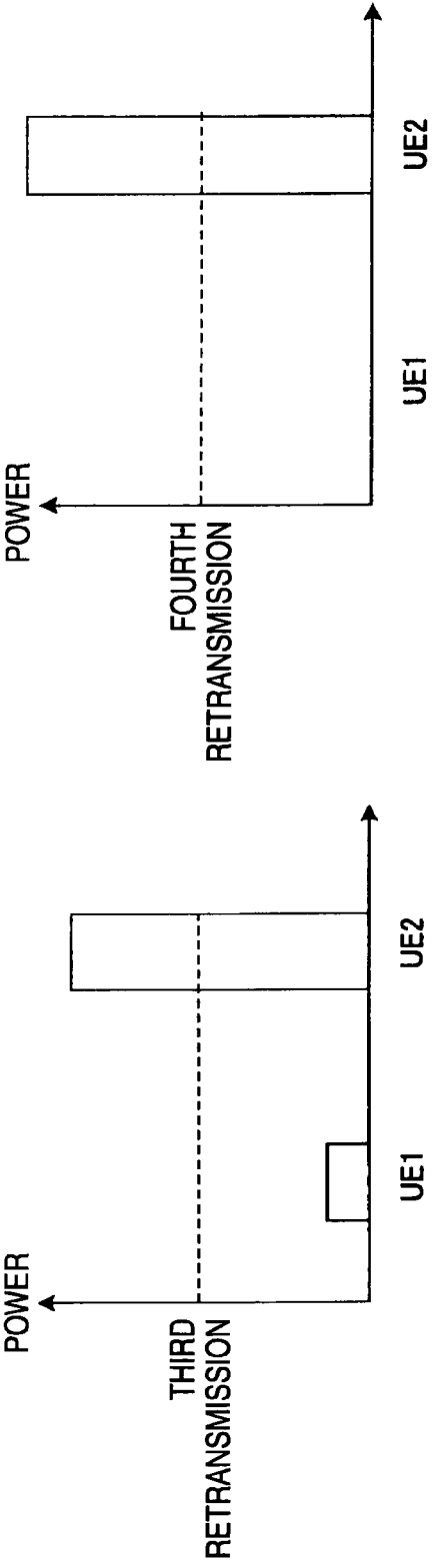

FIG. 21

| | RECEIVING STATUS OF UE1 | | RECEIVING STATUS OF UE2 | | CONTROL INFORMATION B | UE1 CQI | UE2 CQI |
|---|---|---|---|---|---|---|---|
| | DESIRED SIGNAL | INTERFERENCE SIGNAL | DESIRED SIGNAL | INTERFERENCE SIGNAL | | | |
| (1) | ACK | ACK | ACK | ACK | NO RESOURCE ALLOCATION | $CQI_{MMSE}$ | $CQI_{MMSE}$ |
| (2) | ACK | ACK | ACK | NACK | NO RESOURCE ALLOCATION | $CQI_{MMSE}$ | $CQI_{MMSE}$ |
| (3) | ACK | ACK | NACK | ACK | PERFORMANCE OF RESOURCE ALLOCATION | $CQI_{SIC}$ | $CQI_{MMSE}$ |
| (4) | ACK | ACK | NACK | NACK | PERFORMANCE OF RESOURCE ALLOCATION | $CQI_{SIC}$ | $CQI_{MMSE}$ |
| (5) | ACK | NACK | ACK | ACK | NO RESOURCE ALLOCATION | $CQI_{MMSE}$ | $CQI_{MMSE}$ |
| (6) | ACK | NACK | ACK | NACK | NO RESOURCE ALLOCATION | $CQI_{MMSE}$ | $CQI_{MMSE}$ |
| (7) | ACK | NACK | NACK | ACK | NO RESOURCE ALLOCATION | $CQI_{MMSE}$ | $CQI_{MMSE}$ |
| (8) | ACK | NACK | NACK | NACK | NO RESOURCE ALLOCATION | $CQI_{MMSE}$ | $CQI_{MMSE}$ |
| (9) | NACK | ACK | ACK | ACK | PERFORMANCE OF RESOURCE ALLOCATION | $CQI_{MMSE}$ | $CQI_{SIC}$ |
| (10) | NACK | ACK | ACK | NACK | NO RESOURCE ALLOCATION | $CQI_{MMSE}$ | $CQI_{MMSE}$ |
| (11) | NACK | ACK | NACK | ACK | PERFORMANCE OF RESOURCE ALLOCATION | $CQI_{SIC}$ | $CQI_{SIC}$ |
| (12) | NACK | ACK | NACK | NACK | PERFORMANCE OF RESOURCE ALLOCATION | $CQI_{SIC}$ | $CQI_{MMSE}$ |
| (13) | NACK | NACK | ACK | ACK | PERFORMANCE OF RESOURCE ALLOCATION | $CQI_{MMSE}$ | $CQI_{SIC}$ |
| (14) | NACK | NACK | ACK | NACK | NO RESOURCE ALLOCATION | $CQI_{MMSE}$ | $CQI_{MMSE}$ |
| (15) | NACK | NACK | NACK | ACK | PERFORMANCE OF RESOURCE ALLOCATION | $CQI_{MMSE}$ | $CQI_{SIC}$ |
| (16) | NACK | NACK | NACK | NACK | NO RESOURCE ALLOCATION | $CQI_{MMSE}$ | $CQI_{MMSE}$ |

TRANSMISSION DATA FOR UE
NOT HAVING RESOURCE PRIORITY

TRANSMISSION DATA FOR UE
HAVING RESOURCE PRIORITY

FIG. 34

| RANGE FOR EVALUATION EQUATION | INCREMENT/DECREMENT IN TRANSMISSION POWER FOR UE1 | INCREMENT/DECREMENT IN TRANSMISSION POWER FOR UE2 |
|---|---|---|
| $\rho < -10$ | 5dB | -5dB |
| $-10 \leq \rho < -3$ | 3dB | -3dB |
| $-3 \leq \rho \leq 3$ | 0 | 0 |
| $3 < \rho \leq 10$ | -3dB | 3dB |
| $10 < \rho$ | -5dB | 5dB |

RADIO COMMUNICATION SYSTEM, RADIO COMMUNICATION APPARATUS, AND RETRANSMISSION CONTROL METHOD

TECHNICAL FIELD

The present invention relates to a radio communication system, a radio communication apparatus, and a retransmission control method that can be applied to a radio communication system adopting MIMO (Multi-Input Multi-Output).

BACKGROUND ART

In a radio cellular system typified by a portable telephone, and the like, service patterns recently become diversified, transmission of large-volume data, such as stationary pictures and moving pictures, as well as transmission of audio data, are requested. 3.5G (HSDPA) terminals have come on a market for a portable telephone, and communication of download traffic speed 14 Mbps is possible.

Hybrid ARQ (hereinafter abbreviated as H-ARQ) is a technique newly introduced from 3.5G. This is a technique pertaining to retransmission control employed when information transmission has ended in a failure. A probability of successful reception achieved during retransmission is enhanced by use of the technique along with use of information about signals received in the past stored in a receiving end, and an improvement in throughput can be expected.

Cellular system standardization specifications of 3.5G (3GPP Long Term Evolution: hereinafter abbreviated as LTE) or a subsequent technique require a peak rate of 100 Mbps for download traffic, and introduction of a MIMO (Multi-Input Multi-Output) system utilizing a plurality of antennas is discussed as a technique for fulfilling the requirement. Use of single user MIMO (SU-MIMO) and multiuser MIMO (MU-MIMO) are discussed as a spatial multiplexing technique for use in the MIMO system.

Single user MIMO limits allocation of a spatial resource to a single user, and enhancement of a peak rate can be expected. In single user MIMO, user multiplexing is carried out in connection with a time axis or a frequency axis; hence, user interference does not occur in connection with a spatial axis. In the meantime, in connection with multiuser MIMO, the spatial resource is allocated to a plurality of users, whereby a multi-user diversity gain is acquired. Hence, enhancement of a sector (cell) throughput can be expected. In particular, when the radius of the cell is large, a throughput is greatly enhanced.

H-ARQ and multiuser MIMO are techniques that enable enhancement of a throughput in a harsh receiving environment, such as that achieved at a position close to the edge of a cell. The fact is that a retransmission control method in the multiuser MIMO system is not sufficiently discussed, and a high throughput is not always gained at all times.

FIGS. 35A and 35B show, as a related-art technique, the outline of a retransmission control method for use in the currently-discussed multiuser MIMO system. A related art of this type is disclosed in; for instance, Non-Patent Document 1. In FIG. 35, a multiuser MIMO system is assumed to have two antennas for a radio base station (BS: Base Station), two user equipments (UE: User Equipment); and two antennas for the respective user equipments (UE1, UE2). FIG. 35A shows first transmission, and FIG. 35B shows second transmission.

In the multiuser MIMO system, user equipments UE1, UE2 feed back one CQI (Channel Quality Indicator) to the radio base station. The radio base station BS assigns the user equipments (UE1, UE2) to the respective antennas in accordance with a feedback CQI, and a data stream is transmitted to the respective user equipments. The respective user equipments UE1, UE2 detect an error in the received data stream. When no error is found in control information, an ACK (Acknowledgement) signal is fed back to the radio base station BS. When an error is found, an NACK (Not Acknowledgement) signal is fed back to the same.

At this time, the user equipment which has fed back the NACK signal buffers (stores) the received signal in preparation for retransmission. The respective user equipment UE1, UE2 measure a receiving SINR (Signal-to-Interference plus Noise power Ratio: a signal-to-interference noise power ratio), and feed back the thus-measured SINR as a CQI to the radio base station BS. In the next transmission operation, when received an ACK signal in accordance with the control information (ACK/NACK) received from the respective user equipments, the radio base station transmits a new data stream. When received a NACK signal, the radio base station BS transmits a retransmission data stream. The user equipment to which retransmission data have been transmitted combines the past-received signal stored in the buffer with retransmission data by means of soft combining, whereby a probability of successful receipt is enhanced. Retransmission control is independently performed for each user equipment.

In the example shown in FIGS. 35A and 35B, the user equipment UE1 is assumed to feed back an ACK signal, and the user equipment UE2 is assumed to feed back a NACK signal. Therefore, new data are transmitted to the user equipment UE1 in the next transmission period, and retransmission data are transmitted to the user equipment UE2 in the next transmission period.

Non-Patent Document 1: 3GPP TSG RAN WG1 Meeting #45, R1-061323, Samsung, "Dynamic Switching between Single and Multi-User MIMO," 2006

DISCLOSURE OF THE INVENTION

Problem that the Invention is to Solve

In the multi-user MIMO system, each of the user equipments has a plurality of antennas, and interference, which would otherwise be caused by a signal addressed to another user, is suppressed by receiving signals of a plurality of channels. According to the retransmission control technique using H-ARQ, and the like, that is employed in the multi-user MIMO system, such as that mentioned above, an error may arise in receipt of a data stream because the user equipment is insufficiently prevented from interference from other users, and retransmission may be required. However, since interference from signals of other users still exists even when a data stream is transmitted by means of retransmission, an error will again occur in the receipt of a data stream if enhancement of the receiving SINR achieved by soft combining operation is insufficient. The number of retransmission operations increases. Consequently, there arises a problem of a decrease in entire system throughput.

The present invention has been conceived in light of the circumstance and aims at providing a radio communication system, a radio communication apparatus, and a retransmission control method that enable a multiuser MIMO system to significantly enhance entire system throughput achieved during retransmission.

Means for Solving the Problem

An aspect of the present invention provides a multiuser MIMO (Multi-Input Multi-Output) radio communication system that establishes communication with a plurality of radio receiving stations by use of a plurality of antennas, the system including:

a first radio communication apparatus that is to serve as a radio transmission station and that has: a retransmission controller which performs retransmission; and a communication resource setting section which sets distribution of communication resources to respective radio receiving stations in accordance with receiving statuses of the respective radio receiving stations when retransmission to at least one radio receiving station is performed and when the at least one radio receiving station has demodulated an interference signal addressed to the other radio receiving station successfully; and a second radio communication apparatus that is to serve as a radio receiving station and that has: an interference signal demodulator which demodulates an interference signal transmitted from the radio transmission station and addressed to the other station; an interference signal buffer section which holds demodulated data pertaining to the interference signal when the interference signal has been demodulated successfully, and an interference signal eliminator which eliminates the interference signal by use of the held and demodulated data pertaining to the interference signal when receiving a subsequent signal transmitted from the radio transmission station.

When at least one radio receiving station has successfully demodulated an interference signal addressed to another radio receiving station, communication resources can thereby be distributed in a more appropriate state by setting the distribution of communication resources to the respective radio receiving stations in accordance with receiving statuses of the respective radio receiving stations. The radio receiving station that has successfully demodulated the interference signal holds demodulated data pertaining to the interference signal and eliminates an interference signal at the time of receipt of the next signal by utilization of the thus-held, demodulated data pertaining to the interference signal, whereby a receiving SINR is enhanced. Therefore, the distribution of communication resources to the radio receiving station successfully received the interference signal can be reduced. For instance, the distribution of communication resources is set in such a way that the communication resources to the first radio receiving station successfully received a desired signal and an interference signal is reduced and that communication resources to the second radio receiving station, which performs retransmission after failed to receive a desired signal, become larger, thereby enhancing a probability that the second radio receiving station will successfully perform receiving by means of combination of the signal received through retransmission by soft combining. Accordingly, the number of retransmission operations can be reduced, and entire system throughput can be significantly enhanced.

An aspect of the present invention provides a multiuser MIMO (Multi-Input Multi-Output) radio communication system that establishes communication with a plurality of radio receiving stations by use of a plurality of antennas, the system including:

a first radio communication apparatus that is to serve as a radio transmission station and that has: a retransmission controller which performs retransmission; and a communication resource setting section which, when retransmission to at least one radio receiving station is performed and when another first radio receiving station has successfully demodulated an interference signal addressed to a second radio receiving station to which retransmission is performed, sets distribution of communication resources to respective radio receiving stations in such a way that communication resources for the second radio receiving station become larger than those for the first radio receiving station;

a second radio communication apparatus that is to serve as the first radio receiving station and that has: an interference signal demodulator which demodulates an interference signal transmitted from the radio transmission station and addressed to the other station; an interference signal buffer section which holds demodulated data pertaining to the interference signal when the interference signal has been demodulated successfully; and an interference signal eliminator which eliminates the interference signal by use of the held and demodulated data pertaining to the interference signal when receiving a subsequent signal transmitted from the radio transmission station; and a third radio communication apparatus that is to serve as the second radio receiving station and that has: a desired signal buffer section which, when an error is in a result of receipt of a desired signal addressed to the own station and transmitted from the radio transmission station, holds data pertaining to the desired signal; and a soft combiner which, when receiving a signal retransmitted from the radio transmission station, combines the held data pertaining to the desired signal with data pertaining to the retransmitted signal by means of soft combining.

As a result, when the first radio receiving station demodulates an interference signal along with a desired signal addressed to the own station and can also demodulate the interference signal, demodulated data pertaining to the interference signal are held, and the interference signal is eliminated at the time of receipt of the next signal by utilization of the thus-held, demodulated data pertaining to the interference signal, whereby a receiving SINR of the first radio receiving station is enhanced. Therefore, the distribution of communication resources to the first radio receiving station can be reduced. Accordingly, the radio transmission station can distribute communication resources in a more appropriate state by setting the distribution of communication resources in such a way that communication resources for the first radio receiving station are decreased and that communication resources for the second radio receiving station that performs retransmission become larger. By means of combination of signals received during retransmission by soft combining, the probability that the second radio receiving station will attain successful receipt is increased, and hence the number of retransmission operations can be reduced. Entire system throughput can thereby be significantly enhanced.

An aspect of the invention provides a radio communication apparatus used in a multiuser MIMO (Multi-Input Multi-Output) radio communication system that establishes communication with a plurality of radio receiving stations by use of a plurality of antennas, the apparatus including: a retransmission controller that performs retransmission; and a communication resource setting section that sets distribution of communication resources to respective radio receiving stations in accordance with receiving statuses of the respective radio receiving stations when retransmission to at least one radio receiving station is performed and when the at least one radio receiving station has demodulated an interference signal addressed to the other radio receiving station successfully.

As a result, in a case where at least one radio receiving station has successfully demodulated an interference signal addressed to another radio receiving station when retransmission is performed, communication resources can be distributed in an appropriate state according to the statues of the radio receiving stations in the communication system by setting the distribution of communication resources to the respective radio receiving stations in accordance with the receiving statuses of the respective radio receiving stations. Therefore, entire system throughput achieved during retransmission can be significantly enhanced.

Further, the present invention may include the above-mentioned radio communication apparatus wherein the communication resource setting section sets the distribution of communication resources in accordance with feedback information from the radio receiving station, the feedback information including, as receiving statuses of the respective radio receiving stations, information showing whether or not a desired signal addressed to the own station and an interference signal addressed to another station are successfully received and information showing receiving quality of the desired signal for the radio receiving station or receiving quality of the desired signal for the radio receiving station after elimination of the interference signal.

As a result, communication resources can be appropriately distributed in accordance with successful/unsuccessful receipt of a desired signal and an interference signal and receiving quality of the radio receiving stations.

Further, the present invention may include the above-mentioned radio communication apparatus wherein, when retransmission to at least one radio receiving station is performed and when at least one first radio receiving station which has successfully demodulated a desired signal successfully demodulates an interference signal addressed to the second radio receiving station to which retransmission is performed, the communication resource setting section sets the distribution of communication resources to the radio receiving stations in such a way that the communication resources for the second radio receiving station become larger than those for the first radio receiving station.

As a result, in a case where the first radio receiving station has successfully demodulated the interference signal addressed to the second radio receiving station to which retransmission is performed when retransmission is performed, the distribution of communication resources is set predominantly for the radio receiving station to which the retransmission is performed, in such a way that communication resources to the second radio receiving station become larger than those for the first radio receiving station, whereby communication resources can be distributed as appropriate in accordance with the statuses of the radio receiving stations within the communication system.

Further, the present invention may include the above-mentioned radio communication apparatus wherein, when retransmission to at least one radio receiving station is performed and when a plurality of radio receiving stations which have failed to demodulate desired signals have successfully demodulated an interference signal addressed to other radio receiving station, the communication resource setting section compares receiving qualities for the radio receiving stations at the time of elimination of the interference signals and sets the distribution of communication resources to the second radio receiving station exhibiting poor receiving quality in preference to the first radio receiving station exhibiting superior receiving quality.

As a result, in a case where a plurality of radio receiving stations incapable of demodulating desired signals has successfully demodulated an interference signal addressed to another radio receiving station when retransmission is performed, the distribution of communication resources for the radio receiving stations is set in such a way that communication resources are distributed to the second radio receiving station exhibiting poor receiving quality in preference to the first radio receiving station exhibiting superior receiving quality, whereby the communication resources can be distributed in an appropriate manner in accordance with the states of the radio receiving stations in the communication system.

Further, the present invention may include the above-mentioned radio communication apparatus including a retransmission information notification section that, when information showing unsuccessful receipt of a desired signal to the own station is received from at least one radio receiving station, notifies respective radio receiving stations of retransmission information about performance of retransmission.

As a result, it becomes possible for the respective radio receiving stations to determine whether to perform receipt processing for eliminating an interference signal in accordance with retransmission information. Therefore, adaptive receipt processing conforming to the receiving statuses of the respective radio receiving stations can be performed.

An aspect of the present invention provides a radio communication apparatus used in a multiuser MIMO (Multi-Input Multi-Output) radio communication system that establishes communication with a plurality of radio receiving stations by use of a plurality of antennas, the apparatus including: a retransmission controller that performs retransmission; and a communication resource setting section that, when retransmission to at least one radio receiving station is performed and when another first radio receiving station has successfully demodulated an interference signal addressed to a second radio receiving station to which retransmission is performed, sets distribution of communication resources to respective radio receiving stations in such a way that communication resources for the second radio receiving station become larger than those for the first radio receiving station.

As a result, when the first radio receiving station has successfully demodulated an interference signal addressed to the second radio receiving station, to which retransmission is performed, when retransmission is performed, distribution of communication resources is set predominantly to the radio receiving station to which the retransmission is performed, in such a way that communication resources for the second radio receiving station become larger than those for the first radio receiving station, whereby the communication resources can be distributed in an appropriate state in accordance with the receiving statuses of the respective radio receiving stations. Therefore, entire system throughput achieved during retransmission can be significantly enhanced.

Further, the present invention may include the above-mentioned radio communication apparatus, wherein the communication resource setting section distributes the communication resources in accordance with information showing receiving quality at the time of elimination of the interference signal for the first radio receiving station that has successfully demodulated an interference signal addressed to the second radio receiving station.

As a result, both the first radio receiving station that has successfully demodulated an interference signal and the second radio receiving station to which retransmission is performed can distribute communication resources more appropriately. For instance, when receiving quality of the radio receiving station that has successfully demodulated an interference signal exhibits a predetermined level of superiority or higher, communication resources can be distributed according to the receiving quality, whereby entire system throughput achieved during retransmission can be enhanced more appropriately.

Further, the present invention may include the above-mentioned radio communication apparatus, wherein, when multicarrier signals are used as signals addressed to the plurality of radio receiving stations, the communication resource setting section changes allocation of subcarriers of the multicarrier signals as the distribution of the communication resources.

As a result, when communication is performed by use of a multicarrier signal; for instance, an OFDM signal, the number of subcarriers used for the radio receiving stations that has successfully demodulated interference signals, for instance, is reduced by assigning null to some of the plurality of subcarriers, whereby large communication resources can be distributed to the radio receiving station that performs retransmission.

Further, the present invention may include the above-mentioned radio communication apparatus, wherein the communication resource setting section changes allocation of transmission power for signals addressed to the plurality of radio receiving stations as the distribution of the communication resources.

As a result, for instance, transmission power for the radio receiving station that has successfully demodulated an interference signal, is reduced, and transmission power for the radio receiving station that performs retransmission is increased, whereby large communication resources can be distributed to the radio receiving station that performs retransmission.

An aspect of the present invention provides a radio communication apparatus used in a multiuser MIMO (Multi-Input Multi-Output) radio communication system that establishes communication with a plurality of radio receiving stations by use of a plurality of antennas, the apparatus including: an interference signal demodulator that demodulates an interference signal transmitted from a radio transmission station and addressed to another station; an interference signal buffer section that holds demodulated data pertaining to the interference signal when the interference signal has been demodulated successfully; and an interference signal eliminator that eliminates the interference signal by use of the held and demodulated data pertaining to the interference signal when receiving a subsequent signal transmitted from the radio transmission station.

As a result, when an interference signal addressed to another station as well as a desired signal addressed to the own station can also be demodulated, demodulated data pertaining to the interference signal are held, and an interference signal is eliminated at the time of receipt of the next signal, by utilization of the thus-held, demodulated data pertaining to the interference signal, whereby a receiving SINR achieved while retransmission to the other radio receiving station is being performed can be enhanced. Therefore, the radio transmission station can distribute communication resources during retransmission in such a way that the distribution of communication resources to the radio receiving station is reduced and that communication resources to the other radio receiving station that performs retransmission become larger. Thus, the receiving SINR of the other radio receiving station can be enhanced. The number of retransmission can be thereby reduced, and hence entire system throughput can be significantly enhanced.

Further, the present invention may include the above-mentioned radio communication apparatus including a receiving status response section that feeds back to the radio transmission station information showing successful/unsuccessful receipt of a desired signal transmitted from the radio transmission station and addressed to the own station, information showing receiving quality of the desired signal, information showing successful/unsuccessful receipt of the interference signal addressed to another station, and information showing receiving quality achieved when the interference signal is eliminated.

As a result, the radio transmission station can appropriately distribute communication resources by use of information about successful/unsuccessful receipt of a desired signal and an interference signal and information about receiving quality. Therefore, the amount of interference arising among the radio receiving stations can be reduced at the time of the next transmission, such as retransmission, and a receiving SINR can be enhanced.

Further, the present invention may include the above-mentioned radio communication apparatus including a retransmission information receiver that receives information retransmitted by the radio transmission station to the other radio receiving station, wherein the interference signal eliminator performs receipt processing for eliminating the interference signal by use of demodulated data pertaining to the interference signal held in the interference signal buffer section when transmission to the other radio receiver is retransmission.

As a result, a receiving SINR achieved during retransmission can be greatly enhanced, and a data rate is not reduced even when the distribution of communication resources to the radio communication apparatus is reduced. Entire system throughput can be enhanced by increasing the distribution of communication resources to the other radio communication apparatus that performs retransmission.

Further, the present invention may include the above-mentioned radio communication apparatus including a desired signal buffer section that, when an error is in a result of receipt of a desired signal addressed to the own station and transmitted from the radio transmission station, holds data pertaining to the desired signal, and a soft combiner that, when receiving a signal retransmitted from the radio transmission station, combines the held data pertaining to the desired signal with data pertaining to the retransmitted signal by means of soft combining.

As a result, it is possible to enhance the probability of successful receipt by combining data pertaining to a desired signal held in a buffer section with data pertaining to a retransmitted signal by means of soft combining during retransmission.

Further, the present invention may include the above-mentioned radio communication apparatus including an interference signal information response section that, when the interference signal addressed to the other radio receiving station has been demodulated successfully, feeds back to the radio transmission station information showing successful receipt of the interference signal and information showing receiving quality achieved when the interference signal is eliminated.

As a result, information showing successful receipt of an interference signal and information showing receiving quality achieved after elimination of the interference signal are fed back to the radio transmission station. Thereby, the radio transmission station can appropriately distribute communication resources in accordance with information showing receiving quality achieved by the radio receiving station at the time of elimination of the interference signal.

Further, the present invention may include the above-mentioned radio communication apparatus including a receiving status determiner that determines a receiving status of a desired signal addressed to the own station, wherein the interference signal buffer section and the interference signal information response section performs operations, respectively, only when the receiving status is a predetermined threshold value or more.

As a result, demodulation of the interference signal, or the like, is performed only when the receiving status of the own station is superior; hence, the probability of occurrence of a receiving failure can be reduced while processing for demodulating an interference signal is performed. Further, the radio communication apparatus can prevent occurrence of excessive computing operation.

Further, the present invention may include the above-mentioned radio communication apparatus including a retransmission information receiver that receives retransmission information from the radio transmission station to another radio receiving station, wherein the interference signal buffer section and the interference signal information response section performs operations, respectively, only when received information whose retransmission is required by the other radio receiving station.

As a result, demodulation of the interference signal, and the like, is performed only when the other radio receiving station requires retransmission; hence, the probability of occurrence of a receiving failure can be reduced while processing for demodulating an interference signal is performed. Further, the radio communication apparatus can prevent occurrence of excessive computing operation. Unwanted information fed back to the radio transmission station can also be curtailed.

Further, an aspect of the present invention provides a radio communication base station equipped with any one of the above-mentioned radio communication apparatus.

Further, an aspect of the present invention provides a radio communication mobile station equipped with any one of the above-mentioned radio communication apparatus.

An aspect of the present invention provides a retransmission control method for use in a multiuser MIMO (Multi-Input Multi-Output) radio communication system that establishes communication with a plurality of radio receiving stations by use of a plurality of antennas, the method including: a retransmission control step for performing retransmission; a communication resource setting step for setting distribution of communication resources to respective radio receiving stations in accordance with receiving statuses of the respective radio receiving stations when retransmission to at least one radio receiving station is performed and when the at least one radio receiving station has demodulated an interference signal addressed to the other radio receiving station successfully; an interference signal demodulation step for demodulating an interference signal transmitted from the radio transmission station and addressed to the other station; an interference signal buffer step for holding demodulated data pertaining to the interference signal when the interference signal has been demodulated successfully; and an interference signal elimination step for eliminating the interference signal by use of the held and demodulated data pertaining to the interference signal when receiving a subsequent signal transmitted from the radio transmission station.

An aspect of the present invention provides a retransmission control method for use in a radio communication apparatus used in a multiuser MIMO (Multi-Input Multi-Output) radio communication system that establishes communication with a plurality of radio receiving stations by use of a plurality of antennas, the method including: a retransmission control step for performing retransmission; and a communication resource setting step for setting distribution of communication resources to respective radio receiving stations in accordance with receiving statuses of the respective radio receiving stations when retransmission to at least one radio receiving station is performed and when the at least one radio receiving station has successfully demodulated an interference signal addressed to the other radio receiving station.

An aspect of the present invention provides a retransmission control method for use in a multiuser MIMO (Multi-Input Multi-Output) radio communication system that establishes communication with a plurality of radio receiving stations by use of a plurality of antennas, the method including: a retransmission control step for performing retransmission; a communication resource setting step for, when retransmission to at least one radio receiving station is performed and when another first radio receiving station has successfully demodulated an interference signal addressed to a second radio receiving station to which retransmission is performed, setting distribution of communication resources to respective radio receiving stations in such a way that communication resources for the second radio receiving station become larger than those for the first radio receiving station; an interference signal demodulation step for demodulating an interference signal transmitted from the radio transmission station and addressed to the other station; an interference signal buffer step for holding demodulated data pertaining to the interference signal when the interference signal has been demodulated successfully; an interference signal elimination step for eliminating the interference signal by use of the held and demodulated data pertaining to the interference signal when receiving a subsequent signal transmitted from the radio transmission station; a desired signal buffer step for, when an error is in a result of receipt of a desired signal addressed to the own station and transmitted from the radio transmission station, holding data pertaining to the desired signal; and a soft combination step for, when receiving a signal retransmitted from the radio transmission station, combining the held data pertaining to the desired signal with data pertaining to the retransmitted signal by means of soft combining.

An aspect of the present invention provides a retransmission control method for use in a radio communication apparatus used in a multiuser MIMO (Multi-Input Multi-Output) radio communication system that establishes communication with a plurality of radio receiving stations by use of a plurality of antennas, the method including: a retransmission control step for performing retransmission; and a communication resource setting step for, when retransmission to at least one radio receiving station is performed and when another first radio receiving station has successfully demodulated an interference signal addressed to a second radio receiving station to which retransmission is performed, setting distribution of communication resources to respective radio receiving stations in such a way that communication resources for the second radio receiving station become larger than those for the first radio receiving station.

ADVANTAGE OF THE INVENTION

According to the present invention, there can be provided a radio communication system, a radio communication apparatus, and a retransmission control method that enable significant enhancement of an overall system throughput of a multi-user MIMO system during retransmission.

BRIEF DESCRIPTION OF THE DRAWINGS

FIG. 2 is a sequence diagram showing principal operation sequence of the multi-user radio communication system of the first embodiment of the present invention.

FIG. 3 is a block diagram showing an example configuration of the principal section of a radio base station in the multi-user radio communication system of the first embodiment.

FIGS. 6A to 6D are schematic diagrams showing another example allocation of a subcarrier pertaining to a transmission signal employed during retransmission in the radio base station of the first embodiment.

FIG. 10 is a view showing a correspondence between control information and a desired stream as a selection standard of a desired stream selector.

FIG. 11 is a view showing a relationship between a receiving status and control information as a determination result made by a receiving status determiner.

FIGS. 15A and 15B are schematic diagrams showing example allocation of transmission power in the radio base station of the second embodiment.

FIGS. 16A to 16D are schematic diagrams showing another example allocation of transmission power for the case of retransmission in the radio base station of the second embodiment.

FIG. 21 shows a relationship between control information B pertaining to allocation of a subcarrier output from a retransmission controller in accordance with a receiving status of each user equipment and a CQI generated by each user equipment in the third and fourth embodiments of the present invention.

FIG. 34 is a view showing specific example transmission power control of the sixth embodiment.

DESCRIPTION OF THE REFERENCE NUMERALS AND SYMBOLS

100, 100A, 100B, 100C, 100D, 100E RADIO BASE STATION
101, 102 ANTENNA
111, 112 ENCODER
113, 114 TRANSMISSION BUFFER SECTION
115, 115B SUBCARRIER ALLOCATOR
116, 116B RETRANSMISSION CONTROLLER
117, 118 MODULATOR
119 MCS SELECTOR
120 PILOT GENERATOR
121, 122 TRANSMISSION RF SECTION
130, 130B POWER CONTROLLER
200a, 200b, 200c, 200d USER EQUIPMENT
201, 202 ANTENNA
211, 212 RECEIVING RF SECTION
213 CHANNEL ESTIMATOR
214 MIMO SEPARATION PROCESSOR
215, 215B CQI CALCULATOR

216 RECEIVING STATUS DETERMINER
217, 217B INTERFERENCE STREAM PROCESSOR
218 RECEIVING BUFFER SECTION
219 SOFT COMBINER
220 DEMODULATOR
221 ERROR DETERMINER
222 DECODER
251, 251B INTERFERENCE STREAM DEMODULATOR
252 ERROR DETERMINER
253, 253B INTERFERENCE STREAM RECEIVING BUFFER SECTION
254 DECODER
255 ENCODER
256 INTERFERENCE STREAM MODULATOR
261 SIGNAL SEPARATION PROCESSOR
262 REPLICA CANCELLER PROCESSOR
263 INTERFERENCE STREAM RETRANSMISSION DETERMINER
264 DESIRED STREAM SELECTOR
271 INTERFERENCE ELIMINATOR
272 MMSE RECEIPT PROCESSOR

BEST MODES FOR CARRYING OUT THE INVENTION

Present embodiments show example configurations achieved when a radio communication system, which adopts multiuser MIMO (MU-MIMO) for establishing communication between one radio communication station and a plurality of radio receivers and which serves as an example of a radio communication system, an example of a radio communication apparatus, and an example of a retransmission control method of the present invention, performs retransmission control. The following embodiments are examples for illustration, and the present invention is not limited to the embodiments.

First Embodiment

Figure 1A:
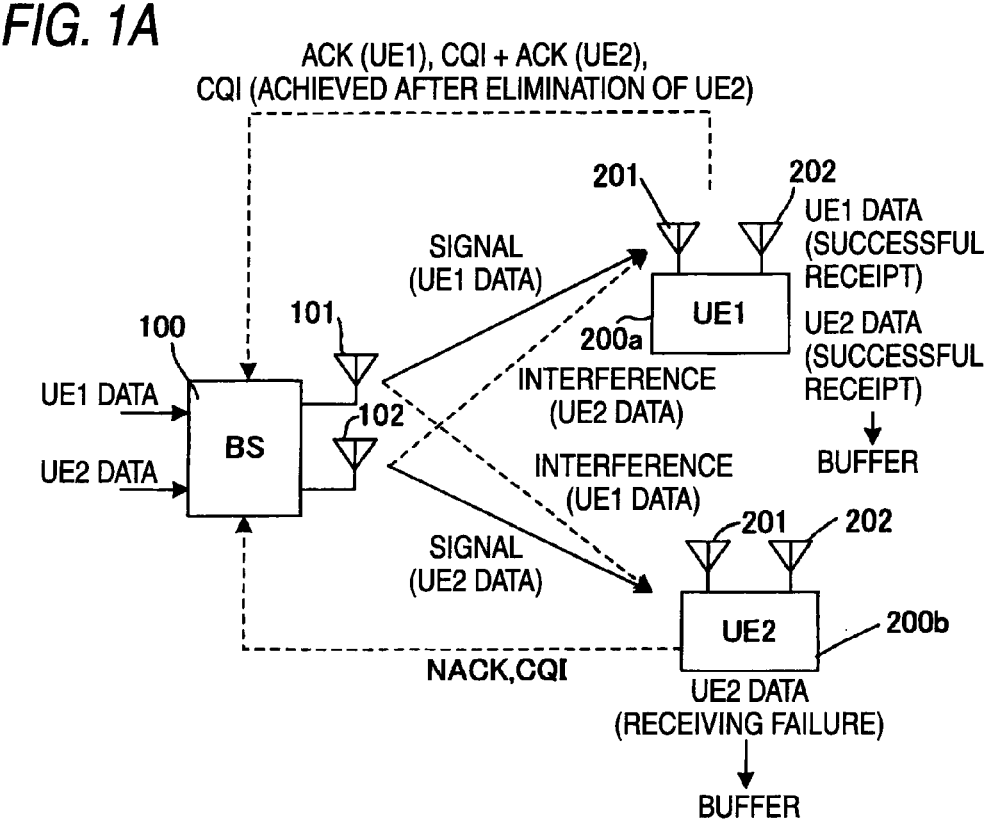
FIGS. 1A and 1B are block diagrams showing general configuration and operation of a multi-user radio communication system of a first embodiment of the present invention.
Figure 1B:
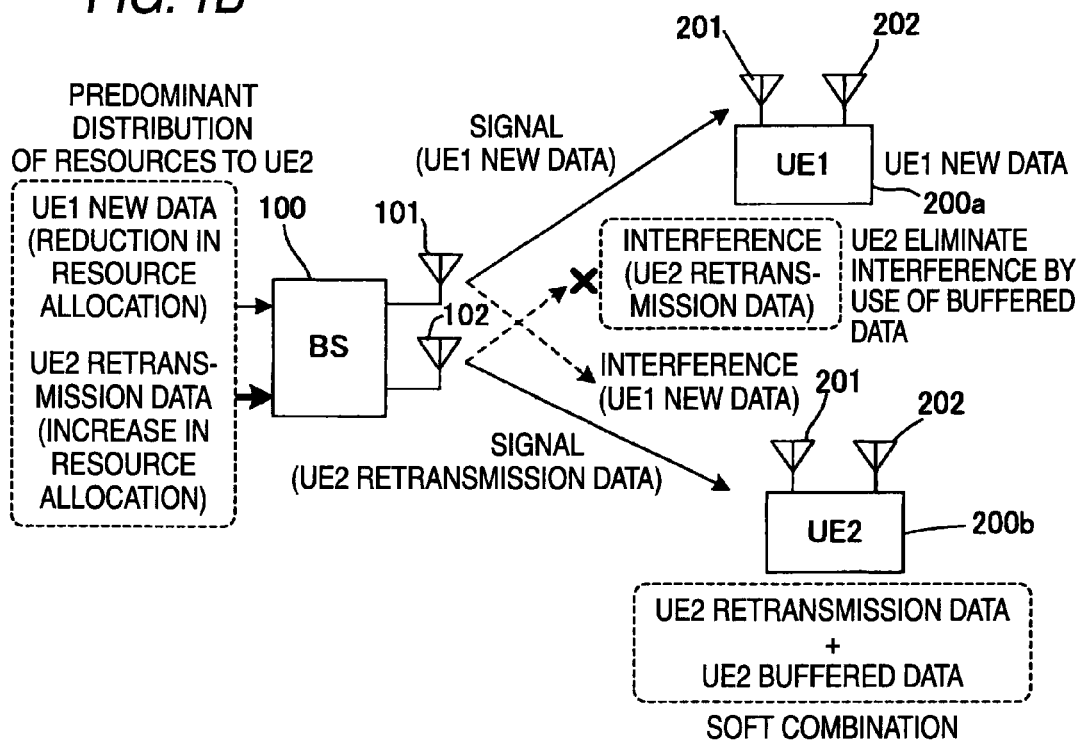

FIGS. 1A and 1B are block diagrams showing a schematic configuration and operation of a multiuser radio communication system of a first embodiment of the present invention.

The first embodiment is based on the assumption that the present invention is applied to a multiuser radio communication system configured as shown in FIGS. 1A and 1B. Specifically, the system is a MIMO (Multi-Input Multi-Output) communication system built from one radio base station (radio communication base station equipment: BS) 100 serving as a radio transmission station with two independent antennas 101 and 102; and two user equipments (radio communication mobile station devices: UE1 and UE2) 200a and 200b that respectively have antennas 201 and 202 and that receive signals separately transmitted on per-user basis.

The radio base station 100 transmits a signal addressed to one user equipment (the first radio receiving station, UE1) 200a from the antenna 101, as well as transmitting from the antenna 102 a signal addressed to the other user equipment (the second radio receiving station, UE2) 200b. In short, the radio base station 100 simultaneously handles transmission signals for a plurality of users. Data to be transmitted are based on the supposition of a data stream made up of packets that consecutively appear in time sequence.

At this time, the radio base station 100 simultaneously transmits a signal addressed to the user equipment (UE1) 200a and a signal addressed to the user equipment (UE2) 200b in a sequential manner on a per-packet basis by use of a common radio frequency band by using a multicarrier signal, such as an OFDM (Orthogonal Frequency Division Multiplexing) signal, for a signal to be transmitted as a radio signal. FIG. 1A shows first transmission, and FIG. 1B shows retransmission.

Since such a radio communication system uses a single radio frequency band, interference occurs between simultaneously-transmitted signals. For instance, as shown in FIG. 1A, the signal transmitted from the radio base station 100 to the user equipment (UE1) 200a is received as a desired signal by the user equipment (UE1) 200a but as an interference signal by the user equipment (UE2) 200b. Concurrently, the signal transmitted to the user equipment (UE2) 200b from the radio base station 100 is received as a desired signal by the user equipment (UE2) 200b but as an interference signal by the user equipment (UE1) 200a.

Under the influence of interference between such a desired signal and a signal addressed to another station, each of the user equipments 200a, 200b may have an error in a receipt result of a desired signal and fail to receive the signal. When receipt of the desired signal has ended in a failure, the user equipment which has failed in receipt makes a response by transmitting a control signal NACK (Not Acknowledgement) to the radio base station 100. In response to the NACK, the radio base station 100 retransmits the same signal. At the time of retransmission, the desired signal received in the past by the user equipment as known in the related art and a desired signal received through retransmission are combined by means of soft combining, whereby a receiving SINR of the user equipment 200 is enhanced to some extent. However, even when the same signal is retransmitted, a signal addressed to another station is simultaneously transmitted from the radio base station 100. Hence, when interference again occurs even at the time of retransmission and when the receiving status of the user equipment is not greatly enhanced, receipt of the desired signal may again end in a failure.

Accordingly, the multiuser radio communication system of the present embodiment implements retransmission control for effecting retransmission while adjusting distribution of resources between user equipments, such as that will be described below. The respective user equipments (UE1, UE2) 200a, 200b subject an interference signal as well as a desired signal to receipt processing and error determination. When the interference signal is successfully received, the following processing will further be performed. Specifically, the user equipment 200 provides the radio base station 100 with, through feedback, control information showing successful receipt of an interference signal; namely, a signal addressed to another station, and information (CQI: Channel Quality Indicator) representing receiving quality of a desired signal achieved at the time of removal of the interference signal; demodulates data pertaining to a received interference signal; and stores a demodulation result of the data into a predetermined buffer.

For instance, it is assumed that the user equipment (UE1) 200a in a superior receiving status could have properly received an interference signal addressed to the user equipment (UE2) 200b as well as the desired signal through first transmission shown in FIG. 1A. In this case, when the same interference signal appears at the timing of second transmission (or retransmission) shown in FIG. 1B, the user equipment 200a can eliminate the interference signal by use of stored data pertaining to interference signals of the past; hence, the receiving SINR of the user equipment 200a is significantly improved. Specifically, the user equipment 200a becomes able to have much leeway in terms of receiving capability during retransmission.

By utilization of the situations, the user equipment 200*a* exhibiting a superior receiving status provides the radio base station 100 with a notification that an interference signal can have been properly received as well, as shown in FIG. 1B. When perceived a necessity for retransmitting a signal to the other user equipment (UE2) 200*b*, the radio base station changes allocation of communication resources to the respective user equipments (UE1, UE2) 200*a*, 200*b* in accordance with the degree of leeway of the user equipment 200*a*. At this time, communication resources are allocated predominantly to the user equipment (UE2) 200*b* that requires retransmission due to failure to receive a desired signal. The first embodiment shows, by way of example modification in communication resource allocation, a case where allocation (scheduling) of subcarriers used in communication is changed. During retransmission, an MCS (Modulation and Coding Scheme) is determined, on the basis of a CQI achieved in a state of removal of an interference signal, for the user equipment (UE1) 200*a*, and the degree of modulation, or the like, of a signal is set.

A modification to subcarrier allocation means; for instance, allocating null to some of a plurality of subcarriers included in a multicarrier signal used for transmission from the radio base station 100 to the user equipment (UE1) 200*a* exhibiting a superior receiving status (preventing transmission). As a result, a desired signal to be received by the user equipment (UE2) 200*b* that receives a retransmitted signal does not experience interference at the frequency of the subcarrier allocated null; hence, the receiving SINR of the user equipment (UE2) 200*b* is significantly improved. During retransmission, the user equipment (UE2) 200*b* combines the desired signal received in the past with the desired signal received at the time of retransmission by means of soft combining, whereby the receiving SINR of a combined signal is greatly improved, and a probability of successful receipt achieved by the user equipment (UE2) 200*b* is enhanced.

At this time, the amount of resource allocated to the user equipment (UE1) 200*a* is reduced by redistribution of communication resources performed by the radio base station 100, and a subsequently-achieved receiving status of the user equipment (UE1) 200*a* is deteriorated to some extent. However, since the signal retransmitted from the radio base station 100 to the user equipment (UE2) 200*b* during retransmission is an interference signal known for the user equipment (UE1) 200*a*. Therefore, the user equipment (UE1) 200*a* can reliably eliminate (subtract) an interference signal occurring at the time of retransmission by use of data pertaining to an interference signal in the past held in a buffer. The degree of improvement in the receiving SINR of the user equipment (UE1) 200*a* achieved when the interference signal occurring during retransmission is eliminated is significantly large. Therefore, even when resources are significantly allocated to the user equipment (UE2) 200*b* and when the resources of the user equipment (UE1) 200*a* are reduced, a throughput of the user equipment (UE1) 200*a* is not decreased. Conversely, a great increase in the overall throughput of the user equipments (UE1, UE2) 200*a*, 200*b* of the plurality of users can be expected.

Detailed operation of respective sections of the multiuser radio communication system of the first embodiment shown in FIGS. 1A and 1B will now be described. FIG. 2 is a sequence diagram showing principal operation sequence of the multiuser radio communication system of the first embodiment. FIG. 2 shows operation performed when one user equipment (UE1) 200*a* exhibits a superior receiving status and when the other user equipment (UE2) 200*b* requires retransmission, as in the example shown in FIG. 1.

Moreover, in the present example, the example is based on the assumption that the user equipment (UE1) 200*a* is not previously notified whether or not the other user equipment (UE2) 200*b* requires retransmission; namely, a case where processing is originally performed regardless of whether or not retransmission is performed.

First, in order to determine an MCS for use in the case of downlink transmission (a direction from the base station to the user equipment), the radio base station (BS) 100 transmits pilot signals (SG11, SG21) to the respective user equipment (UE1) 200*a*, (UE2) 200*b*. The respective user equipments 200*a*, 200*b* measure their respective receiving SINRs by use of the received pilot signals, and feed back receiving quality showing a receiving status as CQIs (Channel Quality Indicators) to the radio base station 100 (SG12, SG22).

The user equipment 200*a* determines whether a receiving status is defective or non-defective by use of a measured receiving SINR (P21) and performs control operation, in accordance with control information about the result of a determination, as to whether or not to perform demodulation of data pertaining to an interference signal (a signal addressed to another station) and determination of an error in an interference signal (P24).

In accordance with the CQIs (corresponding to the receiving SINRs) fed back from the respective user equipments 200*a*, 200*b* as the control signals SG12, SG22, the radio base station 100 determines an MCS, encodes data by means of corresponding degrees of modulation, and transmits the data to the respective user equipments 200*a*, 200*b* (SG13, SG23). Pilot signals used for estimating channels and measuring CQIS of the receiving ends are transmitted from the radio base station 100 in conjunction with the data at all times.

The respective user equipments 200*a*, 200*b* perform receipt processing, to thus extract and demodulate desired data addressed thereto (P22, P31), thereby determining whether or not demodulated data are erroneous (P23, P32). When receipt processing is successful, an ACK (Acknowledgement) signal is fed back to the radio base station 100. When receipt processing ended in a failure, a NACK (Not Acknowledgement) signal is fed back to the radio base station 100. Moreover, when ended in a receiving failure, the respective user equipments 200*a*, 200*b* store received erroneous data into their buffers. In the embodiment shown in FIG. 2, since the user equipment 200*a* normally received data and achieved successful receipt, the user equipment feeds back an ACK (SG14) signal. Since the user equipment 200*b* could not normally receive data and ended in a receiving failure, the user equipment feeds back the NACK signal (SG24) and stores the unsuccessfully-received data into the buffer (P33). The user equipment 200*a* outputs successfully-received demodulated data (UE1 data).

When a receiving status is superior and has a leeway, the user equipment 200*a* further demodulates, in accordance with a receiving status, a signal addressed to the user equipment 200*b* that is an interference signal addressed to the other station, and a determination is made as to whether or not the demodulated data are erroneous (P24). When receipt of the signal addressed to the user equipment 200*b* is successful, the user equipment 200*a* stores data pertaining to a received interference signal into a buffer (P25). By means of a control signal SG4 fed back to the radio base station 100, the user equipment 200*a* transmits to the radio base station 100 a control signal ACK (UE2) showing successful receipt of an interference signal and a CQI (achieved after elimination of the signal addressed to UE2) showing a receiving status of a desired signal achieved after elimination of the interference signal, along with the ACK (UE1) signal and a CQI (UE1) pertaining to a desired signal addressed to the own station.

In accordance with the control signals (ACK/NACK) notified by the respective user equipments 200a and 200b, the radio base station 100 performs retransmission control (P11) as to whether to transmit new data or retransmission data by means of next transmission operation (P11). There is performed allocation of subcarriers of multicarrier signals transmitted to the respective user equipments 200a and 200b in accordance with the state of retransmission control (P12).

In an example shown in FIG. 2, the user equipment (UE2) 200b provides the radio base station 100 with a notification of the NACK (UE2) signal, and the user equipment (UE1) 200a provides the radio base station 100 with a notification of the ACK (UE1) signal pertaining to a desired signal and the NACK (UE2) signal pertaining to an interference signal. In this case, in order to enhance a probability of successful receipt achieved by the user equipment 200b, the radio base station 100 changes allocation of communication resources. Specifically, in relation to the multicarrier signal transmitted to the user equipment 200a exhibiting a superior receiving status, allocation of subcarriers is changed in such a way that data are not transmitted from some of the subcarriers.

Subsequently, the radio base station 100 transmits retransmission data (SG25) to the user equipment 200b and new data (SG15) to the user equipment 200a. At this time, the respective user equipments 200a and 200b are notified of information about the subcarrier allocation by means of a pilot signal, and the like. The MCS employed when the radio base station 100 transmits new data to the user equipment 200a is determined on the basis of the CQI (Achieved after elimination of the signal addressed to UE2) notified as the control signal SG14 by the user equipment 200a; namely, the receiving status of a desired signal achieved when the interference signal addressed to the UE2 is eliminated.

After having performed receipt processing (P34), the user equipment 200b to which the retransmission data have been transmitted combines the past-received data stored in the buffer through processing P33 with the currently-received retransmission data by means of soft combining (P35). Subsequently, the user equipment 200b performs an error determination as in the case of first transmission (P36) and provides the radio base station 100 with a notification of a response control signal (ACK/NACK) in accordance with the result of a determination (SG26).

In the meantime, the user equipment 200a determines if the user equipment 200b serving as the other station is in a retransmission state. When transmission of a signal to the other station, which would cause an interference signal, is ascertained to be in a state of retransmission, data pertaining to the interference signal are eliminated from the signal that is currently being received, by use of the received data pertaining to the interference signals of the past stored in the buffer through processing P25 (i.e., a known interference signal) (P26). Subsequently, the user equipment 200a performs receipt processing (P27) and error determination (P28) as with first transmission, and provides the radio base station 100 with a notification of a response control signal (ACK/NACK) in accordance with the result of a determination (SG16).

In the above embodiment, when the radio base station 100 retransmits a signal to the user equipment 200b by means of processing 12 for changing allocation of communication resources, data are not transmitted from some of the subcarriers by means of the multicarrier transmission signal SG15 transmitted to the other user equipment 200a exhibiting a superior receiving status. The amount of interference experienced by the user equipment 200b is reduced by the transmission signal SG15 transmitted at this time, so that the receiving SINR of the user equipment 200b is enhanced. Consequently, the receiving SINR achieved after soft combining processing P35 is greatly improved, and the probability of successful receipt achieved by the user equipment 200b is enhanced.

When the signal addressed to the user equipment 200b is retransmitted, the user equipment 200a can eliminate, as a known signal, a signal that is an interference signal and addressed to the user equipment 200b; therefore, the receiving SINR of the user equipment 200a can be greatly improved. Accordingly, even when some of the sub-carriers are not used as the transmission signal SG15 addressed to the user equipment 200a, the CQI achieved after elimination of the signal that is an interference signal and addressed to the user equipment 200b is high; hence, a higher MCS can be selected, and a throughput of the user equipment 200a is improved.

The number of retransmissions to the user equipment 200b whose receiving status is not good can be reduced through the foregoing operations, and a throughput of the user equipment 200a exhibiting a superior receiving status can also be improved. Hence, an overall throughput of the system can be improved.

The configuration and operation of the radio base station 100 will now be described. FIG. 3 is a block diagram showing an example configuration of the principal section of the radio base station of the multiuser radio communication system of the first embodiment.

The radio base station 100 includes a plurality of encoders 111 and 112 corresponding to a plurality of users; a plurality of transmission buffer sections 113 and 114; a sub-carrier allocator 115; a retransmission controller 116; a plurality of modulators 117 and 118; an MCS selector 119; a pilot generator 120; a plurality of transmission RF sections 121 and 122; and a plurality of antennas 101 and 102.

After being encoded by the encoder 111, transmission data addressed to the user equipment 200a are buffered by the transmission buffer section 113 and then input to the subcarrier allocator 115. Likewise, after being encoded by the encoder 112, transmission data addressed to the user equipment 200b are buffered in the transmission buffer section 114 and then input to the subcarrier allocator 115.

When control information requesting retransmission is input as control information A, the respective transmission buffer sections 113 and 114 output stored transmission data as retransmission data. The retransmission controller 116 generates, from ACK/NACK information fed back from the respective user equipments 200a and 200b, the control information A representing whether to transmit new data or retransmission data, and inputs the thus-generated control information to the transmission buffer sections 113 and 114. Further, when notified of, by any one of the user equipments 200a and 200b, ACK information about an interference signal addressed to the other station, the retransmission controller 116 inputs to the subcarrier allocator 115 the control information B for notifying performance of the subcarrier allocation.

When provided with an input of, from the retransmission controller 116, control information B for notifying performance of the subcarrier allocation as allocation of communication resources, the subcarrier allocator 115 reduces the number of subcarriers allocated to the user equipment received a response of ACK information pertaining to an interference signal; namely, the number of subcarriers allocated to the user equipment that exhibits a superior receiving status and that can receive an interference signal. The subcarrier allocator 115 implements the function of a communication resource setting section. The number of subcarriers allocated by means of a signal next transmitted by the user equipment (UE1) 200a is reduced in this case. Transmission data output from the subcarrier allocator 115 are modulated by the modulator 117 or 118. MCS information used at this time is input by the MCS selector 119.

The MCS selector 119 determines an MCS from the CQIs fed back from the respective user equipments 200a and 200b. At this time, the retransmission controller 116 provides the MCS selector 119 with, as control information C, a notification of information as to whether a normal CQI is used or a CQI achieved after elimination of an interference signal is used. The thus-determined MCS information is transmitted to the respective user equipments 200a and 200b by way of control channels of the radio signals.

The respective transmission data signals modulated and output by the modulators 117 and 118 are multiplexed in conjunction with a pilot signal generated by the pilot generator 120; the thus-multiplexed signal is up-converted into a radio frequency by the transmission RF sections 121 and 122 and transmitted as a radio wave from the respective antennas 101 and 102.

Figure 4:
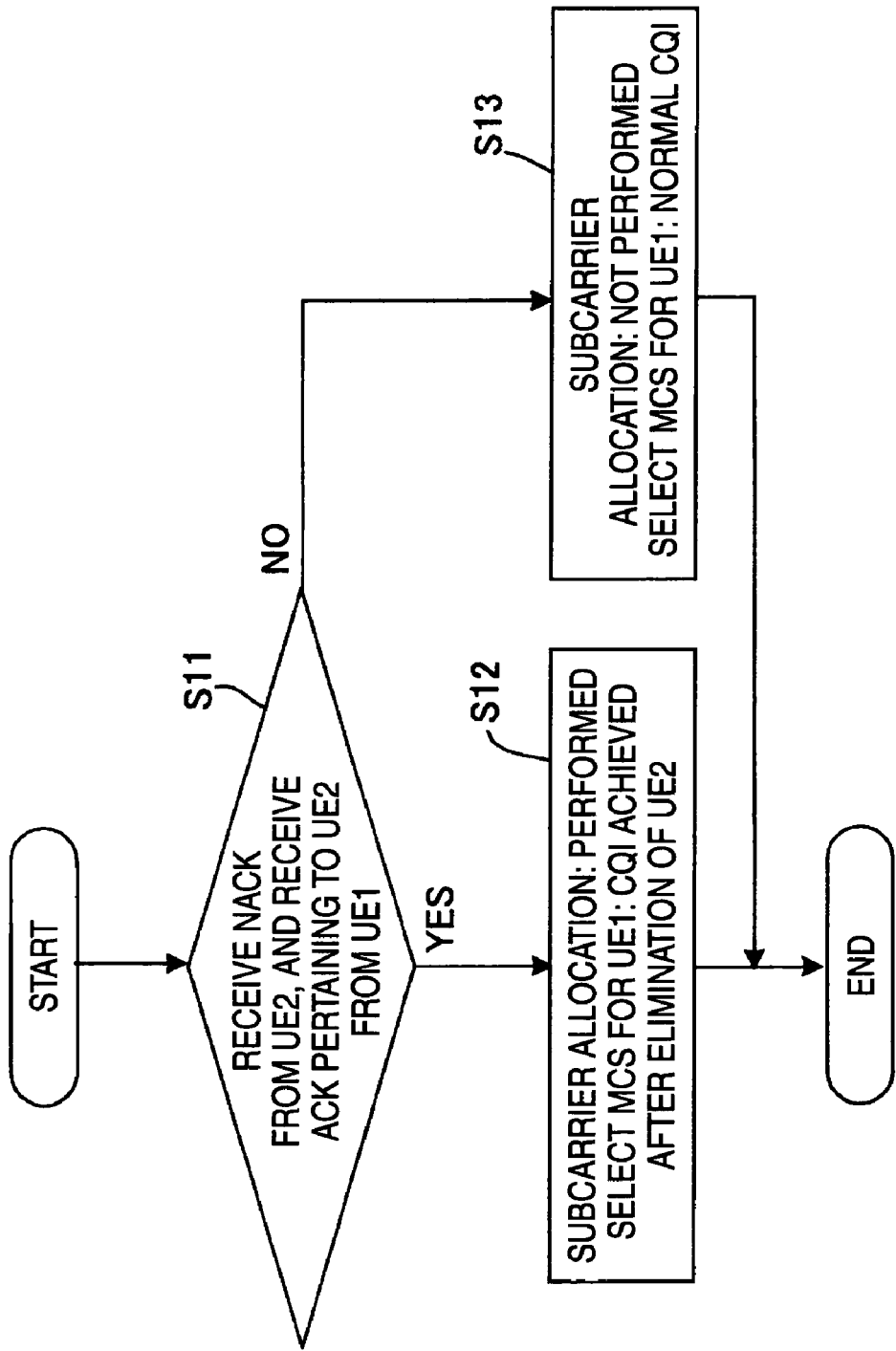
FIG. 4 is a flowchart showing principal operation of the radio base station of the first embodiment.

The retransmission controller 116 and the subcarrier allocator 115 of the radio base station 100 will be described hereunder in detail. FIG. 4 is a flowchart showing the principal operation of the radio base station of the first embodiment.

The retransmission controller 116 generates, from the ACK/NACK information fed back from the respective user equipments 200a and 200b, control information A pertaining to a retransmission request, control information B pertaining to subcarrier allocation, and control information C pertaining to a CQI; and inputs the pieces of control information to the transmission buffer sections 113 and 114, the subcarrier allocator 115, and the MCS selector 119, respectively.

The control information B input to the subcarrier allocator 115 and the control information C input to the MCS selector 119 are generated by the retransmission controller 116 in accordance with a generation flow shown in FIG. 4. Since the control information A can be generated by use of a common generation flow analogous to that employed in the related art, its explanation is omitted herein.

The generation flow shown in FIG. 4 is based, as with the previously-described case, on the assumption that the user equipment 200b has a poor receiving status and requires retransmission and that the user equipment 200a exhibits a superior receiving status and can also receive and demodulate an interference signal. First, in step S11, the retransmission controller 116 receives a NACK signal pertaining to a desired signal from one user equipment 200b in accordance with input ACK/NACK information, and determines whether or not the ACK signal pertaining to an interference signal (a desired signal addressed to the user equipment 200b) from the other user equipment 200a is received. When the requirement is fulfilled, processing proceeds to step S12. In contrast, when the requirement is not fulfilled, processing proceeds to step S13.

In step S12, a notification to the effect that subcarrier allocation (changing of allocation of communication resources) is performed is provided as control information B, and a notification that a CQI achieved after elimination of an interference signal is used when the user equipment 200a exhibiting a superior receiving status selects an MCS is provided as control information C.

In step S13, a notification to the effect that subcarrier allocation (changing of allocation of communication resources) is not performed is provided as control information B, and a notification that an ordinary CQI is used when the user equipment 200a exhibiting a superior receiving status selects an MCS is notified as control information C.

When received an input of, as control information B, information about a notification of performance of subcarrier allocation from the retransmission controller 116, the subcarrier allocator 115 curtails the number of subcarriers allocated to the transmission signal addressed to the user equipment 200a exhibiting a superior receiving status.

FIGS. 5A to 5D are schematic diagrams showing an example allocation of subcarriers to transmission signals in the radio base station of the first embodiment. In FIGS. 5A to 5D, reference symbol "f" designates a frequency; "t" designates a time; "P1 and P2" designate pilot signals; D designates data; and "null" represents no data.

Figure 5A:
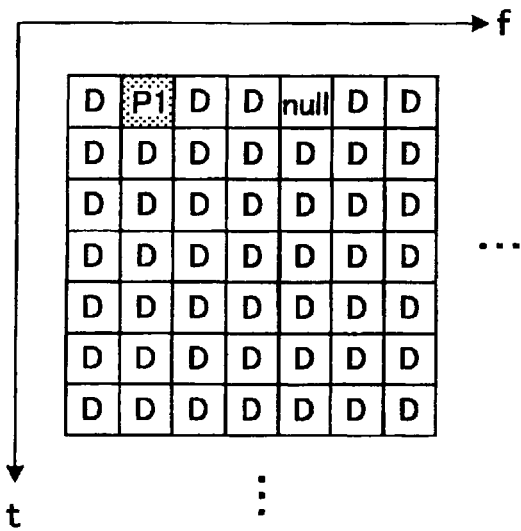
FIGS. 5A to 5D are schematic diagrams showing an example allocation of a subcarrier pertaining to a transmission signal in the radio base station of the first embodiment.
Figure 5B:
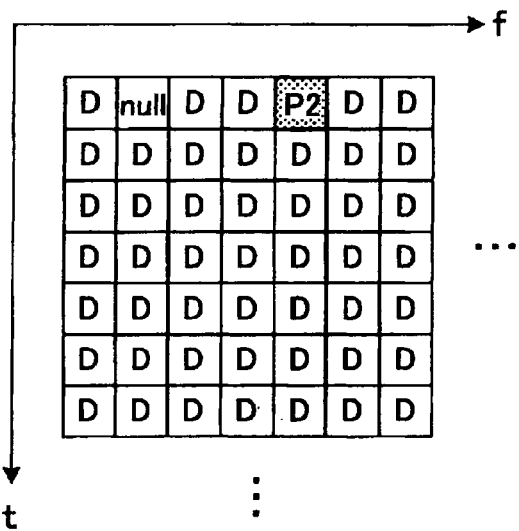
Figure 5C:
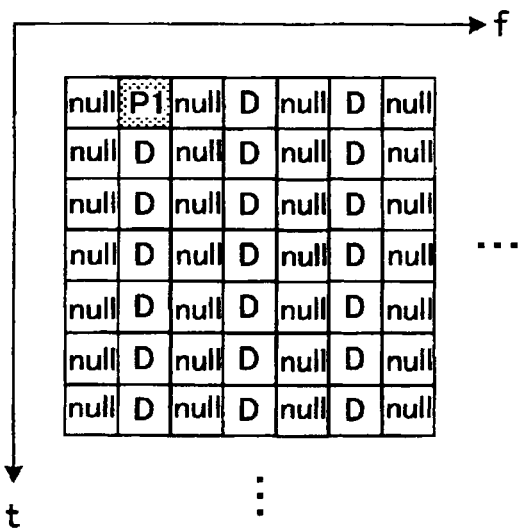
Figure 5D:
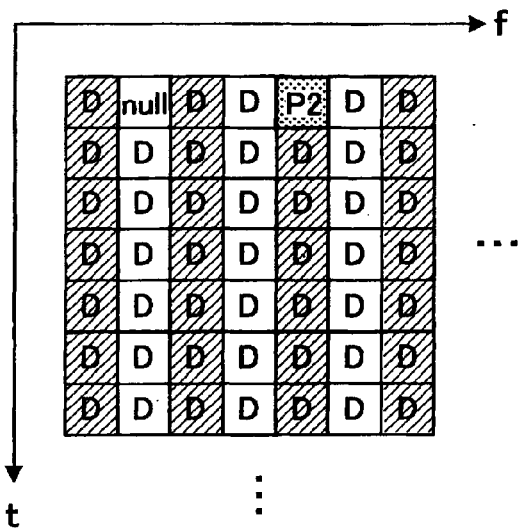

FIG. 5A shows subcarrier allocation regarding a multicarrier signal (transmission data for the UE1) transmitted to the user equipment 200a by first transmission, and FIG. 5B shows subcarrier allocation regarding a multicarrier signal (transmission data for the UE2) transmitted to the user equipment 200b by first transmission. FIG. 5C shows subcarrier allocation regarding a multicarrier signal (new transmission data for the UE1) transmitted to the user equipment 200a, which is in a superior receiving state, by second transmission (retransmission performed by the other station), and FIG. 5D shows subcarrier allocation regarding a multicarrier signal (retransmission data for the UE2) achieved during retransmission (second transmission performed by the other station), the signal being transmitted to the user equipment 200b exhibiting a poor receiving status.

Data are allocated to respective subcarriers of the multicarrier signals addressed to the respective user equipments 200a and 200b during first transmission, as shown in FIGS. 5A and 5B. The signal shown in FIG. 5A and the signal shown in FIG. 5B are simultaneously transmitted from the radio base station 100. During transmission performed by an ordinary multiuser MIMO system, the pilot signals P1 and P2 addressed to the respective user equipments are transmitted by FDM (Frequency Division Multiplexing). Hence, in relation to a subcarrier frequency allocated to a pilot signal (e.g., P1) addressed to each user equipment, a signal addressed to the other user equipment comes to null. Therefore, each of the receiving ends can receive a pilot signal addressed thereto without experience of interference from the signal addressed to the other user.

In contrast, data (D in FIGS. 5A to 5D) allocated to respective subcarriers are spatially multiplexed; therefore, data addressed to a plurality of user equipments are received in a mixed state with regard to subcarriers of the same frequency. Therefore, the signals received by the respective user equipments 200a and 200b must be subjected to signal separation processing.

The radio base station 100 has not yet performed special carrier allocation for adjusting communication resource allocation at the time of initial transmission. Therefore, the transmission data shown in FIG. 5A and the transmission data shown in FIG. 5B are allocated subcarrier frequencies in the same fashion. In FIGS. 5A and 5B, only a frequency corresponding to a pilot signal for the other station is allocated null.

In the meantime, the radio base station 100 performs carrier allocation at the next transmission timing, and data are allocated to respective subcarriers of the multicarrier signals addressed to the respective user equipments 200a, 200b as shown in FIGS. 5C, 5D. A signal shown in FIG. 5C and a signal shown in FIG. 5D are simultaneously transmitted from the radio base station 100.

Thus, as shown in FIG. 5C, the new transmission data addressed to the user equipment 200*a* after performance of carrier allocation greatly differ from the data employed for the first time shown in FIG. 5A. Specifically, null is allocated to a subcarrier of specific frequency other than a frequency corresponding to a pilot signal for the other station.

As shown in FIG. 5D, the retransmission data addressed to the user equipment 200*b* after performance of carrier allocation are the same as that employed for the first time shown in FIG. 5B. Data are allocated to all subcarriers except a frequency corresponding to the pilot signal for the other station.

Therefore, in relation to frequencies of hatched subcarriers in FIG. 5D, transmission data addressed to the other station come to null during retransmission as shown in FIG. 5C, and interference signals of the other users do not exist. Therefore, the user equipment 200*b* becomes less susceptible to interference, and the receiving SINR of the user equipment 200*b* achieved during retransmission is significantly enhanced.

Various conceivable modifications and applications are available in connection with a specific method for allocating subcarriers. For instance, as shown in FIGS. 6A to 6D, the number of subcarriers allocated null may also be controlled so as to be increased stepwise in accordance with the number of retransmission operations. FIGS. 6A to 6D are schematic diagrams showing another example subcarrier allocation relating to a transmission signal achieved during retransmission in the radio base station of the first embodiment.

FIG. 6A shows subcarrier allocation pertaining to a multicarrier signal (new transmission data for the UE1) that is transmitted to the user equipment 200*a* exhibiting a superior receiving status during second transmission (first retransmission performed by the other station), and FIG. 6B shows subcarrier allocation pertaining to a multicarrier signal (retransmission data for the UE2) that is transmitted to the user equipment 200*b* exhibiting a poor receiving status during first retransmission (second transmission performed by the other station).

FIG. 6C shows subcarrier allocation pertaining to a multicarrier signal (new transmission data for the UE1) that is transmitted to the user equipment 200*a* during third transmission (second retransmission performed by the other station), and FIG. 6D shows subcarrier allocation pertaining to a multicarrier signal (retransmission data for the UE2) that is transmitted to the user equipment 200*b* during second retransmission (third transmission performed by the other station).

In the modifications shown in FIGS. 6A to 6D, in relation to the signal transmitted to the user equipment (UE1) 200*a* that does not perform retransmission, the number of subcarriers allocated null is changed so as to increase stepwise as shown in FIGS. 6A and 6C in accordance with the number of retransmission to the other user equipment (UE2) 200*b* that performs retransmission. As a result, as shown in FIGS. 6B and 6D, the number of subcarriers susceptible to interference from the other users decreases with an increase in the number of retransmissions, in connection with the user equipment (UE2) 200*b*. Therefore, the receiving SINR of the user equipment 200*b* is further improved as the number of retransmissions increases.

As mentioned above, in the present embodiment, a ratio of channels used for communication; namely, allocation of communication resources, is reduced by applying null to some of the plurality of subcarriers in connection with a multicarrier signal addressed to the user equipment (UE1) 200*a* exhibiting a superior receiving status. As a result, the user equipment (UE2) 200*b* that performs retransmission becomes, at some frequencies, free of influence of the signal that is an interference signal and addressed to the user equipment (UE1) 200*a*, so that the receiving SINR achieved during retransmission is enhanced. Since the user equipment (UE1) 200*a* can eliminate the interference signal, which is being received, by use of data pertaining to the interference signal received in the past, the receiving SINR is greatly improved, and communication becomes possible by means of a high MCS. Therefore, even when the number of subcarriers is reduced by allocating null to specific subcarriers, a decrease in data rate can be prevented.

Figure 7:
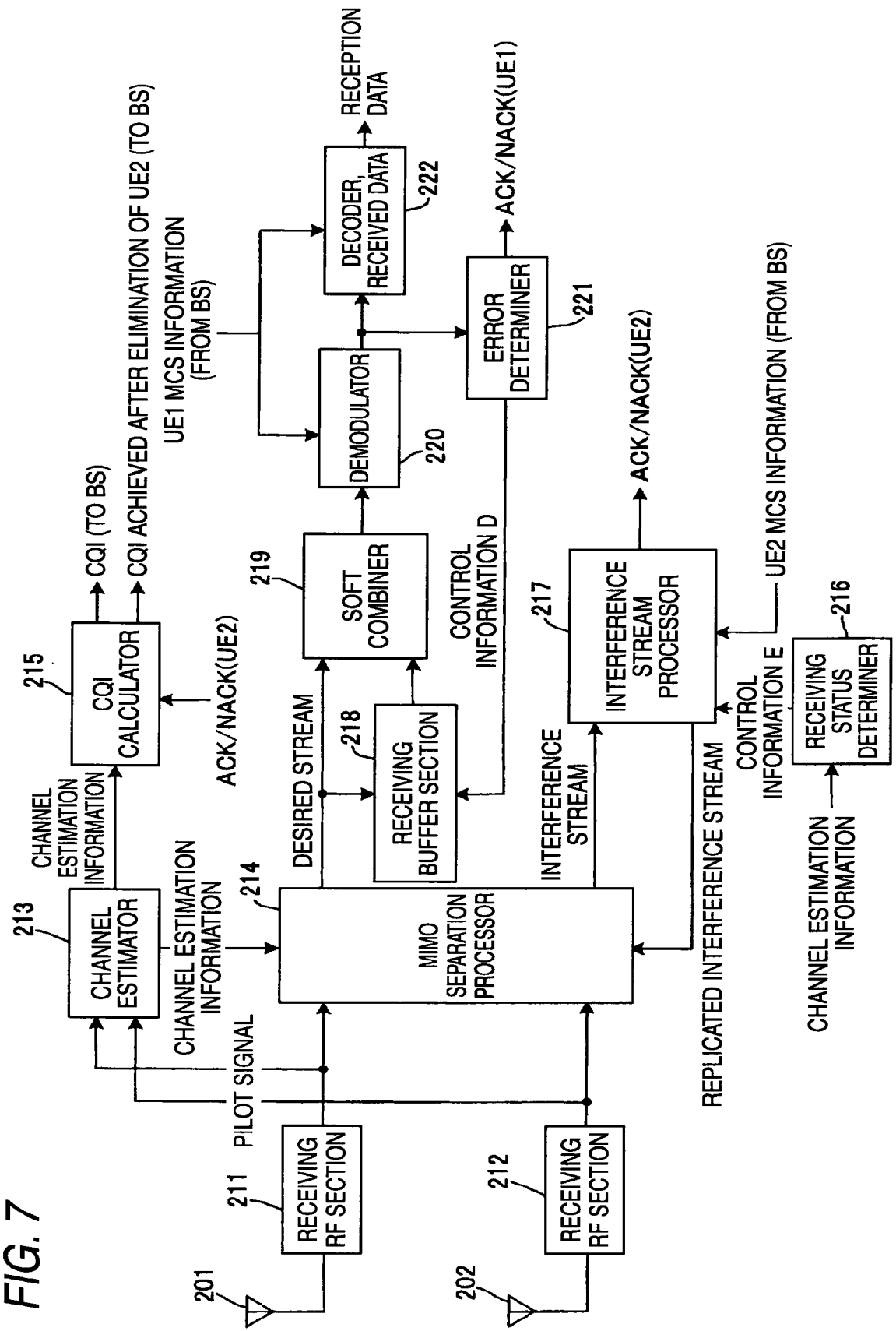
FIG. 7 is a block diagram showing an example configuration of a principal section of a user equipment in the multi-user radio communication system of the first embodiment.

The specific configuration and operation of the user equipments 200*a* and 200*b* will now be described in detail. FIG. 7 is a block diagram showing an example configuration of the principal section of the user equipment in the multiuser radio communication system of the first embodiment. The two user equipments 200*a* and 200*b* are assumed to be equal to each other in terms of a configuration and operation, and only an example configuration of the user equipment 200*a* is provided.

The user equipment 200*a* includes a plurality of antennas 201 and 202; a plurality of receiving RF sections 211 and 212; a channel estimator 213; a MIMO separation processor 214; a CQI calculator 215; a receiving status determiner 216; an interference stream processor 217; a receiving buffer section 218; a soft combiner 219; a demodulator 220; an error determiner 221; and a decoder 222.

Signals received by the respective antennas 201 and 202 are down-converted by the respective receiving RF sections 211 and 212. Subsequently, data portions of the received signals are input to the MIMO separation processor 214, and pilot signals of the received signals are input to the channel estimator 213. The channel estimator 213 estimates a channel by means of a pilot signal and inputs an estimated value as channel estimation information to the MIMO separation processor 214, the CQI calculator 215, and the receiving status determiner 216. Moreover, the channel estimator 213 is arranged so as to be able to receive retransmission information from the radio base station 100 to another radio receiving station. In this case, the channel estimator 213 implements the function of the retransmission information receiver.

The CQI calculator 215 computes a receiving SINR from the channel estimation information, thereby computing a CQI. When a control signal ACK (UE2) showing successful receipt of an interference signal addressed to another station (the user equipment 200*b*: UE2) is input from the interference stream processor 217, the CQI calculator 215 also computes a CQI achieved in the case of elimination of an interference signal that is an interference stream and that is addressed to the other station (UE2).

The MIMO separation processor 214 subjects a received signal, which include signals addressed to a plurality of user equipments, to signal separation processing, thereby extracting a desired stream (a desired signal addressed to the own station) and interference streams (interference signals addressed to the other stations). The desired stream output from the MIMO separation processor 214 is input to the soft combiner 219 and the receiving buffer section 218.

When the desired stream output from the MIMO separation processor 214 is acquired from a signal that has been received from the radio base station 100 by means of first transmission, the desired stream is not subjected to internal processing of the soft combiner 219. The desired stream output from the soft combiner 219 is demodulated by the demodulator 220 and output as received data after having been decoded by the subsequent decoder 222.

Received data demodulated by the demodulator 220 are input to the error determiner 221, as well. The error determiner 221 performs error determination by means of CRC (Cyclic Redundancy Check). When a determination result is correct, an ACK signal is output. When the determination result is not correct, a NACK signal is output. The ACK/NACK control signal output from the error determiner 221 is transmitted and notified as a response signal to the radio base station 100.

Control information D showing a determination result are output from the error determiner 221 and input to the receiving buffer 218. When the error determiner 221 has detected an error, the control information D is input to the receiving buffer section 218. In accordance with the control information D, the receiving buffer 218 temporarily stores a received desired stream, to thus prepare for retransmission. The receiving buffer section 218 implements the function of a desired signal buffer section.

When the desired stream output from the MIMO separation processor 214 is acquired from a signal received from the radio base station 100 during retransmission, the soft combiner 219 performs processing, such as Chase Combination and IR, by use of a desired stream output from the MIMO separation processor 214 and a past-received desired stream output from the receiving buffer section 218.

In the meantime, the interference stream output by the MIMO separation processor 214 is input to the interference stream processor 217. The interference stream processor 217 generates a replicated interference stream and inputs the stream into the MIMO separation processor 214. In accordance with a result of successful/unsuccessful receipt of the signal (i.e., the interference stream) addressed to another station (UE2), the interference stream processor 217 generates a control signal ACK (UE2) or NACK (UE2). The ACK (UE2)/NACK (UE2) control signal is transmitted and reported to the radio base station 100 as a response signal as in the case of the ACK (UE1)/NACK (UE1) of the own station. The interference stream processor 217 implements the function of an interference signal buffer section and the function of the interference signal information response section, and the MIMO separation processor 214 implements the function of an interference signal demodulator and the function of an interference signal eliminator.

Processing of the interference stream processor 217 is performed only when the control information E showing that the status of a desired stream received by the own station is superior is input from the receiving status determiner 216. The receiving status determiner 216 determines a receiving status in accordance with channel estimation information generated by the channel estimator 213. When the receiving status is determined to be superior in accordance with a determination result, control information E for directing performance of interference stream processing is input to the interference stream processor 217. As mentioned above, only when the receiving status is a predetermined threshold value or more; namely, superior, processing, such as demodulation, of an interference signal, is performed, whereby the probability of unsuccessful receipt can be reduced while demodulation of an interference signal is performed.

At this time, occurrence of redundant operational processing in the radio communication apparatus can be prevented.

Respective detailed configurations and operations of the interference stream processor 217, the MIMO separation processor 214, the receiving status determiner 216, and the CQI calculator 215 will be described below.

Figure 8:
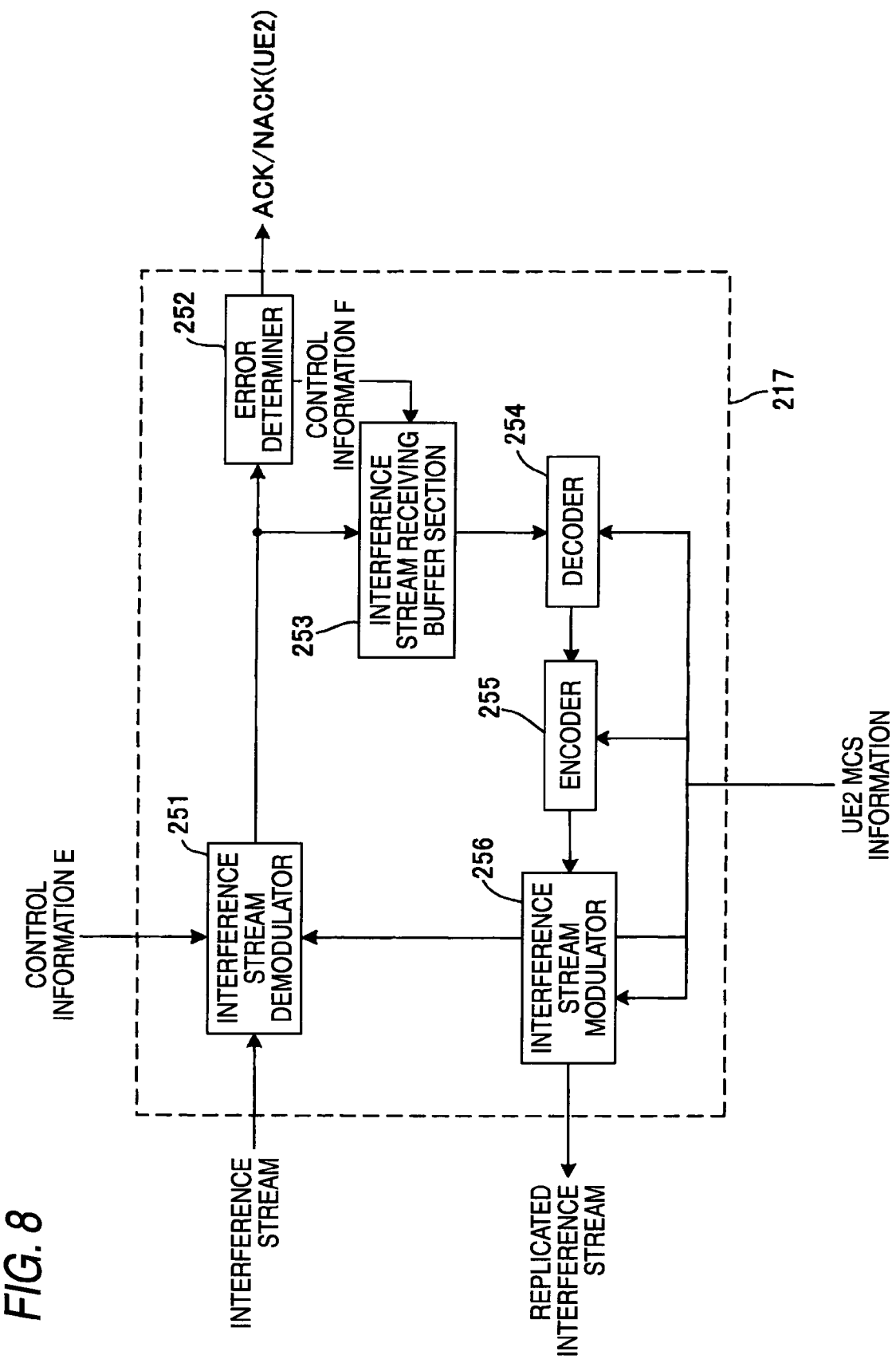
FIG. 8 is a block diagram showing an example configuration of an interference stream processor in the user equipment shown in FIG. 7.

FIG. 8 is a block diagram showing an example configuration of an interference stream processor in the user equipment shown in FIG. 7.

The interference stream processor 217 has an interference stream demodulator 251, an error determiner 252, an interference stream receiving buffer section 253, a decoder 254, an encoder 255, and an interference stream modulator 256.

The interference stream input to the interference stream processor 217 is demodulated by the interference stream demodulator 251 in accordance with UE2-MCS information (MCS information about the other station UE2 notified by the radio base station 100). Demodulation processing in the interference stream demodulator 251 is performed only when the control information E for instructing demodulation is input from the receiving status determiner 216. In other cases, processing in the interference stream processor 217 is not performed.

A demodulated interference stream is input to the error determiner 252 and the interference stream receiving buffer section 253. The error determiner 252 performs an error determination by means of CRC check and generates a signal address to another station (UE2); namely, an ACK/NACK signal pertaining to an interference stream. The ACK/NACK signal is input as control information F to the interference stream receiving buffer section 253 and fed back to the radio base station 100.

When the interference stream receiving buffer section 253 has received an input of control information showing NACK, the interference stream of the past stored in the buffer is input to the decoder 254, whereby decoding operation is performed in accordance with UE2-MCS information.

When a configuration is assumed to use a Chase Combination, a decoded interference stream is input to the encoder 255, and encoding operation is performed in accordance with UE2-MCS information. The thus-encoded interference stream is input to the interference stream modulator 256, and modulation processing is performed in accordance with the UE2-MCS information. When a configuration is assumed to perform IR, an interference stream for first transmission differs from an interference stream for retransmission. Therefore, a replicated interference stream is generated so as to match an interference stream to be retransmitted, in accordance with redundancy version (RV) information. The interference stream modulated by the interference stream modulator 256 is input to the MIMO separation processor 214 as a replicated noise-eliminated interference stream.

Figure 9:
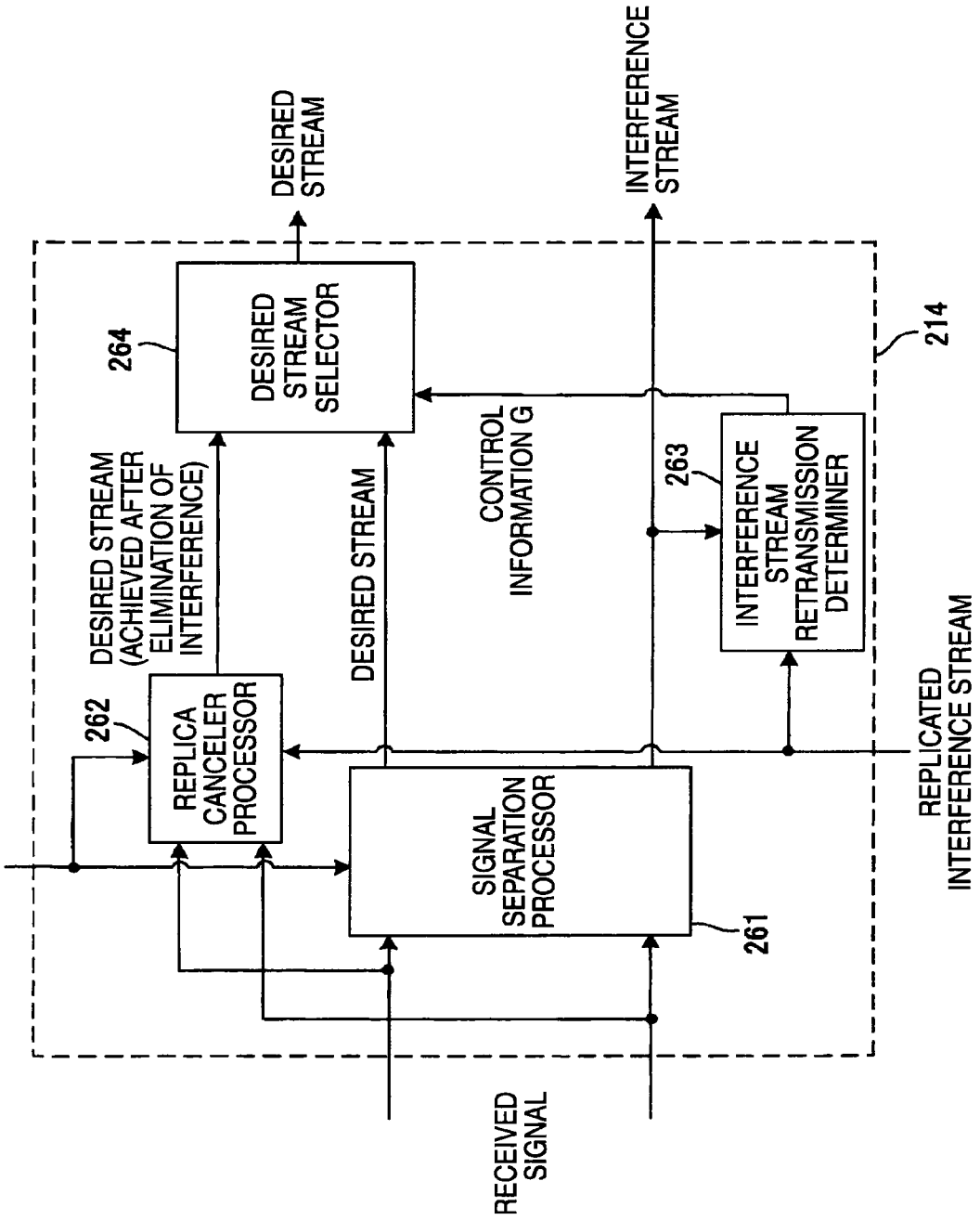
FIG. 9 is a block diagram showing an example configuration of a MIMO separation processor in the user equipment shown in FIG. 7.

FIG. 9 is a block diagram showing an example configuration of the MIMO separation processor in the user equipment shown in FIG. 7.

The MIMO separation processor 214 has a signal separation processor 261, a replica canceller processor 262, an interference stream retransmission determiner 263, and a desired stream selector 264.

The received signal input to the signal separation processor 261 is separated into a desired stream and an interference stream by use of channel estimation information. Spatial filtering, such as ZF (Zero Forcing), MMSE (Minimum Mean Square Error), is used for the operation.

Provided that a transmission signal vector is "x," a received signal vector is "y," channel estimation information is "H," and a noise vector is "n," a received signal vector "y" is expressed by Equation (1) provided below.

[Equation 1]

$$y = Hx + n \tag{1}$$
$$\rightarrow \begin{bmatrix} y_1 \\ y_2 \end{bmatrix} = [h_1, h_2] \begin{bmatrix} x_1 \\ x_2 \end{bmatrix} + \begin{bmatrix} n_1 \\ n_2 \end{bmatrix}$$

Transmission signal vector $x = [x_1 \ x_2]^T$
Received signal vector $y = [y_1 \ y_2]^T$
Channel estimation information $H = [h_1 \ h_2]$
Noise vector $n = [n_1 \ n_2]^T$
$T$: Transposed matrix On the assumption of receipt processing employing MMSE processing, the desired stream and the interference stream, which are output from the signal separation processor 261, can be expressed by Equation (2) provided below.

[Equation 2]

$$\tilde{x} = W^T y \quad (2)$$

$$\rightarrow \begin{bmatrix} \tilde{x}_1 \\ \tilde{x}_2 \end{bmatrix} = [\, w_1 \; w_2 \,] \begin{bmatrix} y_1 \\ y_2 \end{bmatrix}$$

$$w_1 = (H^* H^T + I_2/N)^{-1} h_1^*$$

$$w_2 = (H^* H^T + I_2/N)^{-1} h_2^*$$

Desired stream: $\tilde{x}_1$
Interference stream: $\tilde{x}_2$
*: Complex conjugate
where $N$ represents noise power, and
$I2$ represents a two-dimensional unit matrix.

When the replicated interference stream is input to the MIMO separation processor 214, the replica canceller processor 262 performs interference cancellation processing by use of a replicated interference stream, a received signal, and channel estimation information. A desired stream achieved after replicated interference cancellation processing can be expressed by Expression (3) provided below.

[Equation 3]

$$y' = y - h_2 \hat{x}_2$$

$$\hat{x}_1 = w'_1{}^T y' = |h_1|^2 x_1 + n' \quad (3)$$

When replica cancellation processing is performed as represented by Equation (3), a desired stream can acquire a diversity gain.

Incidentally, the user equipment (UE1) 200*a* is not certain if a signal addressed to the user equipment (UE2) 200*b* of a remote station has been retransmitted. Accordingly, the interference stream retransmission determiner 263 compares the interference stream, which has undergone signal separation processing, with the replicated interference stream, thereby determining whether or not the signal addressed to the other station (UE2) has been retransmitted. Moreover, control information G showing whether or not the other station (UE2) is in a state of retransmission is generated, and the control information G is input to a desired stream selector 264. In accordance with the control information G showing whether or not the other station (UE2) is in a state of retransmission, the desired stream selector 264 selects and outputs a desired stream.

FIG. 10 is a view showing correspondence between control information and a desired stream as a selection criterion employed in the desired stream selector 264. When the other station is in retransmission, the desired stream selector 264 selects a desired stream output from the replica cancellation processor 262. When the other station transmits new data, the desired stream selector 264 selects a desired stream output from the signal separation processor 261.

The CQI calculator 215 shown in FIG. 7 calculates a receiving SINR from the channel estimation information, thereby computing a CQI. At this time, when an ACK signal regarding the other station (UE2) is input, a CQI (achieved the time of elimination of UE2) based on the assumption of elimination of a signal addressed to the other station (UE2) that is an interference stream is also computed. When MMSE processing is assumed as signal separation processing, an ordinary receiving SINR is taken as $\gamma_1$, and a receiving SINR based on the assumption of elimination of a signal addressed to the other station (UE2) that is an interference stream is taken as $\gamma_2$. The ratios can be expressed by Equation (4).

[Equation 4]

$$\gamma_1 = \frac{w_1^T h_1}{1 - w_1^T h_1} \quad (4)$$

$$\gamma_2 = \frac{|h_1|^2}{N}$$

The receiving status determiner 216 shown in FIG. 7 determines a receiving status of a desired stream from channel estimation information, and inputs control information E to the interference stream processor 217 on the basis of a determination result. FIG. 11 is a view showing, as a determination result made by the receiving status determiner 216, relationship between a receiving status and control information. When the receiving SINR is a reference value or more, the receiving status determiner 216 outputs the control information E that commands performance of interference stream processing. When the receiving SINR is less than the reference value, the receiving status determiner outputs the control information E for commanding non-performance of interference stream processing. The receiving SINR can be computed from the channel estimation information. The reference value is determined and set at the time of designing or operation of the radio communication system.

Figure 12:
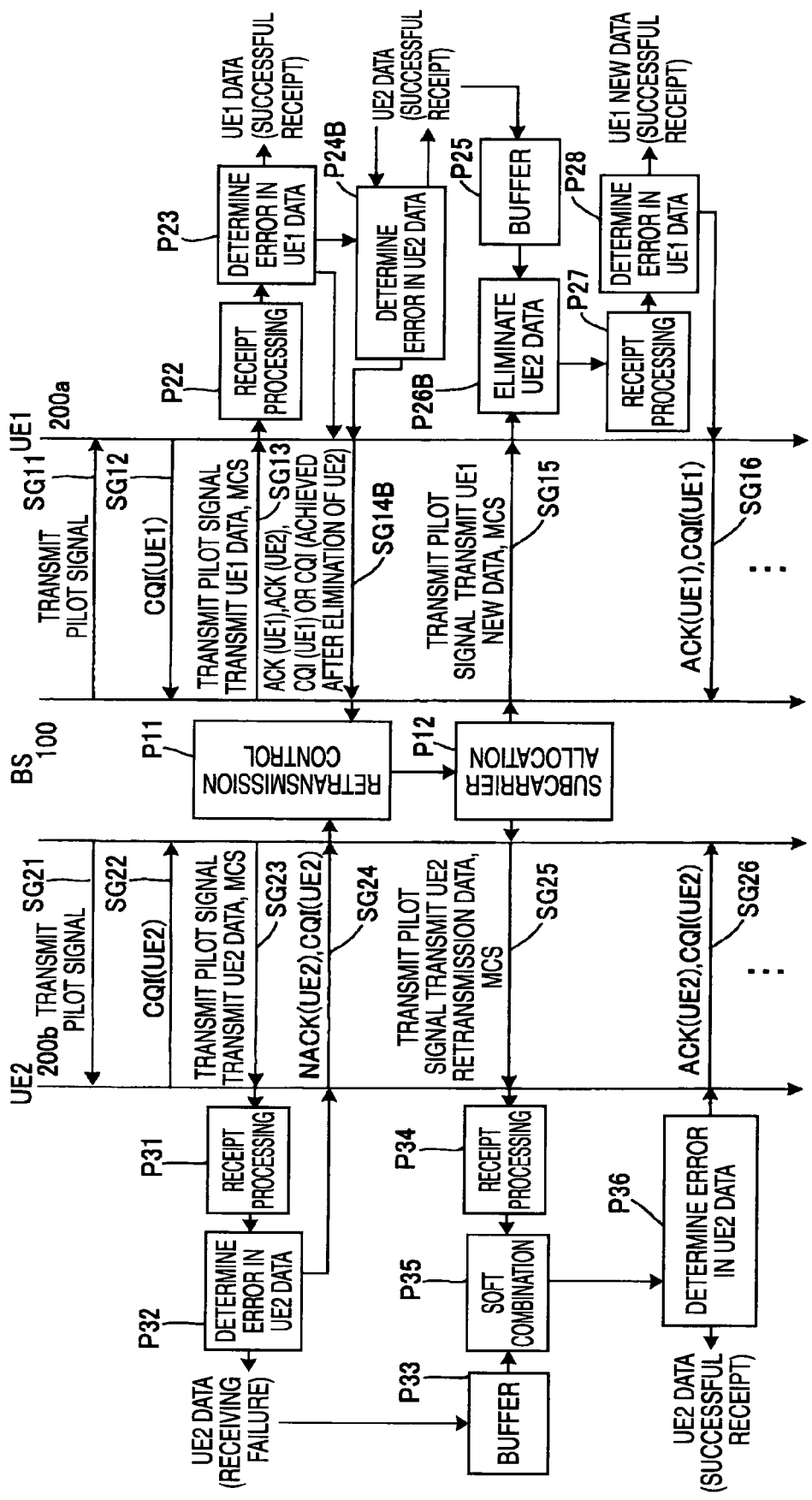
FIG. 12 is a sequence diagram showing principal operating sequence of the multi-user radio communication system of a modification of the first embodiment.

A modification of the first embodiment will now be described. FIG. 12 is a sequence diagram showing the principal operation sequence of the multiuser radio communication system of a modification of the first embodiment.

The operation example shown in FIG. 2 is based on the assumption that the user equipment (UE1) 200*a* of the own station is not sure if the user equipment (UE2) of the other station is in a state of retransmission. However, in the modification shown in FIG. 12, when retransmission to the other station (UE2) is performed, information showing that the other station is in retransmission is reported to the user equipment (UE1) 200*a* from the radio base station 100 by way of; for instance, a control channel of a radio signal. Different operation of the user equipment (UE1) 200*a* is chiefly described hereunder. In FIG. 12, like reference numerals are assigned to operations analogous to those shown in FIG. 2, and their explanations are omitted here.

In this case, the respective user equipments 200*a* and 200*b* perform processing, such as ascertainment of a signal of the control channel, thereby being able to ascertain, in advance, whether or not retransmission to the other station is performed next time. Receiving status determination processing P21 shown in FIG. 2 is omitted from the modification shown in FIG. 12, and processing that is performed prior to a stage of processing P26 for eliminating data addressed to the other station and that is performed by the own station to determine if the other station is in a state of retransmission (corresponding to operation of the interference stream retransmission determiner 263 shown in FIG. 9) is also omitted. Notification of retransmission information and determination of retransmission may also be performed by means of a pilot signal, a packet ID, a flag, and the like, as well as by means of the control channel. Further, the same also applies to; for instance, such a case where the user equipment (UE1) 200*a* detects a NACK signal of the other user equipment (UE2) 200*b* and makes a determination about retransmission while the radio base station 100 does not particularly provide a notification to the user equipments 200a, 200b.

Only when ascertained that the other station (UE2) is in retransmission in accordance with information notified by the radio base station 100, as processing P24B for determining an error in data addressed to the other station (UE2 data) after performed processing P23 for determining an error in data addressed to the own station (UE1 data), the user equipment (UE1) 200a determines an error in data pertaining to a signal (an interference stream) addressed to the other station that will become an interference signal. When the interference signal has successfully been received, an ACK (UE2) signal showing successful receipt of the interference signal and a CQI (at the time of removal of UE2) showing a receiving status of a desired signal when the interference signal is removed are transmitted, as a control signal SG14B, to the radio base station 100 along an ACK (UE1) showing successful receipt of the desired signal addressed to the own station.

Upon receipt of a signal SG15 including new data to be transmitted from the radio base station 100 next time, the user equipment (UE1) 200a perceives that transmission of a signal to the user equipment (UE2) 200b of the other station is in a state of retransmission in accordance with the information notified by the radio base station 100; and, in that case, eliminates data pertaining to an interference signal from the signal that is currently being received, by use of received data pertaining to the interference signals of the past stored in the buffer (i.e., a known interference signal) through buffer processing P25 (P26B).

In the meantime, when the user equipment (UE1) 200a perceives that the other station (UE2) is not in a state of retransmission, processing P24B for determining an error in data addressed to another station is not performed; processing P26B for eliminating data addressed to another station is not performed as well; an ACK (UE2) signal and a CQI (Achieved after elimination of the signal addressed to UE2) signal regarding the signal (an interference signal) addressed to the other station are not included in the control signal SG14B; and a notification of information about these operations is not provided to the radio base station 100. As mentioned above, so long as the receiving status is superior and assumes a predetermined threshold value or more, the probability of unsuccessful receipt can be reduced by demodulating an interference signal by performance of processing, such as demodulation of an interference signal. As this time, occurrence of redundant operation processing in the radio communication apparatus can be inhibited. Further, unwanted information fed back to the radio base station can also be curtailed.

As mentioned above, in the first embodiment, the user equipment (UE1) 200a exhibiting a superior receiving status demodulates a signal addressed to the user equipment (UE2) of the other station that is an interference stream as well as a desired stream; and stores the thus-demodulated signals in the buffer. When a signal addressed to the other station (UE2) is retransmitted through next transmission, stored information about the interference signals of the past can be utilized for elimination of an interference stream; hence, improvement of the receiving SINR of the user equipment (UE1) of the own station and enhancement of user throughput are achieved. Insofar as the receiving status of the user equipment (UE1) 200a is very superior, interference stream elimination processing is performed; hence, overhead or an increase in the amount of operation performed by the user equipment (UE1) 200a, which will be caused in the case of upload transmission (in a direction from the user equipment to the radio base station), can be prevented.

At the time of retransmission, control is performed so as to enhance the receiving status of the user equipment (UE2) 200b by changing allocation of subcarriers to multicarrier signals as adjustment of distribution of communication resources, thereby decreasing allocations of resources to the user equipment (UE1) 200a exhibiting a superior receiving status (increase the allocations of resources to the user equipment (UE2) 200b exhibiting a poor receiving status). In this case, the next receiving conditions of the user equipment (UE1) 200a are somewhat deteriorated by a change in the allocations of communication resources. However, the desired stream addressed to the user equipment (UE2) 200b, which will be an interference stream for the desired stream addressed to the own station, corresponds to retransmission data and is stored, as an interference stream of the past in the buffer of the user equipment (UE1) 200a. Consequently, the user equipment (UE2) 200b can readily eliminate the interference stream that arises during retransmission, thereby extracting a desired stream. Hence, even when a receiving environment is deteriorated to some extent, a problem does not particularly arise.

By means of such a change in the allocations of communication resources, the communication resources can be predominantly redistributed to the user equipment (UE2) 200b by an amount corresponding to the leeway of the receiving SINR of the user equipment (UE1) 200a. Therefore, since the amount of interference from the other station (UE1) during retransmission on the user equipment (UE2) 200b that performs retransmission is decreased, the receiving SINR is improved, and the probability of successful receipt can be enhanced. As a consequence, the number of retransmission operations can be reduced, and the user throughput of the user equipment (UE2) 200b is also enhanced. Therefore, overall system throughput can be significantly improved.

Second Embodiment

A second embodiment is an example in which a modification is made to a part of the first embodiment and based on the assumption that the present invention is applied to the multiuser radio communication system configured in the same fashion as is the multiuser radio communication system shown in FIGS. 1A and 1B. The second embodiment is the same as the first embodiment except that the configuration and operation of a radio base station 100A are changed to some extent. In the drawings, elements corresponding to those elements of the first embodiment are assigned the same reference numerals, and detailed explanations about the configuration and operation that are analogous to those described in connection with the first embodiment are omitted here.

Figure 13:
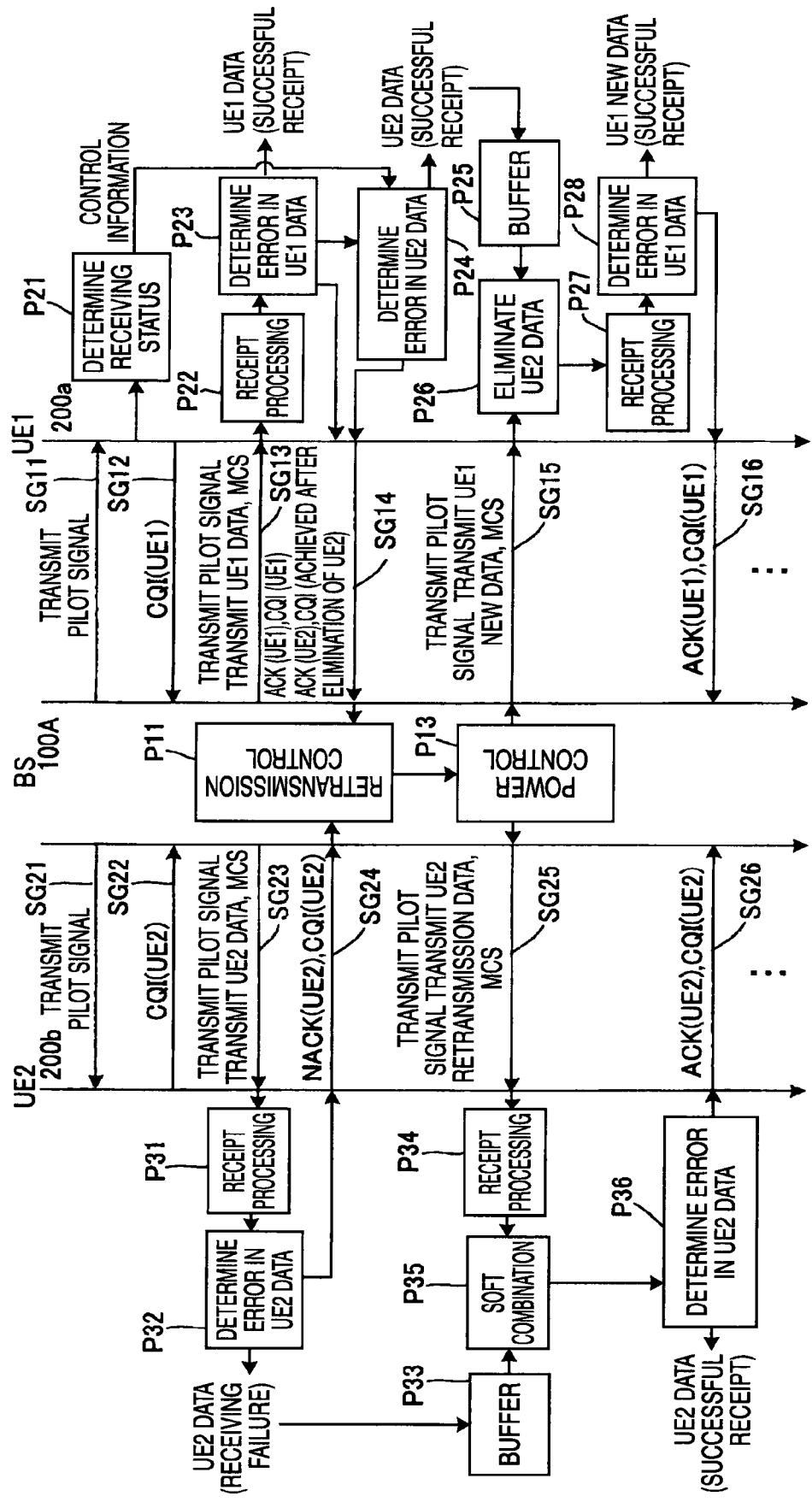
FIG. 13 is a sequence diagram showing principal operating sequence of the multi-user radio communication system of a second embodiment of the present invention.

FIG. 13 is a sequence diagram showing principal operation sequence of the multiuser radio communication system of the second embodiment of the present invention. As with the embodiment shown in FIGS. 1A and 1B, FIG. 13 shows operation performed when the one user equipment (UE1) 200a exhibits a superior receiving status and when the other user equipment (UE2) 200b requires retransmission. The embodiment is based on the presumption that the user equipment (UE1) 200a originally performs processing regardless of a state in which the user equipment is not previously notified of whether or not the other user equipment (UE2) 200b requires retransmission; namely, whether or not retransmission is performed.

The second embodiment shows, as an example change to the allocations of communication resources, a case where allocations of transmission power to the respective user equipments are changed. The radio base station (BS) 100A receives an ACK/NACK control signal, that is an answer from each of the user equipments (UE1, UE2) 200a, 200b and performs retransmission control processing P11 as in the first embodiment. Subsequently, processing for controlling power of transmission signals to be transmitted to the respective user equipments 200a, 200b is performed as communication resource allocation processing in accordance with the state of retransmission control (P13).

The power control processing P13 is for controlling, as a communication resource allocation, a relative ratio of transmission power of a signal, which is transmitted from the antenna 101 of the radio base station 100A and which is addressed to the user equipment (UE1) 200a, to transmission power of a signal which is transmitted from the antenna 102 and which is addressed to the user equipment (UE2) 200b.

If a result of retransmission control processing P11 shows that a signal is retransmitted to the user equipment (UE2) 200b requiring retransmission and that the user equipment (UE1) 200a exhibiting a superior receiving status can eliminate an interference signal, allocations will be changed in such a way that greater transmission power is allocated to the user equipment (UE2) 200b.

Figure 14:
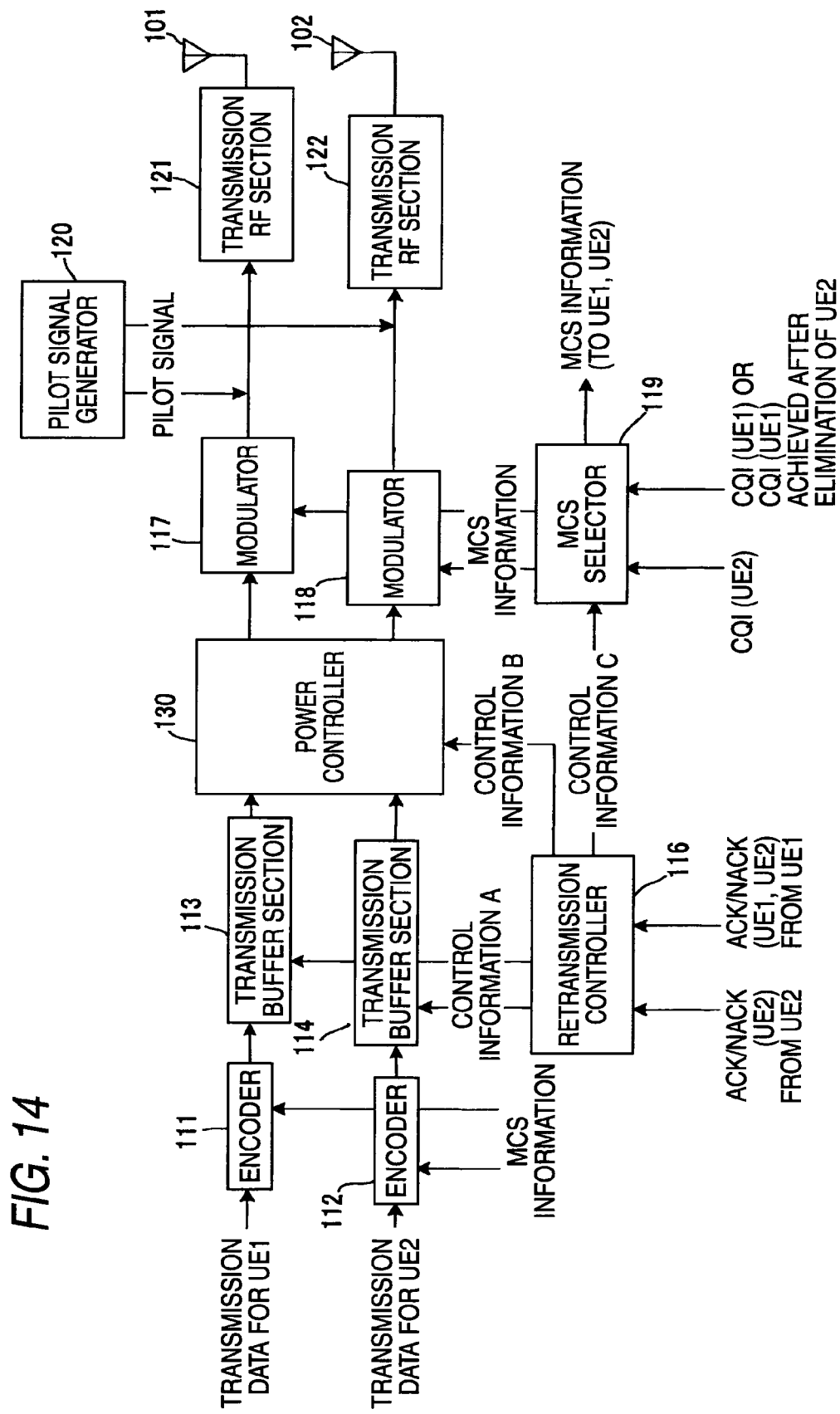
FIG. 14 is a block diagram showing an example configuration of the principal operating section of the radio base station in the multi-user radio communication system of the second embodiment.

The configuration and operation of the radio base station 100A of the second embodiment will now be described. FIG. 14 is a block diagram showing an example configuration of the principal section of the radio base station in the multiuser radio communication system of the second embodiment.

The radio base station 100A of the second embodiment is made up of a plurality of encoders 111, 112 corresponding to a plurality of users; a plurality of transmission buffer sections 113 and 114; a retransmission controller 116; a plurality of modulators 117 and 118; an MCS selector 119; a pilot generator 120; a plurality of transmission RF sections 121 and 122; a plurality of antennas 101 and 102; and a power controller 130. Specifically, the power controller 130 is provided in place of the subcarrier allocator 115 in the configuration of the first embodiment shown in FIG. 3, and the radio base station is analogous in other respects.

When received from the retransmission controller 116 an input of the control information B notifying performance of a transmission power allocation as an allocation of a communication resource, the power controller 130 changes a transmission power allocation in such a way that transmission power to the user equipment received a NACK response; namely, a user equipment that performs retransmission because of a poor receiving status, is increased. The power controller 130 implements the function of the communication resource setting section.

FIGS. 15A and 15B are diagrammatic views showing example allocations of transmission power in the radio base station of the second embodiment. FIG. 15A shows allocations of transmission power to the respective user equipments 200a and 200b during first transmission, and FIG. 15B shows allocations of transmission power to the respective user equipments 200a and 200b during second transmission (first retransmission). As in the first embodiment, the present embodiment is based on the assumption that the user equipment (UE1) 200a exhibits a superior receiving status and that the user equipment (UE2) 200b exhibits a poor receiving status.

First, at the time of first transmission from the radio base station 100A to the respective user equipments 200, transmission power of a signal transmitted from the antenna 101 to the user equipment (UE1) 200a and transmission power of a signal transmitted from the antenna 102 to the user equipment (UE2) 200b are evenly allocated, as shown in FIG. 15A.

Upon receipt of an input of the control information B for commanding transmission power allocation from the retransmission controller 116, the power controller 130 allocates transmission power, and changes transmission power allocations at the time of second transmission (at the time of retransmission of a signal to UE2), as shown in FIG. 15B. In this case, transmission power to the user equipment (UE1) 200a is decreased in such a way that the transmission power for the user equipment (UE2) 200b becomes greater than the transmission power for the user equipment (UE1) 200a, thereby increasing transmission power for the user equipment (UE2) 200b. As a result, when a signal is retransmitted to the user equipment (UE2) 200b, transmission power for the retransmission signal is increased. Power of the user equipment (UE2) 200b for receiving a desired signal at the time of retransmission is increased by such transmission power control, and power for receiving an interference signal is decreased; hence, the receiving SINR is greatly improved.

Various conceivable modifications and applications exist for the specific method for allocating transmission power. For instance, the amount of increase or decrease in transmission power may also be controlled so as to change stepwise in accordance with the number of retransmission operations as shown in FIGS. 16A to 16D. FIGS. 16A to 16D are schematic diagrams showing other examples of transmission power allocations achieved during retransmission in the radio base station of the second embodiment.

FIG. 16A shows the state of allocation of transmission power to the respective user equipments 200a and 200b when a signal is transmitted to the user equipment (UE2) 200b through first retransmission (second transmission); FIG. 16B shows the state of allocation of transmission power to the respective user equipments 200a and 200b when a signal is transmitted to the user equipment (UE2) 200b through second retransmission (third transmission); FIG. 16C shows the state of allocation of transmission power to the respective user equipments 200a and 200b when a signal is transmitted to the user equipment (UE2) 200b through third retransmission (fourth transmission); and FIG. 16D shows the state of allocation of transmission power to the respective user equipments 200a and 200b when a signal is transmitted to the user equipment (UE2) 200b through fourth retransmission (fifth transmission).

In the modification shown in FIGS. 16A to 16D, with an increase in the number of retransmission operations, transmission power for the signal addressed to the user equipment (UE1) 200a is decreased, and transmission power for the signal addressed to the user equipment (UE2) 200b is increased. As a result, the receiving SINR of the user equipment (UE2) 200b can be improved with an increase in the number of retransmission operations.

As mentioned above, in the present embodiment, transmission power for the user equipment (UE1) 200a exhibiting a superior receiving status is decreased, transmission power for the user equipment (UE2) 200b that performs retransmission is increased, or both of these operations are performed, thereby decreasing the communication resources distributed to the user equipment (UE1) 200a. The influence of an interference signal on the user equipment (UE2) 200b that performs retransmission is thereby reduced, and the receiving SINR achieved during retransmission is improved. Since the user equipment (UE1) 200a can eliminate an interference signal, which is being received by use of data pertaining to the interference signals received in the past, the receiving SINR is greatly improved, and communication with high MCS becomes possible. Therefore, even when a transmission power level is decreased, occurrence of a decrease in data rate can be prevented.

Figure 17:
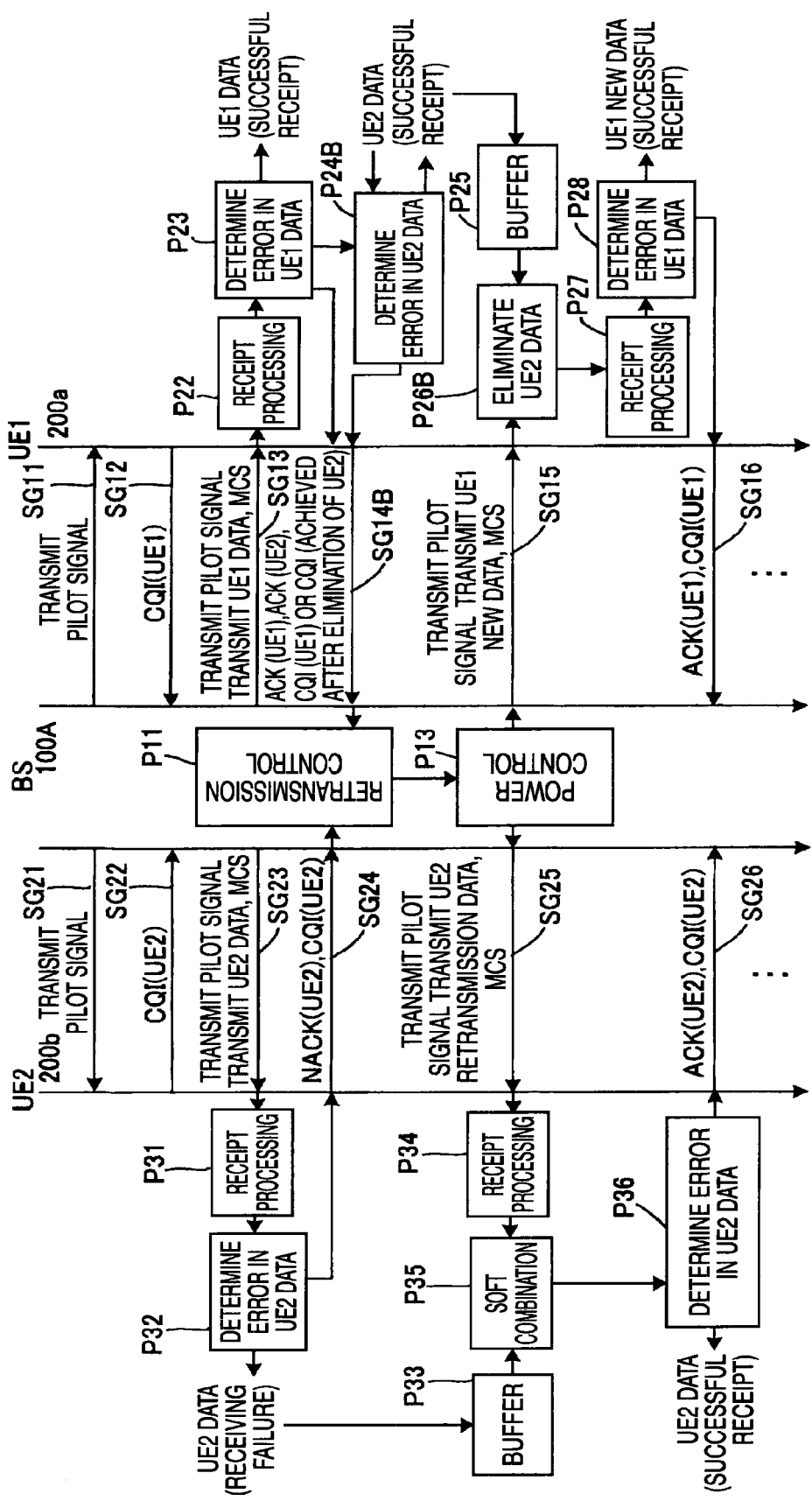
FIG. 17 is a sequence diagram showing principal operating sequence of the multi-user radio communication system of a modification of the second embodiment.

A modification of the second embodiment will now be described. FIG. 17 is a sequence diagram showing the principal operation sequence of the multiuser radio communication system of the modification of the second embodiment.

The example operation shown in FIG. 13 is based on the presumption that the user equipment (UE1) 200*a* of the own station is not sure if the user equipment (UE2) of the other station is in the state of retransmission. In contrast, in a modification shown in FIG. 17, when a signal is retransmitted to the other station (UE2), the radio base station 100A provides the user equipment (UE1) 200*a* with a notification of information showing that the other station is in retransmission by way of; for instance, a control channel of a radio signal. Explanations are provided primarily for different operation of the user equipment (UE1) 200*a*. In FIG. 17, like reference symbols are provided for like operations shown in FIG. 13, and their explanations are omitted here.

In this case, each of the user equipments 200*a* and 200*b* can ascertain, in advance, whether or not a signal is next retransmitted to the other station by processing, such as checking of a signal of the control channel. Consequently, receiving status determination processing P21 shown in FIG. 13 is omitted from the modification shown in FIG. 17, and there is also omitted processing which is performed in a state preceding processing P26 for eliminating data addressed to the other station and by means of which the own station determines if the other station is in the state of retransmission (corresponding to operation of the interference stream retransmission determiner 263 shown in FIG. 9).

When ascertained, as processing P24B for determining an error in data addressed to the other station (UE2 data), that the other station (UE2) is in the state of retransmission in accordance with the information notified by the radio base station 100A after having performed processing P23 for determining an error in data addressed to the own station (UE1 data), the user equipment (UE1) 200*a* determines an error in data pertaining to the signal (an interference stream) that is addressed to the other station and that will become an interference signal. When the interference signal is successfully received, an ACK (UE1) signal representing successful receipt of a desired signal addressed to the own station, an ACK (UE2) signal representing successful receipt of the interference signal, and a CQI (achieved at the time of removal of UE2) signal representing the status of the desired signal received when the interference signal has been removed are transmitted, as a control signal SG14B, to the radio base station 100A.

Upon receipt of, from the radio base station 100A, a signal SG15 including new data to be next transmitted, the user equipment (UE1) 200*a* eliminates, in accordance with the information notified by the radio base station 100A, data pertaining to an interference signal from a signal being currently received, by use of received data (i.e., a known interference signal) pertaining to the interference signal of the past stored in the buffer through buffer processing P25 when perceived that transmission of a signal to the user equipment (UE2) 200*b* of the other station is in the state of retransmission (P26B).

In the meantime, when the user equipment (UE1) 200*a* perceives that the other station (UE2) is not in the state of retransmission, processing P24B for determining an error in data addressed to the other station is not performed, nor is performed processing P26B for eliminating data addressed to the other station. Moreover the ACK (UE2) signal and the CQI (Achieved after elimination of the signal addressed to UE2) signal pertaining to a signal addressed to the other station (an interference signal) are not included in the control signal SG14B, and a notification of information about these signals is not provided to the radio base station 100A.

As mentioned above, in the second embodiment, the user equipment (UE1) 200*a* exhibiting a superior receiving status also demodulates the signal, which is an interference stream and which is addressed to the user equipment (UE2) of the other station, and stores the thus-demodulated signal in the buffer, as in the first embodiment. When a signal addressed to the other station (UE2) is retransmitted, the demodulated signal can be utilized for eliminating the interference stream. The receiving SINR of the user equipment (UE1) of the own station is improved, which in turn enhances user throughput. Moreover, only when the receiving status of the user equipment (UE1) 200*a* is extremely superior, interference stream elimination processing is performed; hence, overhead or an increase in the amount of arithmetic operation of the user equipment (UE1) 200*a*, which is achieved at the time of uploading transmission (a direction from the user equipment toward the radio base station), can be reduced.

Transmission power allocations are changed as the adjustment of distribution of communication resources during retransmission, thereby reducing the allocation of resources to the user equipment (UE1) 200*a* exhibiting a superior receiving status (increasing the allocation of resources to the user equipment (UE2) 200*b* exhibiting a poor receiving status). As a result, the amount of interference from the other station (UE1) during retransmission on the user equipment (UE2) 200*b* that performs retransmission is reduced; hence the receiving SINR is improved, and the probability of successful receipt can be enhanced. As a consequence, user throughput of the user equipment (UE2) 200*b* is also enhanced. Moreover, there is adopted a configuration in which the amount of interference from the other station is diminished by transmission power control. Therefore, control of communication resources performed by the radio base station 100A becomes easier as compared with the first embodiment.

Third Embodiment

Figure 18A:
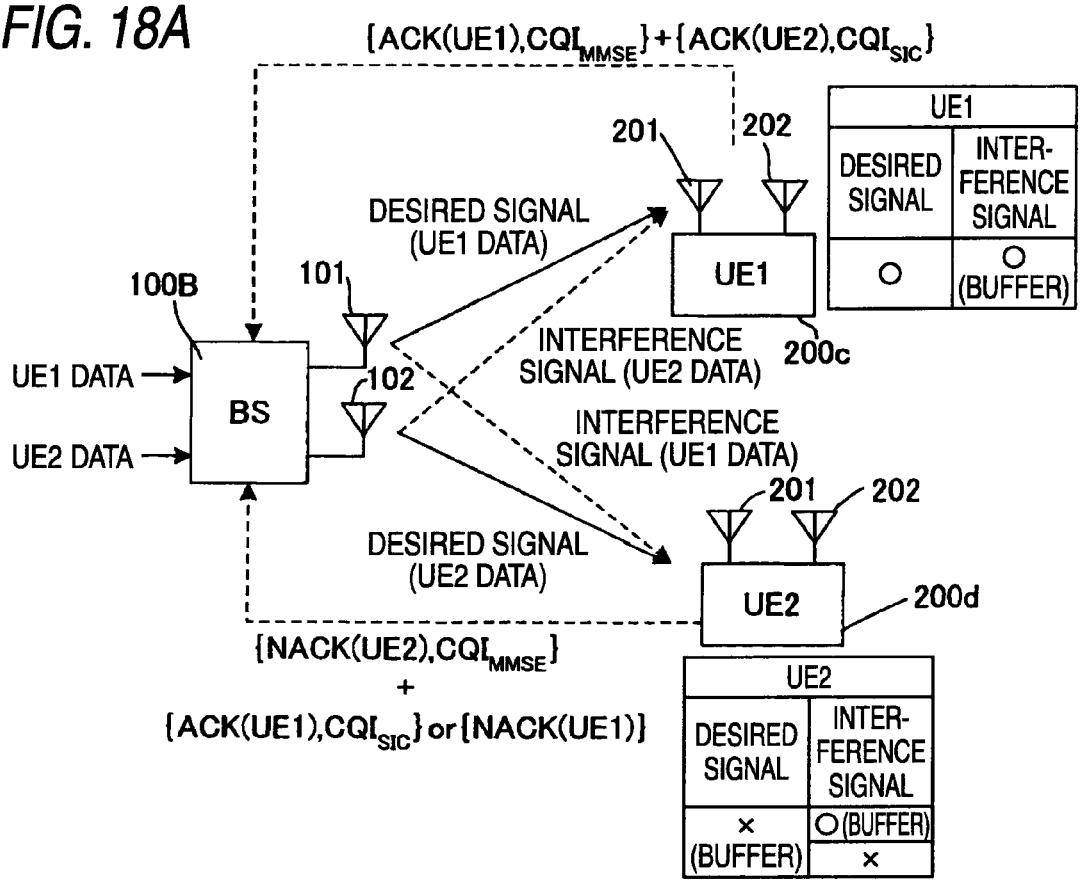
FIGS. 18A and 18B are block diagrams showing general configuration and operation of a multi-user radio communication system of a third embodiment of the present invention.
Figure 18B:
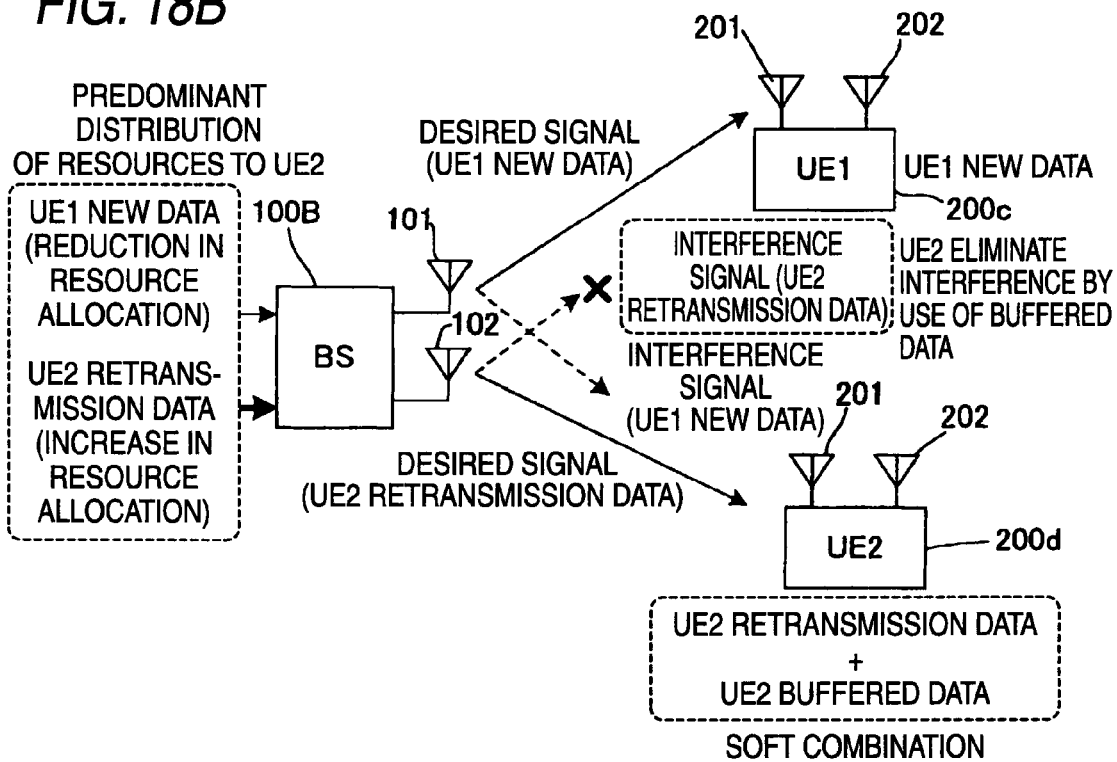

FIGS. 18A and 18B are block diagrams showing general configuration and operation of a multiuser radio communication system of a third embodiment of the present invention.

The third embodiment is based on the assumption that the present invention is applied to the multiuser radio communication system, as in the first embodiment. There is provided an example configuration of a multiuser MIMO communication system built from one radio base station (radio communication base station equipment: BS) 100B serving as a radio transmission station; and two user equipments (radio communication mobile station devices: UE1, UE2) 200*c* and 200*d* serving as radio receiving stations.

The radio base station 100B transmits the signal (UE1 data) addressed to a user equipment (the first radio receiving station, UE1) 200*c* from the antenna 101, as well as transmitting a signal (UE2 data) addressed to another user equipment (the second radio receiving station, UE2) 200*d* from the antenna 102. Data to be transmitted are assumed to be a data stream made up of packets that consecutively appear in time sequence.

At this time, the radio base station 100B simultaneously, sequentially transmits the signal addressed to the user equipment (UE1) 200*c* and the signal addressed to the user equipment (UE2) 200*d* on a per-packet basis by using a multicarrier signal, such as an OFDM signal, as a signal to be transmitted as a radio signal, and a common radio frequency band. FIG. 18A shows first transmission, and FIG. 18B shows second transmission; namely, retransmission.

In the multiuser MIMO communication system, a data signal for the other station is received as interference. Hence, the respective user equipments (UE1 and UE2) 200c and 200d perform signal separation processing, thereby suppressing an interference signal and extracting a desired signal. In the present embodiment, the respective user equipments 200c and 200d demodulate an interference signal as well as a desired signal, thereby determining an error; and feed back, as information that is based on a determination result and that shows successful receipt or unsuccessful receipt, an ACK signal to the radio base station (BS) 100B in the case of successful receipt and a NACK signal to the same in the case of unsuccessful receipt, in connection with each of the desired signal and the interference signal.

In connection with the desired signal, each of the user equipments 200c and 200d feeds back to the radio base station 100B a CQI signal (a $CQI_{MMSE}$ signal; namely, a CQI signal resultant from receipt of an MMSE (Minimum Means Square Error) signal in this case) with a view toward the next transmission. Moreover, when the receipt of a desired signal has ended in failure, the user equipment buffers received data pertaining to a desired signal. Each of the user equipments 200c and 200d feeds back, in connection with the interference signal, to the radio base station 100B a CQI signal ($CQI_{SIC}$; a CQI signal achieved through SIC (Successive Interference Canceller) receiving operation to which consecutive interference canceller is applied in this case) acquired when receipt processing for eliminating an interference signal is performed. Moreover, when the interference signal has been demodulated successfully, the user equipment buffers received data pertaining to the interference signal.

As shown in FIG. 18A, the third embodiment is based on the assumption that the one user equipment (UE1) 200c has successfully received a desired signal and an interference signal by first transmission and that the other user equipment (UE2) 200d has failed to receive a desired signal and successfully or unsuccessfully received an interference signal. In this case, the user equipment 200c provides the radio base station 100B with a notification of the ACK (UE1) signal and the $CQI_{MMSE}$ signal pertaining to the desired signal and a notification of an ACK (UE2) signal and a $CQI_{SIC}$ signal pertaining to the interference signal. Further, the user equipment 200c buffers received data pertaining to the interference signal. In the meantime, the user equipment 200d provides the radio base station 100B with a notification of a NACK (UE2) signal and the $CQI_{MMSE}$ signal pertaining to the desired signal and a notification of a ACK (UE1) signal and a $CQI_{SIC}$ signal or an NACK (UE1) signal pertaining to the interference signal. The user equipment 200d buffers received data pertaining to the unsuccessfully-received desired signal. When the interference signal was successfully received, the user equipment 200d buffers received data pertaining to the interference signal.

As shown in FIG. 18B, the radio base station 100B changes allocations of communication resources during the next second transmission (during retransmission to the UE2) in such a way that resources are predominantly allocated to the user equipment (UE2) 200d. In this case, the allocation of resources to the user equipment 200d that transmits retransmission data by means of retransmission control after having failed to receive the desired signal is increased, and the allocation of resources to the user equipment 200c that transmits new data is reduced. The third embodiment illustrates, as an example change in communication resource allocation, a case where the allocation of subcarriers (scheduling) used for communication is changed as in the first embodiment. At the time of retransmission, an MCS is determined for the user equipment (UE1) 200c from a $CQI_{SIC}$ signal from which the interference signal is eliminated, and the degree of modulation of a signal, and the like, is set.

At this time, the user equipment (UE1) 200c performs receipt processing for eliminating, from the received signal, the buffered interference signal of the user equipment (UE2) 200d, thereby enhancing the receiving SINR achieved during retransmission. Since a signal retransmitted from the radio base station 100B to the user equipment (UE2) 200d at the time of retransmission is a known interference signal for the user equipment (UE1) 200c, the user equipment (UE1) 200c can reliably eliminate (subtract) the interference signal received through retransmission by use of the data pertaining to the interference signal of the past held in the buffer.

By virtue of the predominant allocation of communication resources, the receiving SINR of the user equipment (UE2) 200d is enhanced at the time of retransmission. The user equipment (UE2) 200d combines the desired signal received in the past with the desired signal received during retransmission by means of soft combining, whereby a receiving SINR of the combined signal is greatly improved, and the probability of success receipt achieved by the user equipment (UE2) 200d is enhanced. Thus, the interference signal is demodulated and utilized along with a desired signal as mentioned above, and the allocation of communication resources is changed in accordance with the results of receipt of the signals, whereby great enhancement of overall throughput of the user equipments (UE1, UE2) 200c, 200d of the plurality of users can be expected.

Figure 19:
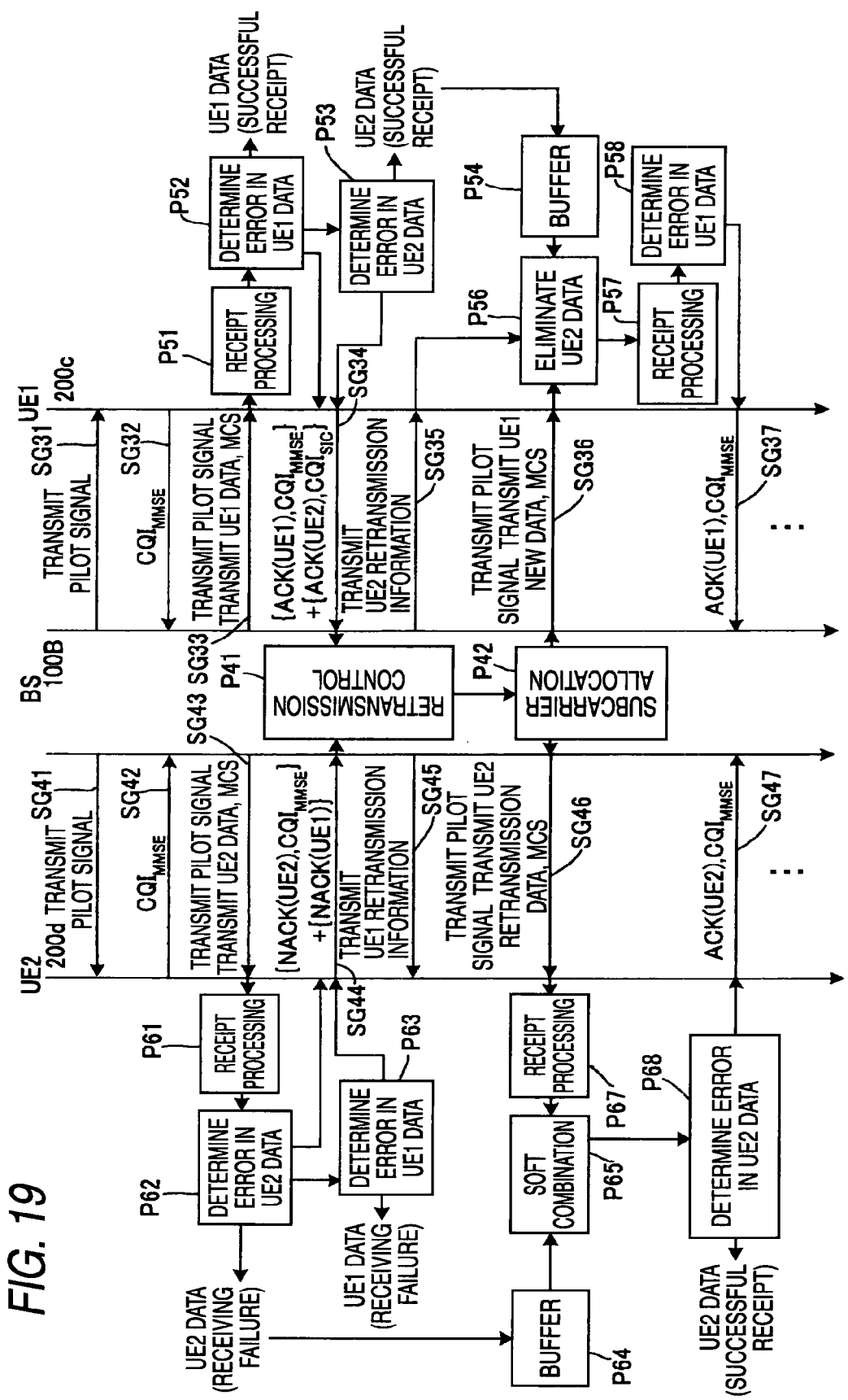
FIG. 19 is a sequence diagram showing principal operating sequence of the multi-user radio communication system of the third embodiment of the present invention.

Operations of respective sections of the multiuser radio communication system of the third embodiment shown in FIG. 18 will now be described in detail. FIG. 19 is a sequence diagram showing principal operation sequence of the multiuser radio communication system of the third embodiment. FIG. 19 shows operations performed when the one user equipment (UE1) 200c has successfully received a desired signal (UE1 data) and an interference signal (UE2 data) and when the other user equipment (UE2) 200d has failed to receive the desired signal (UE2 data) and the interference data (UE1 data).

First, the radio base station (BS) 100B transmits pilot signals (SG31 and SG41) to the respective user equipments (UE1) 200c and (UE2) 200d in order to determine an MCS at the time of downlink transmission. The respective user equipments 200c and 200d measure respective receiving SINRs by use of the received pilot signals and respectively feed back receiving quality, which represent receiving states, as $CQI_{MMSE}$ signals to the radio base station 100B (SG32, SG42).

In accordance with the $CQI_{MMSE}$ signals (corresponding to the receiving SINRs) fed back as control signals SG32 and SG42 from the respective user equipments 200c and 200d, the radio base station 100B determines an MCS; encodes data in compliance with corresponding degrees of modulation, and the like; and transmits the thus-coded data to the respective user equipments 200c and 200d (SG33, SG43). The radio base station 100B transmits the pilot signals, which are used for estimating channels of receiving ends and measuring CQIs of the same, in conjunction with the data at all times.

The respective user equipments 200c and 200d perform receipt processing, to thus extract and demodulate data pertaining to desired signals addressed to own stations and interference signals addressed to the other stations (P51 and P61). Further, a determination is made to determine an error in the demodulated data pertaining to the desired signals (P52 and P62). When receipt has been successfully performed, an ACK signal is fed back to the radio base station 100B. In contrast, when receipt has ended in a failure, a NACK signal is fed back to the radio base station 100B. Further, a determination is made as to whether or not an error exists in the demodulated data pertaining to the interference signal (P53, P63). When receipt has been performed successfully, an ACK signal is fed back to the radio base station 100B. When receipt has ended in a failure, a NACK signal is fed back to the radio base station 100B. Moreover, when the interference signal has been successfully received, the respective user equipments 200c and 200d store received data pertaining to their interference signals into buffers of the respective stations of interest. When receipt of the desired signals has ended in a failure, received data pertaining to desired signals including errors are stored in the buffers of the respective stations of interest.

In the embodiment shown in FIG. 19, since data pertaining to a desired signal and an interference signal have been properly received and receipt is successful, the user equipment 200c feeds back the ACK (UE1) signal and the $CQI_{MMSE}$ pertaining to the desired signal addressed to the own station and an $CQI_{SIC}$ signal achieved after elimination of the interference signal addressed to the other station and the ACK (UE2) signal relating thereto (SG34); and further stores the data pertaining to the successfully-received interference signal in the buffer (P54). Further, since data pertaining to a desired signal and an interference signal cannot have been properly received and receipt of the data is failure, the user equipment 200d feeds back a NACK (UE2) signal and a $CQI_{MMSE}$ relating to the desired signal addressed to the own station and a NACK (UE1) relating to an interference signal addressed to the other station (SG44), and stores data pertaining to the unsuccessfully-received desired signal in the buffer (P64). Further, the user equipment 200c outputs the successfully-received demodulated data (UE1 data).

When failed to receive a desired signal and successfully received an interference signal, the user equipment 200d feeds back to the radio base station 100B a NACK (UE2) signal and a $CQI_{MMSE}$ signal relating to the desired signal and a $CQI_{SIC}$ signal achieved after elimination of the interference signal and the ACK (UE1) signal relating thereto. When receipt of the interference signal has ended in a failure, only the NACK signal is transmitted, and feedback of the CQI that is demodulation information is not necessary.

In accordance with the control signal (the ACK/NACK signal) provided by means of a notification from the respective user equipments 200c and 200d, the radio base station 100B performs retransmission control as to whether or not to transmit new data during the next transmission operation or retransmission data (P41). In accordance with states of retransmission control, subcarriers of the multicarrier signals transmitted to the respective user equipments 200c and 200d are allocated (P42). In the embodiment shown in FIG. 19, the user equipment (UE1) 200c provides the radio base station 100B with a notification of the ACK (UE1) signal relating to a desired signal and the ACK (UE2) signal relating to an interference signal, and the user equipment (UE2) 200d provides the radio base station 100B with a notification of the NACK (UE2) signal relating to a desired signal and the NACK (UE1) signal pertaining to the interference signal. In this case, with a view toward enhancing the probability of successful receipt achieved by the user equipment 200d, the radio base station 100B makes a change in the allocation of communication resources. Specifically, a change is made to the allocation of subcarriers for the multicarrier signal to be transmitted to the user equipment 200c that has successfully received a desired signal and an interference signal, in such a way that data are not transmitted by means of some of the subcarriers.

The radio base station 100B transmits retransmission information about user equipments of the other stations to the respective user equipments 200c and 200d (SG35, SG45). Further, the radio base station 100B transmits retransmission data (SG46) to the user equipment 200d and new data (SG36) to the user equipment 200c. At this time, the radio base station 100B notifies the respective user equipments 200c and 200d of subcarrier allocation information by means of pilot signals, or the like. The MCS employed when the radio base station 100B transmits new data to the user equipment 200c is determined from the $CQI_{SIC}$ provided as the control signal SG34 by the user equipment 200c in the form of a notification; namely, a receiving status of the desired signal achieved in the case of elimination of the interference signal.

After having performed receipt processing (P67), the user equipment 200d to which retransmission data have been transmitted combines the received data of the past stored in the buffer by means of processing P64 with the currently-received retransmission data, by means of soft combining (P65). Subsequently, the user equipment 200d determines an error in the same fashion as in the case of first transmission operation (P68) and notifies the radio base station 100B of response control signals (the ACK (UE2) signal and the $CQI_{MMSE}$ signal in this case) according to the result of the determination (SG47).

In the meantime, the user equipment 200c determines whether or not the user equipment 200d, which is the other station, is in a state of retransmission. When transmission of a signal to the other station, which would cause an interference signal, is ascertained to be in the state of retransmission, data pertaining to the interference signal are eliminated from the signal being currently received by use of the received data pertaining to the interference signals of the past stored in the buffer by means of processing P54 (i.e., known interference signals) (P56). Subsequently, the user equipment 200c performs receipt processing (P57) and error determination processing (P58) as in the case of first transmission and notifies the radio base station 100B of response control signals (the ACK (UE1) signal and the $CQI_{MMSE}$ signal in this case) according to the result of a determination (SG37).

In the above-mentioned embodiment, when the radio base station 100B retransmits the signal to the user equipment 200d by means of processing P42 for changing communication resource allocations, data are not transmitted by means of some of the subcarriers of the multicarrier transmission signal SG36 transmitted to the other user equipment 200c; therefore, the amount of interference imposed on the user equipment 200d by means of the transmission signal SG36 achieved at this time is reduced, and the receiving SINR of the user equipment 200d is improved. As a consequence, the receiving SINR achieved after soft combination processing P65 is greatly improved, and the probability of successful receipt achieved by the user equipment 200d is enhanced.

At the time of retransmission of the signal addressed to the user equipment 200d, the user equipment 200c can eliminate, as a known signal, the signal addressed to the user equipment 200d that is an interference signal; hence, the receiving SINR of the user equipment 200c can be greatly enhanced. Accordingly, even when some of the subcarriers have not been used as the transmission signal SG36 addressed to the user equipment 200c, a high MCS can be selected after elimination of the signal addressed to the user equipment 200d that is an interference signal. Therefore, a throughput of the user equipment 200c is improved.

Since the number of retransmission operations performed by the user equipment 200d, which performs retransmission, can be reduced by means of the foregoing operations and since the throughput of the user equipment 200c that can have received an interference signal can be enhanced, a throughput of the entire system can be enhanced.

Figure 20:
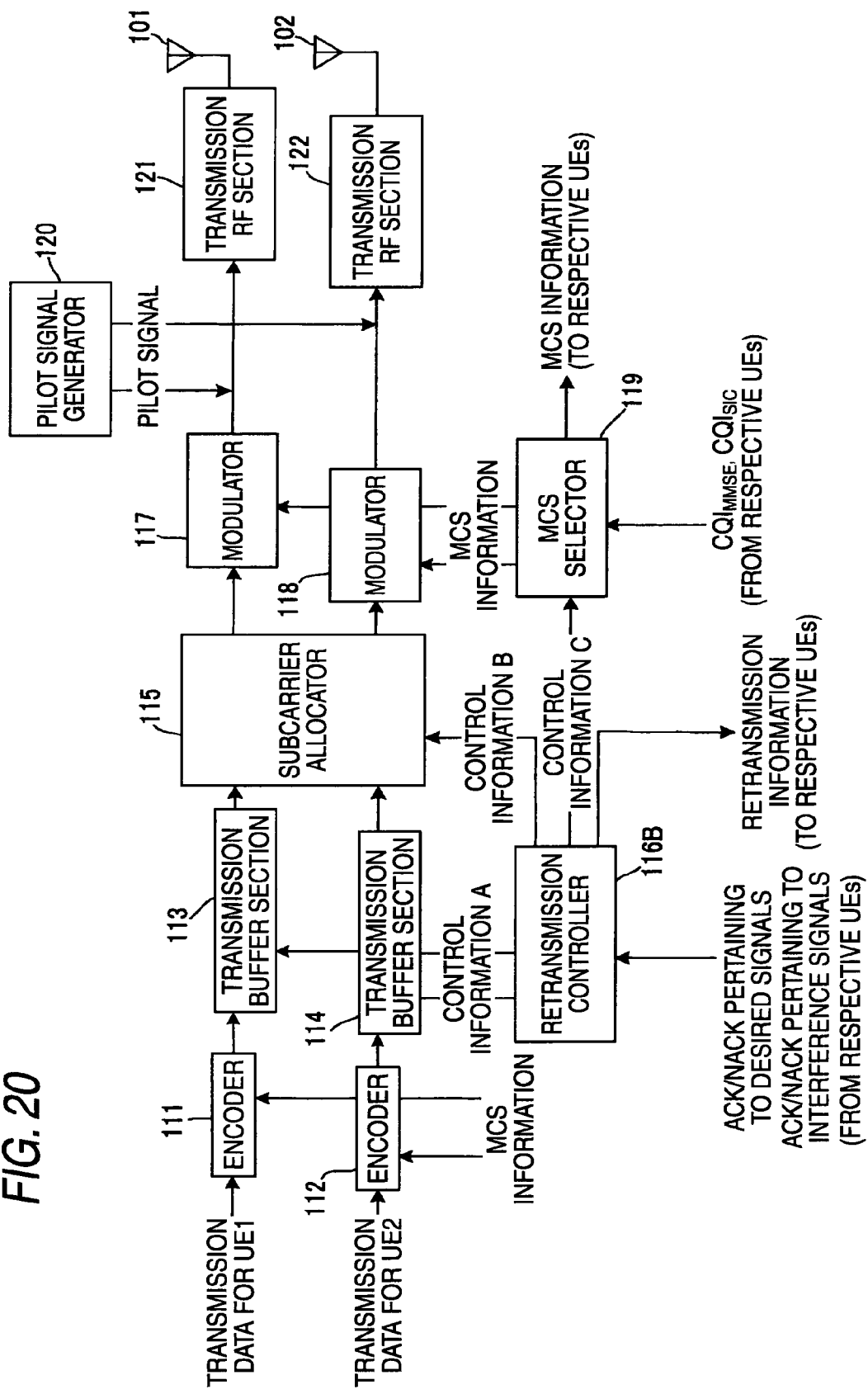
FIG. 20 is a block diagram showing an example configuration of a principal section of a radio base station in the multi-user radio communication system of the third embodiment.

The configuration and operation of the radio base station 100B will now be described. FIG. 20 is a block diagram showing an example configuration of the principal section of the radio base station in the multiuser radio communication system of the third embodiment.

The radio base station 100B is built from a plurality of encoders 111 and 112 corresponding to a plurality of users; a plurality of transmission buffer sections 113 and 114; a subcarrier allocator 115; a retransmission controller 116B, a plurality of modulators 117 and 118; an MCS selector 119; a pilot generator 120; a plurality of transmission RF sections 121 and 122; and a plurality of antennas 101 and 102. Explanations are given solely to features that differ from those of the radio base station 100 of the first embodiment shown in FIG. 3.

The retransmission controller 116B inputs ACK/NACK information about desired signals and ACK/NACK information about interference signals fed back from the respective user equipments 200c and 200d and generates a control signal from the pieces of ACK/NACK information. The retransmission controller 116B generates control information A showing retransmission/nonretransmission and inputs the control information to the transmission buffer sections 113 and 114. The retransmission controller 116B also generates control information B showing performance/non-performance of subcarrier allocation and input the information to the subcarrier allocator 115. The retransmission controller 116B also generates control information C showing use of either the $CQI_{MMSE}$ signal or the $CQI_{SIC}$ signal and input the information to the MCS selector 119. When data are retransmitted to the user equipment, the retransmission controller 116B outputs retransmission information about the other UE (a remote UE) to the respective user equipments 200c and 200d. The retransmission information is transmitted to the respective user equipments 200c and 200d by way of control channels of the radio signals.

When the control information B notifying performance of subcarrier allocation as the allocation of communication resources is input by the retransmission controller 116B, the subcarrier allocator 115 changes the allocation of subcarriers by means of operation, such as that shown in FIG. 5 or 6, as in the case with the first embodiment mentioned above. At this time, there is reduced the number of subcarriers allocated to the user equipment that has successfully received an interference signal and that has received a response of ACK information about the interference signal. The subcarrier allocator 115 implements the function of the communication resource setting section.

The MCS selector 119 determines an MCS in accordance with the $CQI_{MMSE}$ signal and the $CQI_{SIC}$ signal fed back from the respective user equipments 200c and 200d. At this time, the MCS selector 119 is notified of, as the control information C from the retransmission controller 116B, information about use of the normally-demodulated $CQI_{MMSE}$ or the $CQI_{SIC}$ achieved after elimination of an interference signal. The thus-determined MCS information is transmitted to the respective user equipments 200c and 200d by way of the control channels of the radio signals.

Operation of the retransmission controller 116B of the radio base station 110B will be described in detail. FIG. 21 is a view showing a relationship between the control information B about subcarrier allocations output from the retransmission controller in accordance with receiving statuses of the respective user equipments and the CQI signals generated by the respective user equipments, in the third and fourth embodiments of the present invention.

The retransmission controller 116B generates the pieces of control information A, B, and C from the ACK/NACK information about a desired signal and an interference signal fed back from each of the user equipment (UE1) 200c and the user equipment (UE2) 200d, in accordance with the receiving statuses of the respective user equipments; and inputs the thus-generated pieces of control information to the transmission buffer sections 113 and 114, the subcarrier allocator 115, and the MCS selector 119, respectively. The retransmission controller 116B, at this time, inputs the control information A representing retransmission/nonretransmission to the transmission buffer sections 113 and 114; transmits new data to the user equipment received the ACK signal; and notifies the user equipment received the NACK signal of transmission of retransmission data. Since the control information A can be generated by use of a common generation flow as in the case of the related art, its explanation will be omitted here.

The retransmission controller 116B inputs the control information B showing performance/non-performance of subcarrier allocation to the subcarrier allocator 115; and, when the control information acts as a condition for performing subcarrier allocation as a change to the allocation of communication resources in accordance with the recording status of each of the user equipments, sends a notification to the effect. The relationship between the control information B and the CQI signal conforming to the receiving status of each of the user equipments is as shown in FIG. 21. Conditions for changing the allocation of communication resources include two conditions: namely, (A) a case where an ACK signal relating to a desired signal is received from one of the user equipments 200c and 200d, where a NACK signal relating to a desired signal is received from the other user equipment, and where an ACK is received, in connection with the interference signal, from the user equipment received the ACK pertaining to the desired signal (corresponding to (3), (4), (9), and (13) shown in FIG. 21) and (B) a case where a NACK signal relating to a desired signal is received from both user equipments and where an ACK signal relating to an interference signal is received from at least one of the user equipments (corresponding to (11), (12), and (15) in FIG. 21). The third embodiment is based the assumption of the condition (A), and the condition (B) will be described in connection with a fourth embodiment provided below.

The retransmission controller 116B inputs the control information C pertaining to the CQI to the MCS selector 119 and provides a notification of use of which one of the CQI signals in accordance with respective receiving statuses of the user equipment (UE1) 200c and the user equipment (UE2) 200d. As shown in FIG. 21, in relation to the CQI signals fed back from the respective user equipments 200c and 200d, the respective user equipments are notified of which one of the $CQI_{MMSE}$ signal achieved at the time of normal demodulation operation and the $CQI_{SIC}$ signal achieved after elimination of an interference signal is used for each condition at the time of next transmission, in accordance with the receiving statuses of the respective user equipments.

Figure 22:
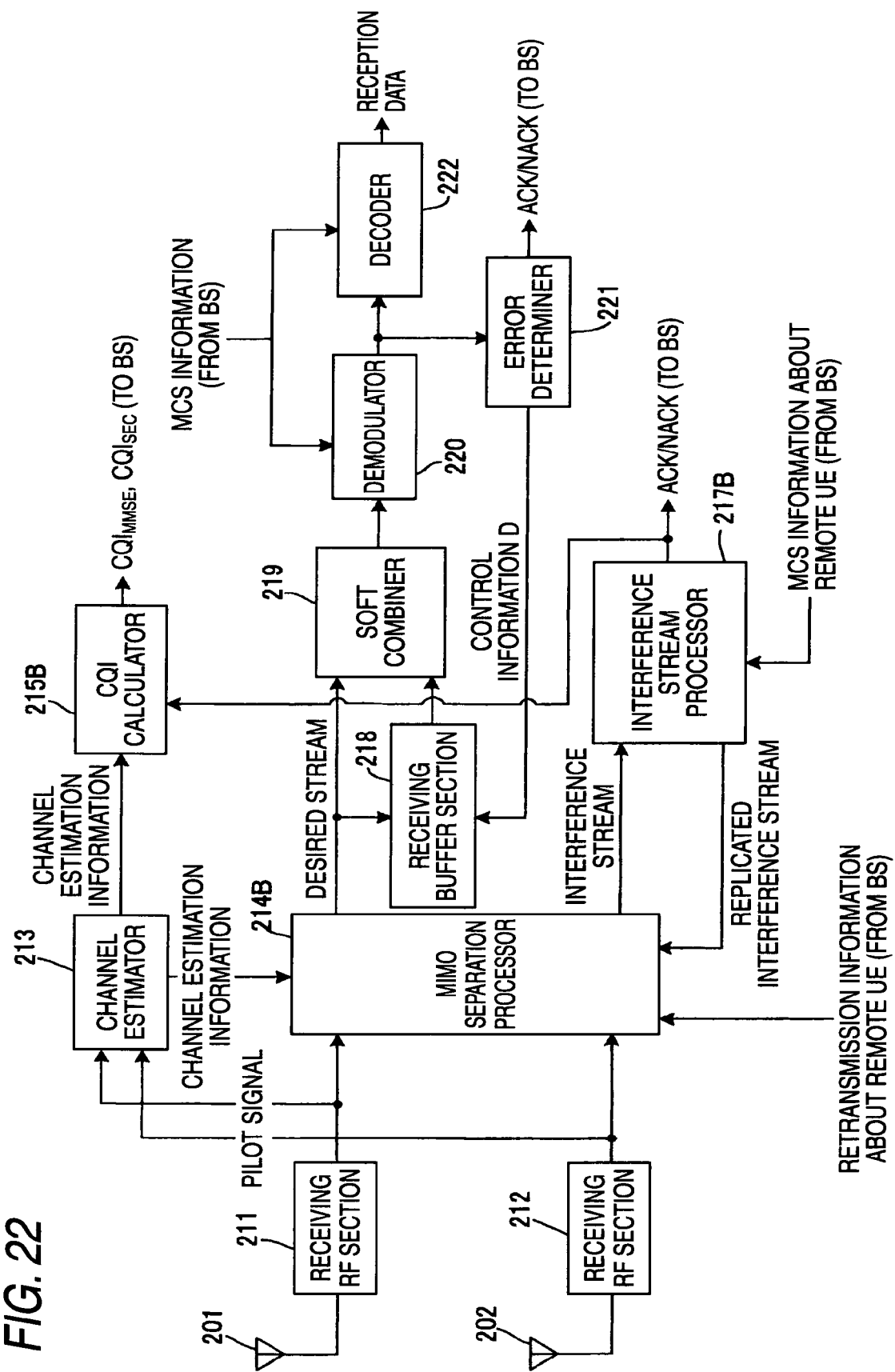
FIG. 22 is a block diagram showing an example configuration of a principal section of the user equipment in the multiuser radio communication system of the third embodiment.

The specific configuration and operation of the user equipments 200c and 200d will now be described in detail. FIG. 22 is a block diagram showing an example configuration of the principal section of the user equipment in the multiuser radio communication system of the third embodiment. Provided that the two user equipments 200c and 200d are analogous to each other in terms of a configuration and an operation, only the example configuration of the user equipment 200c will be provided here.

The user equipment 200c is made up of a plurality of antennas 201 and 202; the plurality of receiving RF sections 211 and 212; the channel estimator 213; a MIMO separation processor 214B; a CQI calculator 215B; an interference stream processor 217B; the receiving buffer section 218; the soft combiner 219; the demodulator 220; the error determiner 221; and the decoder 222. Explanations are herein provided solely to a difference between the user equipments 200a and 200b of the first embodiment shown in FIG. 7 and the user equipment of the present embodiment.

The CQI calculator 215B calculates a receiving SINR of a desired signal addressed to the own station (the user equipment 200c: UE1) from the channel estimation information, thereby computing a $CQI_{MMSE}$ signal. When a control signal ACK (UE2) showing successful receipt of an interference signal addressed to another station (a user equipment 200d: UE2) is input from the interference stream processor 217B, the CQI calculator 215B also computes a $CQI_{SIC}$ signal which would be achieved when an interference signal addressed to the other station (the remote UE (UE2)), which also acts as an interference signal, is eliminated.

The MIMO separation processor 214B subjects a received signal including signals addressed to a plurality of user equipments to signal separation processing, thereby respectively extracting a desired stream (a desired signal addressed to the own station) and interference streams (interference signals addressed to other stations). The desired stream output from the MIMO separation processor 214B are input to the soft combiner 219 and the receiving buffer section 218.

When the desired stream output from the MIMO separation processor 214B is a stream acquired from a signal received at the time of first transmission from the radio base station 100B, the stream is not subjected to internal processing of the soft combiner 219. The desired stream output from the soft combiner 219 is demodulated by the demodulator 220. After being decoded by the next decoder 222, the stream is output as received data.

Meanwhile, the interference stream output from the MIMO separation processor 214B is input to the interference stream processor 217B. The interference stream processor 217B generates a replicated interference stream and inputs the thus-generated stream to the MIMO separation processor 214B. The interference stream processor 217B generates the control signal ACK or NACK according to a result of successful/unsuccessful receipt of the signal addressed to the remote UE (i.e., an interference stream). The control signal ACK/NACK pertaining to the interference stream is transmitted and fed back to the radio base station 100B as a response signal as in the case of the control signal ACK/NACK pertaining to the desired stream addressed to the own station. The interference stream processor 217B implements the function of the interference signal buffer section and the function of a receiving status response section, and the MIMO separation processor 214B implements the function of the interference signal demodulator and the function of the interference signal eliminator.

Detailed configurations and operations of the interference stream processor 217B, the MIMO separation processor 214B, and the CQI calculator 215B will be described hereinbelow.

Figure 23:
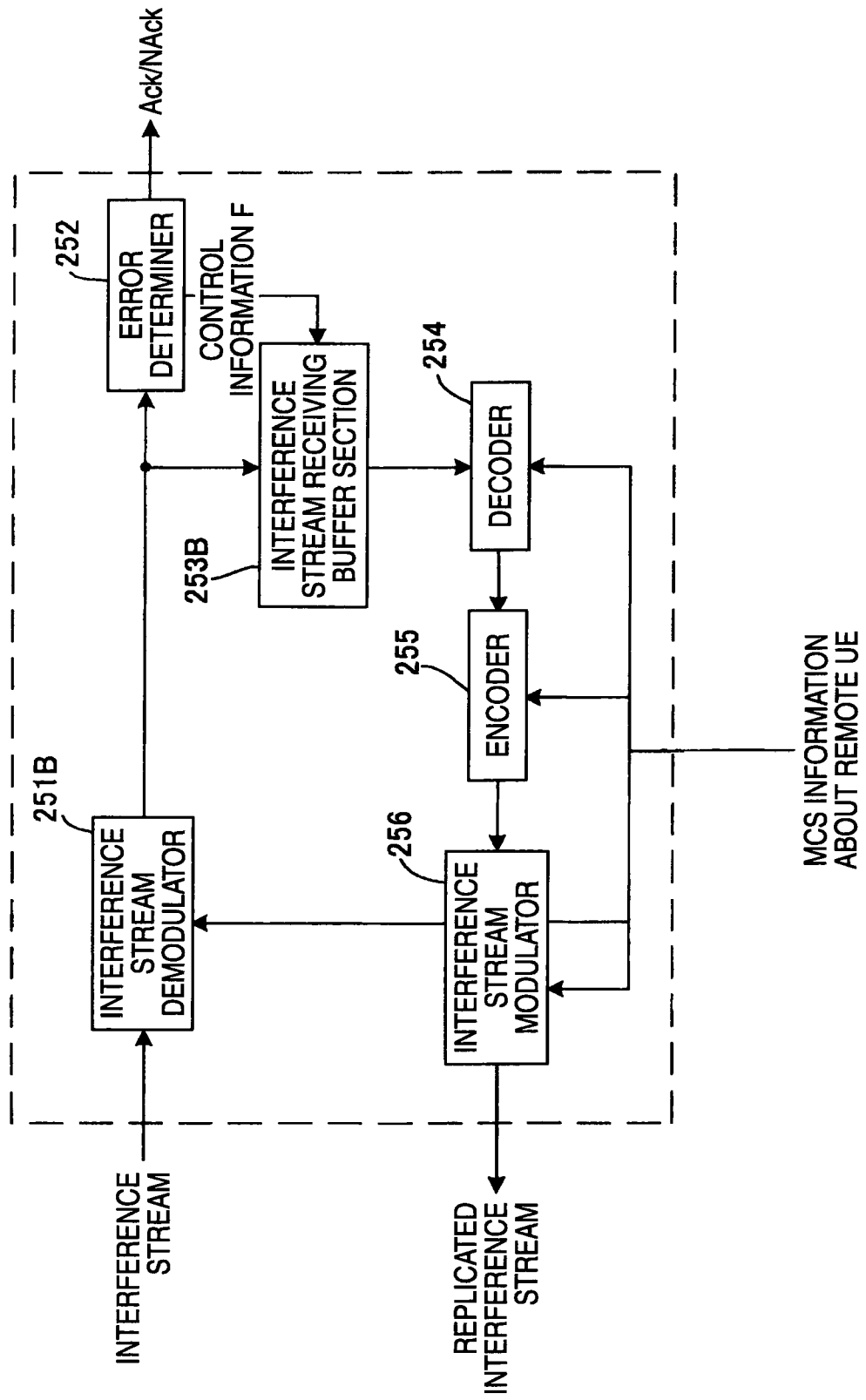
FIG. 23 is a block diagram showing an example configuration of an interference stream processor in the user equipment shown in FIG. 22.

FIG. 23 is a block diagram showing an example configuration of the interference stream processor in the user equipment shown in FIG. 22.

The interference stream processor 217B has an interference stream demodulator 251B, the error determiner 252, an interference stream receiving buffer section 253B, a decoder 254, an encoder 255, and an interference stream modulator 256.

The interference stream demodulator 251B demodulates an interference stream input to the interference stream processor 217B in accordance with MCS information about the remote user equipment (the remote UE) notified by the radio base station 100B. The thus-demodulated interference stream is input to the error determiner 252 and the interference stream receiving buffer section 253. The error determiner 252 performs an error determination by means of CRC, thereby generating ACK/NACK information about the interference stream. The ACK/NACK information about the interference stream is input as control information F into the interference stream receiving buffer section 253B and is fed back to the radio base station 100B.

When control information showing ACK is input to the interference stream receiving buffer section 253B, the interference streams of the past stored in the buffer are input to the decoder 254, where the stream is decoded in accordance with the MCS information about the remote UE.

With the assumption of use of a configuration for performing Chase combination, the decoded interference stream is input to the encoder 255, where the stream is encoded in accordance with MCS information about the remote UE. The thus-encoded interference stream is input to the interference stream modulator 256, where the stream is modulated in accordance with the MCS information about the remote UE. With the assumption of use of a configuration that performs IR, an interference stream achieved through first transmission differs from an interference stream achieved through retransmission; hence, a replicated interference stream is generated so as to conform to the interference stream to be retransmitted in accordance with redundancy version (RV) information. The interference stream modulated by the interference stream modulator 256 is input as a replicated, noise-canceled interference stream to the MIMO separation processor 214B.

When a determination about receipt of the interference stream is NG and when control information showing NACK is input to the interference stream receiving buffer section 253B, the decoder 254 does not perform decoding operation, and the interference stream modulator 256 does not generate any replicated interference stream.

Figure 24:
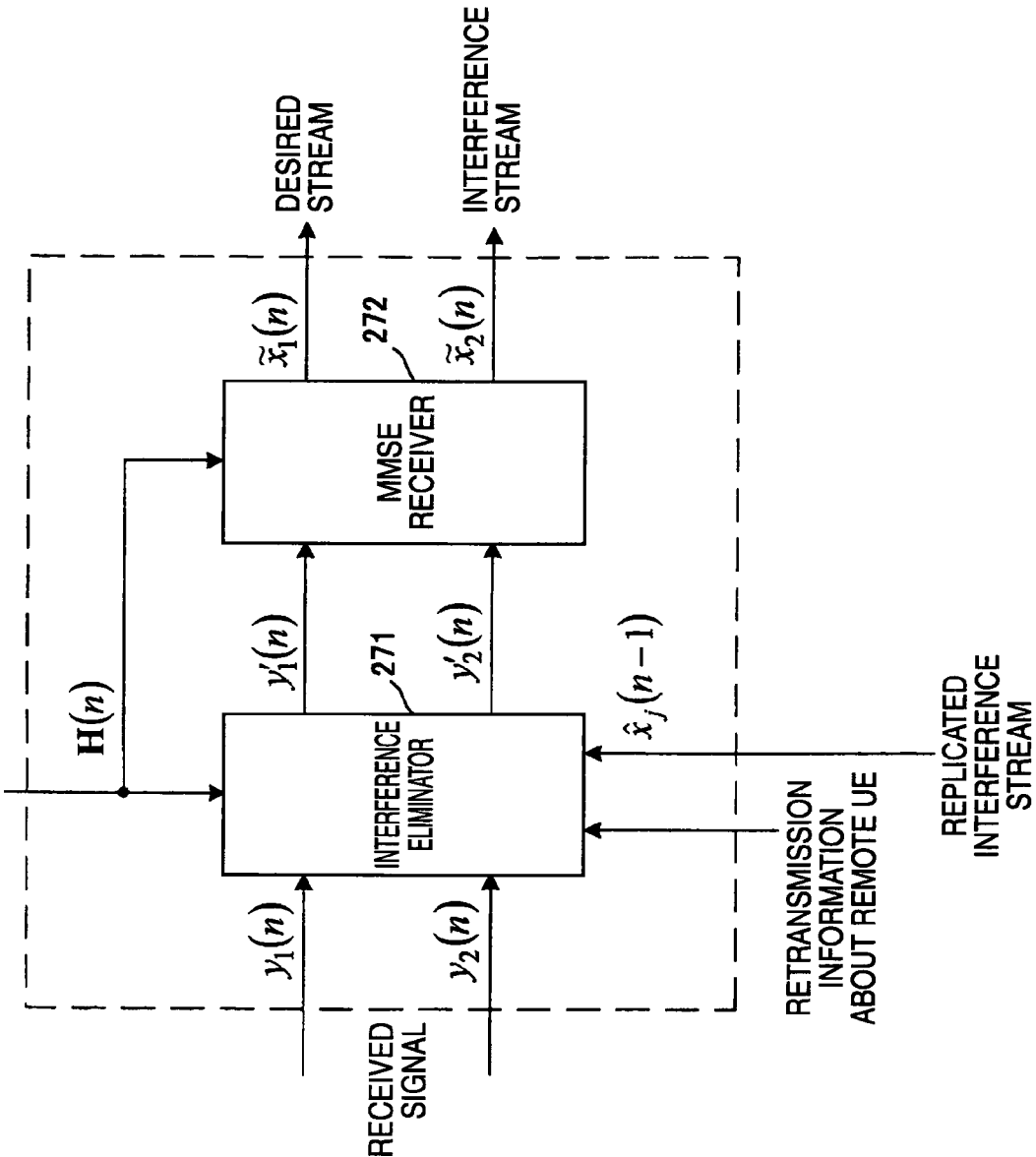
FIG. 24 is a block diagram showing an example configuration of a MIMO separation processor in the user equipment shown in FIG. 22.

FIG. 24 is a block diagram showing an example configuration of a MIMO separation processor of the user equipment shown in FIG. 22. The MIMO separation processor 214B is made up of an interference eliminator 271 and an MMSE receipt processor 272 and separates a received signal into a desired stream and an interference stream.

The interference eliminator 271 eliminates received-signal interference components from input, received signals $y_1(n)$ and $y_2(n)$ through use of channel estimation information H, a replicated interference stream, and retransmission information about the remote UE. The replicated interference stream is expressed by Equation (5) provided below.

[Equation 5]

$$\hat{x}_j(n-1)(j=1 \text{ or } 2) \qquad (5)$$

Reference symbol "n" in the received signal and the replicated interference stream denotes receipt processing of the $n^{th}$ signal.

Provided that a transmission signal vector is x(n); a received signal vector is y(n); channel estimation information is H(n); and a noise vector is n(n), a received signal vector y(n) is expressed by Equation (6) provided below.

[Equation 6]

$$y(n) = H(n)x(n) + n(n) \quad (6)$$

$$\rightarrow \begin{bmatrix} y_1(n) \\ y_2(n) \end{bmatrix} = [h_1(n), h_2(n)] \begin{bmatrix} x_1(n) \\ x_2(n) \end{bmatrix} + \begin{bmatrix} n_1(n) \\ n_2(n) \end{bmatrix}$$

Transmission signal vector: $x(n) = [x_1(n)\ x_2(n)]^T$
Received signal vector: $y(n) = [y_1(n)\ y_2(n)]^T$
Channel estimation information $H(n) = [h_1(n)\ h_2(n)]$
$$= \begin{bmatrix} h_1(n) & h_2(n) \\ h_3(n) & h_4(n) \end{bmatrix}$$
Noise vector: $n(n) = [n_1(n)\ n_2(n)]^T$
T: Transposed Matrix In the interference eliminator 271, retransmission information about the remote UE represents performance of retransmission in response to a signal NACK. When a replicated interference stream is input, interference elimination processing is performed. Provided that $x_2(n)$ is an interference stream, an interference elimination output y'(n) can be represented as provided by the following Equation (7).

[Equation 7]

$$y'(n) = y(n) - h_2(n)\hat{x}_2(n-1) \quad (6)$$

$$\rightarrow \begin{bmatrix} y'_1(n) \\ y'_2(n) \end{bmatrix} = \begin{bmatrix} y_1(n) - h_2\hat{x}_2(n-1) \\ y_2(n) - h_4\hat{x}_2(n-1) \end{bmatrix} + \begin{bmatrix} n_1(n) \\ n_2(n) \end{bmatrix}$$

Interference Elimination Output: $y'(n) = [y'_1(n)\ y'_2(n)]^T$

When retransmission information about the remote UE represents ACK or when the replicated interference stream is not input, interference elimination processing is not performed, and y'(n)=y(n) is yielded.

The MMSE receipt processor 272 generates a receiving wait matrix from channel estimation information and multiplies a received signal by the receiving wait matrix, thereby extracting a desired stream and an interference stream. A desired stream and an interference stream output from the MMSE receipt processor 272 can be expressed as provided by the following Equation (8).

[Equation 8]

$$\tilde{x}_n = W^T(n)y'(n) \quad (8)$$

$$\rightarrow \begin{bmatrix} \tilde{x}_1(n) \\ \tilde{x}_2(n) \end{bmatrix} = [w_1(n)\ w_2(n)] \begin{bmatrix} y'_1(n) \\ y'_2(n) \end{bmatrix}$$

$$w_1(n) = (H^*(n)H^T(n) + I_2/N(n))^{-1} h_1^*(n)$$
$$w_2(n) = (H^*(n)H^T(n) + I_2/N(n))^{-1} h_2^*(n)$$

Desired stream: $\tilde{x}_1(n)$
Interference stream: $\tilde{x}_2(n)$
Receiving wait matrix: $W(n) = [w_1(n)\ w_2(n)]$
*Complex conjugate
where $N(n)$ represents noise power, and
$I2$ represents a two-dimensional unit matrix.

The present embodiment illustrates an example in which MMSE (Minimum Mean Square Error) receiving is performed; however, Zero Forcing (ZF) receiving or MLD receiving can also be performed.

The CQI calculator 215B shown in FIG. 22 computes a receiving SINR from channel estimation information, thereby calculating $CQI_{MMSE}$ and $CQI_{SIC}$. $CQI_{MMSE}$ and $CQI_{SIC}$ are values obtained by quantizing the value of the receiving SINR.

Provided that a receiving SINR achieved when MMSE receiving is performed is taken as $\gamma_1(n)$ and that a receiving SINR achieved when SIC receiving is performed is taken as $\gamma_2(n)$, the receiving SINR can be expressed as provided by the following Equation (9).

[Equation 9]

$$\gamma_1(n) = \frac{w_j^T(n)h_j(n)}{1 - w_j^T(n)h_j(n)} \quad (9)$$

$$\gamma_2(n) = \frac{|h_j(n)|^2}{N(n)}$$

$$j = 1 \text{ or } 2$$

As mentioned above, in the third embodiment, when a receiving status of one user equipment (UE1) 200c shows successful receipt of a desired signal and an interference signal and when a receiving status of the other user equipment (UE2) 200d shows unsuccessful receipt of a desired signal and successful/unsuccessful receipt of an interference signal, the user equipment 200c demodulates a signal addressed to the user equipment 200d of the other station that is an interference signal and stores the thus-demodulated signal in the buffer. Subcarriers are allocated in such a way that a lot of communication resources are distributed to the user equipment that performs retransmission. When the signal addressed to the other station (UE2) is retransmitted during the next transmission, stored information about the interference signal of the past can be utilized for eliminating an interference stream. Hence, a receiving SINR of the user equipment of the own station (UE1) is enhanced, and user throughput is improved. Further, the amount of interference imposed on the user equipment (UE2) 200d from the signal addressed to the user equipment (UE1) 200c during retransmission is reduced, so that enhancement of the receiving SINR and an improvement in probability of successful receipt can be attained. Consequently, the number of retransmission operations can be reduced, and user throughput of the user equipment (UE2) 200d is also enhanced. Therefore, entire system throughput can be significantly enhanced.

Fourth Embodiment

A fourth embodiment shows a case that differs from the third embodiment in terms of the receiving statuses of the respective user equipments. The fourth embodiment differs from the third embodiment in terms of the configuration and operation of a radio base station 100C.

Figure 25A:
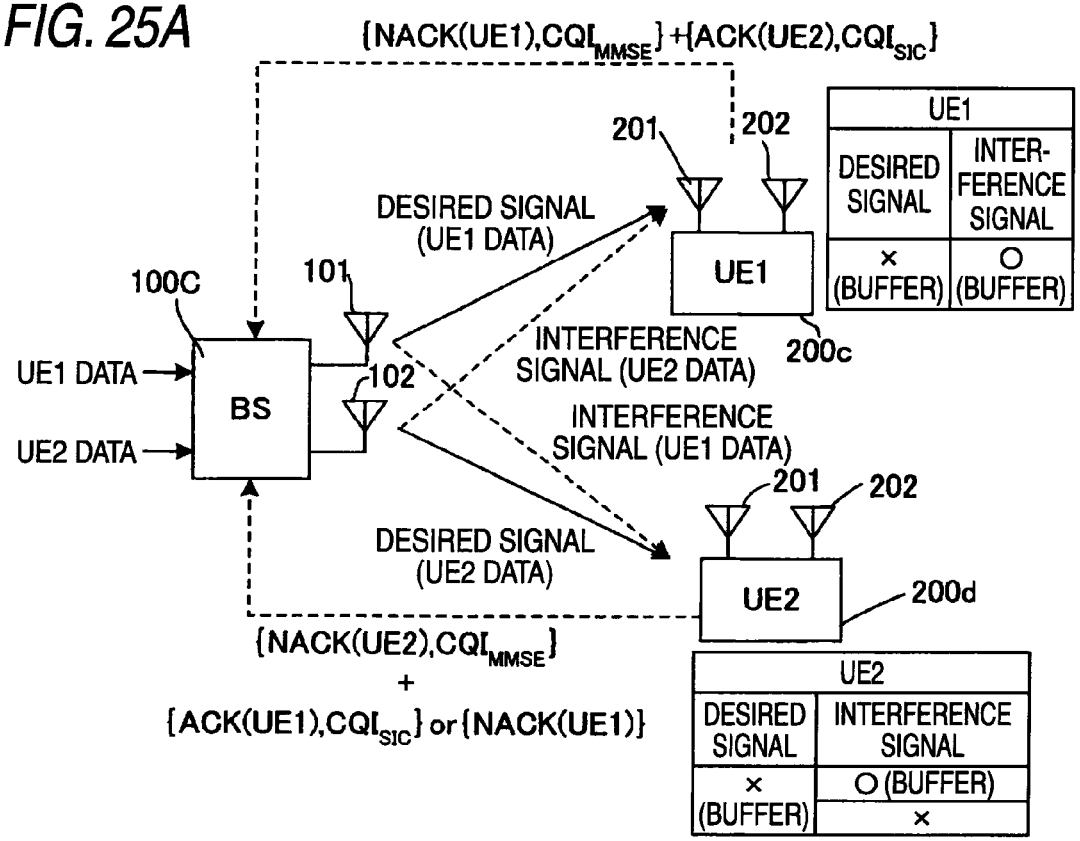
FIGS. 25A and 25B are block diagrams showing a schematic configuration and operation of the multiuser radio communication system of the fourth embodiment of the present invention.
Figure 25B:
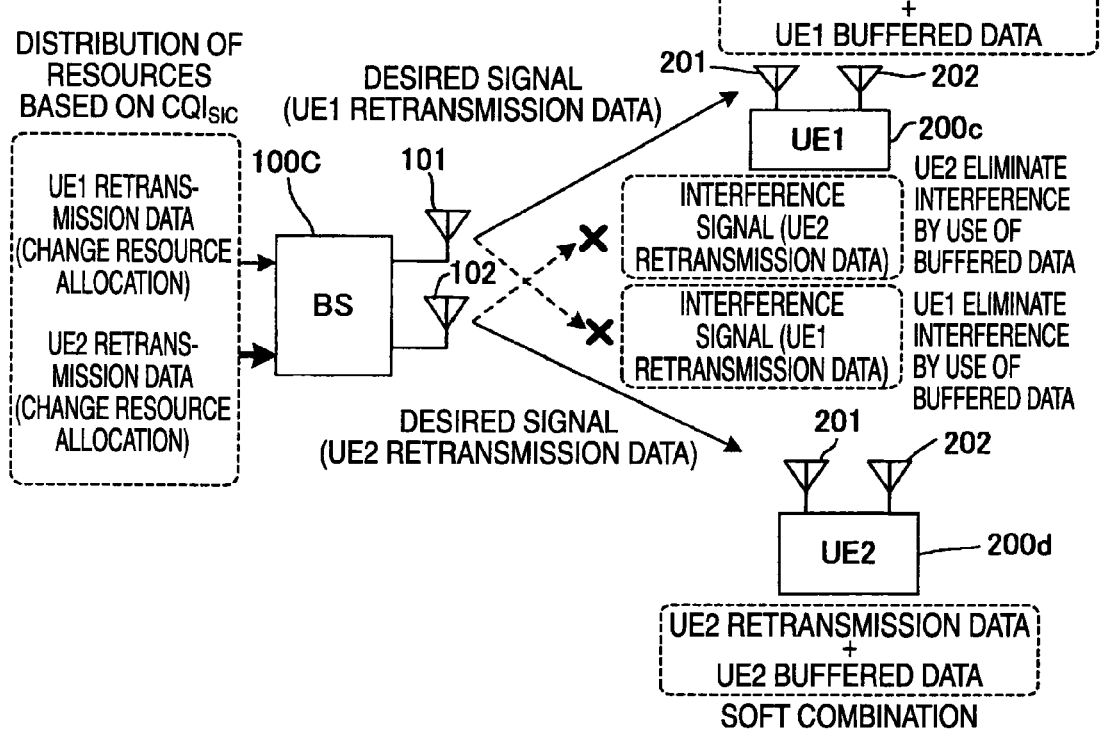

FIGS. 25A and 25B are block diagrams showing the schematic configuration and operation of a multiuser radio communication system of the fourth embodiment of the present invention. FIG. 25A shows first transmission, and FIG. 25B shows retransmission that is the second operation.

As shown in FIG. 25A, the fourth embodiment is based on the assumption that both the user equipment (UE1) 200c and the user equipment (UE2) 200d failed to receive a desired signal during first transmission and where at least one of the user equipments successfully received an interference signal.

Specifically, there will be described operation corresponding to condition (B) in the conditions for changing communication resource allocation described by reference to FIG. 21; namely, receiving statuses (11), (12), and (15) in FIG. 21.

In this case, the user equipment 200c notifies the radio base station 100C of the NACK (UE1) signal and the $CQI_{MMSE}$ of the desired signal and the ACK (UE2) signal and the $CQI_{SIC}$ of the interference signal. The user equipment 200c buffers received data pertaining to the unsuccessfully-received desired signal and received data pertaining to the successfully-received interference signal. In the meantime, the user equipment 200d notifies the radio base station 100C of the NACK (UE2) signal and the $CQI_{MMSE}$ of the desired signal and the ACK (UE1) signal and the $CQI_{SIC}$ of the interference signal or the NACK (UE1) signal. The user equipment 200d buffers received data pertaining to the unsuccessfully-received desired signal or received data pertaining to the interference signal when the interference signal has been successfully received.

As shown in FIG. 25B, the radio base station 100C changes distribution of communication resources during second transmission (during retransmission to the UE1 and UE2) in accordance with the $CQI_{SIC}$ of the interference signals fed back from the respective user equipments. Specifically, resources are distributed predominantly to the user equipment that has a poor receiving SINR after elimination of the interference signal. The fourth embodiment shows, as an example modification to the communication resource allocation, an example change in subcarrier allocation (scheduling) used for communication, as in the first and third embodiments. In connection with each of the user equipments, determining an MCS from a $CQI_{SIC}$ achieved in the state of elimination of an interference signal and setting the degree of signal modulation, and the like, are performed at the time of retransmission.

Each of the user equipments 200c and 200d performs receipt processing for eliminating an interference signal addressed to another user equipment that has been extracted from the received signal and buffered, thereby improving a receiving SINR achieved at the time of retransmission. The signal that is again transmitted from the radio base station 100C to the one user equipment at the time of retransmission is an interference signal that is already known to the other user equipment. Therefore, the other user equipment can reliably eliminate (subtract) the interference signal received at the time of retransmission by use of data pertaining to the interference signals of the past held in the buffer.

The allocation of communication resources is changed in accordance with the $CQI_{SIC}$ of the interference signals from the respective user equipments at the time of retransmission, whereby a receiving SINR is improved. Further, each of the user equipments combines the desired signal received in the past with the desired signal received during retransmission by means of soft combination processing, whereby a receiving SINR of a combined signal is greatly improved, and the probability of successful receipt of the user equipment is enhanced. Thus, even when a desired signal cannot be normally received, an interference signal is demodulated and utilized, and the allocation of communication resources is changed in accordance with receiving results of respective signals, whereby great enhancement of entire throughput of the user equipments (UE1, UE2) 200c and 200d of the multiple users can be expected.

Figure 26:
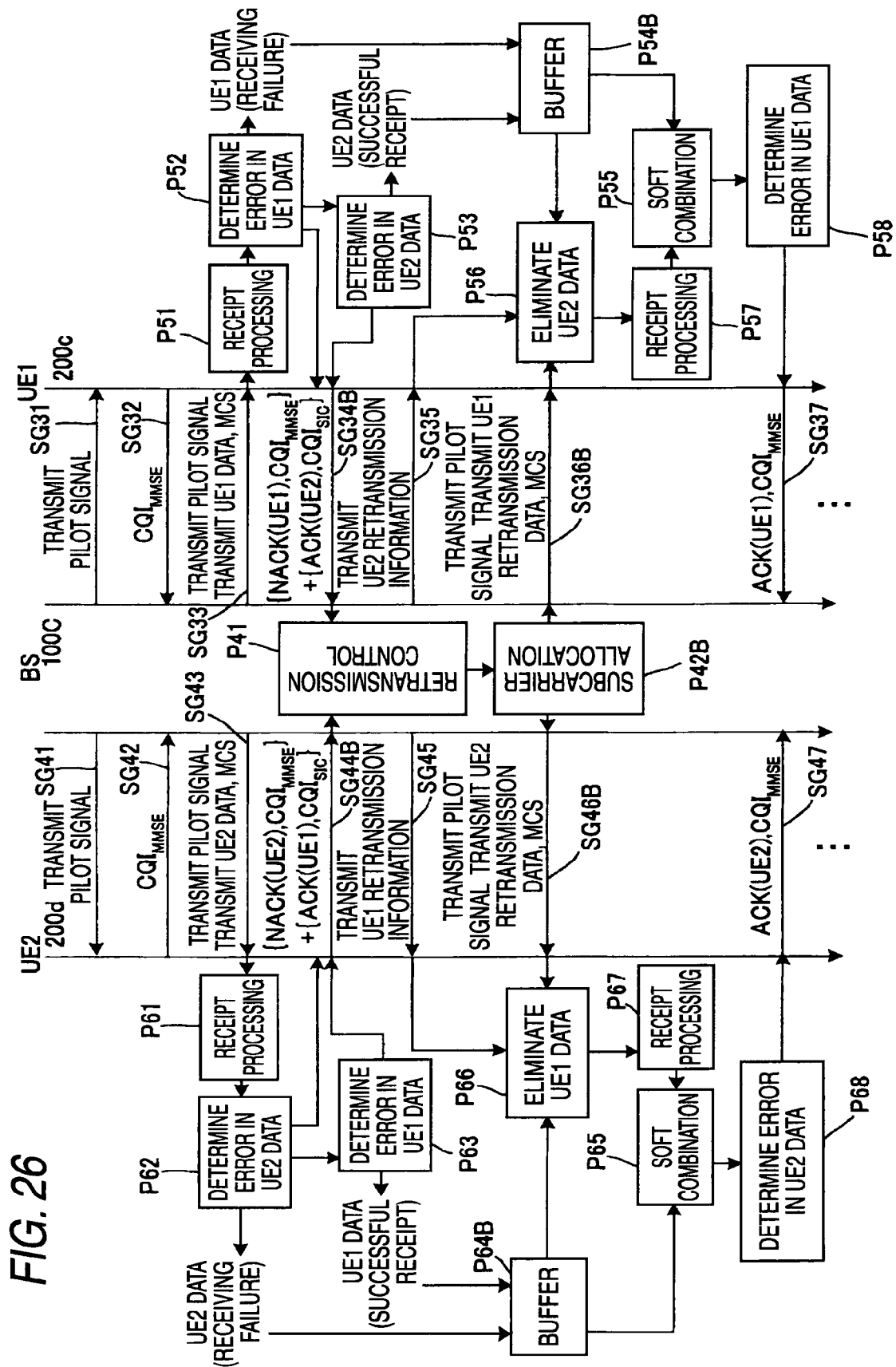
FIG. 26 is a sequence diagram showing the principal operation sequence of the multiuser radio communication system of the fourth embodiment of the present invention.

Next, detailed explanations are provided for operations of respective sections in the multiuser radio communication system of the fourth embodiment shown in FIGS. 25A and 25B. FIG. 26 is a sequence diagram showing the principal operation sequence of the multiuser radio communication system of the fourth embodiment. FIG. 26 shows operation achieved when both user equipments (UE1) 200c and (UE2) 200d failed to receive their desired signals (UE1 data and UE2 data) and successfully received their interference signals (UE2 data and UE1 data).

In the embodiment shown in FIG. 26, the user equipment 200c remains failed to receive data pertaining to a desired signal and successfully received data pertaining to an interference signal and, hence, feeds back the NACK (UE1) signal and the $CQI_{MMSE}$, both of which pertain to a desired signal addressed to the own station, the ACK (UE2) signal pertaining to an interference signal addressed to the remote station, and the $CQI_{SIC}$ achieved by removal of the interference signal (SG34B), and also stores data pertaining to the unsuccessfully-received desired signal and data pertaining to the successfully-received interference signal into the buffer (P54B). The user equipment 200d remains failed to receive data pertaining to a desired signal and successfully received data pertaining to an interference signal and, hence, feeds back the NACK (UE2) signal and the $CQI_{MMSE}$, both of which pertain to a desired signal addressed to the own station, the ACK (UE1) signal pertaining to an interference signal addressed to the remote station, and the $CQI_{SIC}$ achieved by removal of the interference signal (SG44B), and also stores data pertaining to the unsuccessfully-received desired signal and data pertaining to the successfully-received interference signal into the buffer (P64B).

The radio base station 100C allocates subcarriers of multicarrier signals transmitted to the respective user equipments 200c and 200d in accordance with a state of retransmission control (P41) (P42B). In an embodiment shown in FIG. 26, the user equipment (UE1) 200c notifies the radio base station 100C of the NACK (UE1) signal pertaining to the desired signal and the ACK (UE2) pertaining to the interference signal, and the user equipment (UE2) 200d notifies the radio base station 100C of the NACK (UE2) signal pertaining to the desired signal and the ACK (UE1) pertaining to the interference signal. In this case, the pieces of $CQI_{SIC}$ fed back from the respective user equipments are compared with each other. The allocation of communication resources is changed in such a way that the user equipment having a smaller $CQI_{SIC}$ is prioritized. At this time, the allocation of subcarrier to the multicarrier signal transmitted to the user equipment having a low priority level is changed in such a way that data are not transmitted by way of some of the sub-carriers.

The radio base station 100C transmits retransmission information about the user equipments of the remote stations to the respective user equipments 200c and 200d (SG35, SG45). Further, the radio base station 100C transmits retransmission data to the user equipments 200c and 200d, respectively, (SG36B, SG46B). At this time, the radio base station 100C notifies the respective user equipments 200c and 200d of information about subcarrier allocation by means of pilot signals, and the like.

Each of the respective user equipments 200c and 200d to which the retransmission data have been transmitted determines whether or not the user equipment of the other station is in the state of retransmission and eliminates data pertaining to an interference signal from a signal that is currently being received, by use of received data (i.e., a known interference signal) pertaining to the interference signals of the past stored in the buffer through processing P54B and P64B when ascertained that transmission to the other station, which would cause an interference signal, is in a state of retransmission (P56, P66). After performed receipt processing (P57, P67) as in the case of first transmission, the user equipments 200c and 200d combine, by means of soft combining, currently-received retransmission data with the received data of the past stored in the buffers through processing P54B and P64B (P55, P65). Subsequently, the user equipments 200c and 200d perform error determination as in the case of first transmission (P58, P68) and notify the radio base station 100C of response control signals (the ACK(UE1) signal and the $CQI_{MMSE}$, and the ACK (UE2) signal and the $CQI_{MMSE}$) in accordance with determination results (SG37 and SG47).

Figure 27:
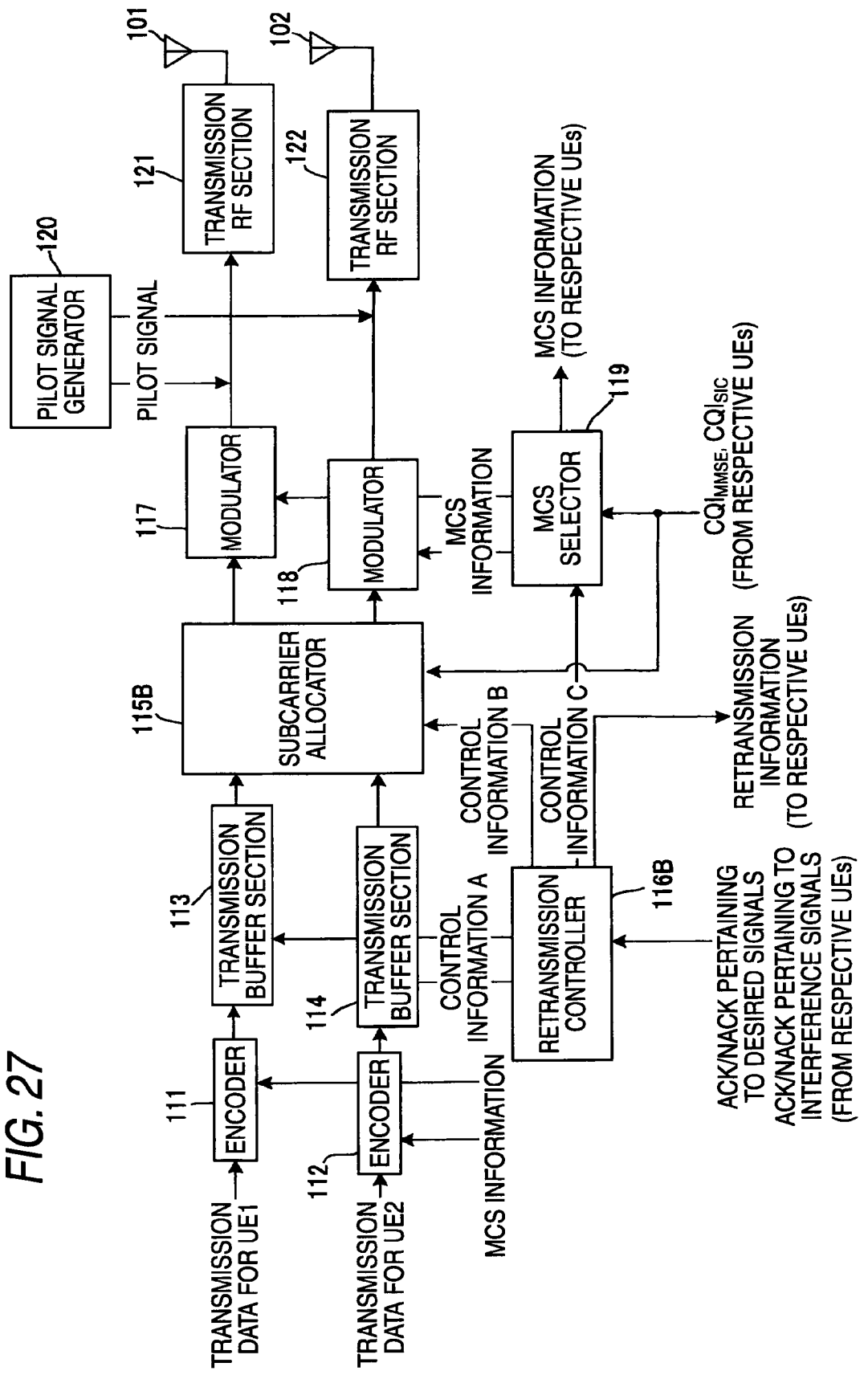
FIG. 27 is a block diagram showing an example configuration of the principal section of the radio base station in the multiuser radio communication system of the fourth embodiment.

The configuration and operation of the radio base station 100C of the fourth embodiment will now be described. FIG. 27 is a block diagram showing an example configuration of the principal section of the radio base station in the multiuser radio communication system of the fourth embodiment.

The radio base station 100C of the fourth embodiment differs from its counterpart of the third embodiment in terms of operation of the subcarrier allocator 115B. In other respects, the radio base station of the fourth embodiment is analogous to its counterpart of the third embodiment shown in FIG. 20. Since the subcarrier allocator 115B must retransmit desired signals to the user equipments (UE1) 200c and the user equipment (UE2) 200d, the subcarrier allocator allocates subcarriers in preference to either of the user equipments. A control signal B from the retransmission controller 116B notifying performance of subcarrier allocation and the pieces of $CQI_{SIC}$ from the respective user equipments 200c and 200d are input to the subcarrier allocator 115B. In accordance with the pieces of $CQI_{SIC}$ fed back from the respective user equipments 200c and 200d, the subcarrier allocator 115B prioritizes allocation of subcarriers to one user equipment.

Figure 28:
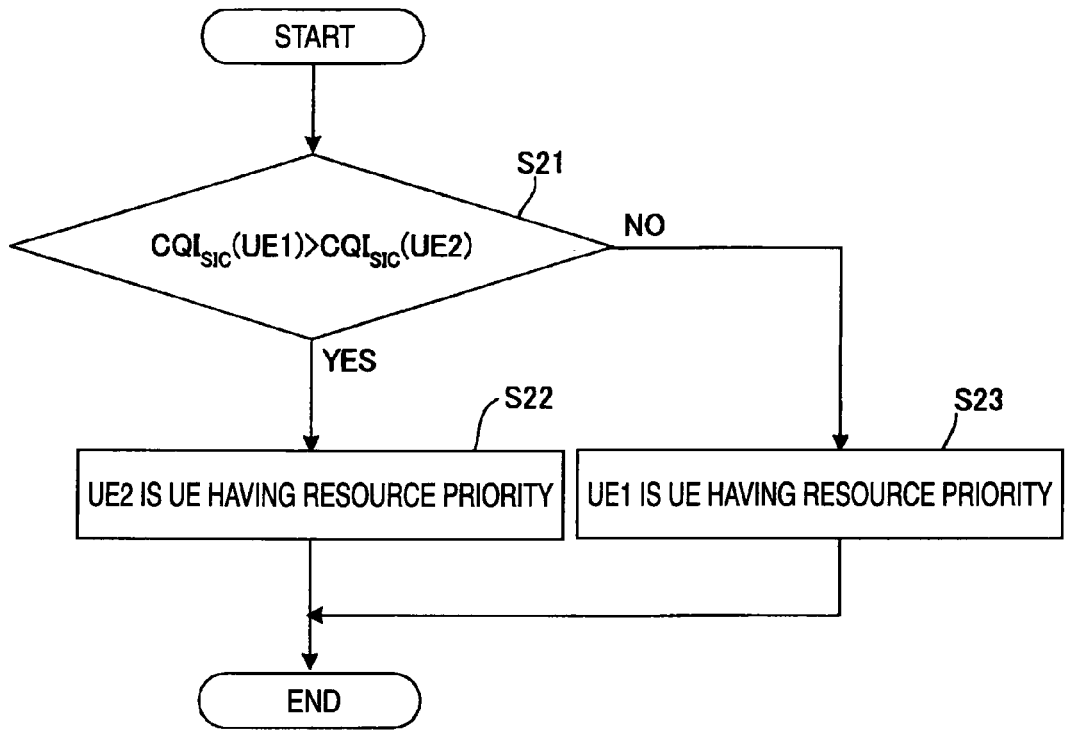
FIG. 28 is a flowchart showing operation of a subcarrier allocator of the fourth embodiment.

FIG. 28 is a flowchart showing operation of the subcarrier allocator of the fourth embodiment. In step S21, the subcarrier allocator 115B compares the pieces of $CQI_{SIC}$ fed back from the respective user equipments 200c and 200d with each other. When the $CQI_{SIC}$ (UE1) from the user equipment 200c is greater than the $CQI_{SIC}$ (UE2) from the user equipment 200d, processing proceeds to step S22, where the user equipment 200d (UE2) is set as a resource priority UE whose communication resource allocation is to be prioritized and where subcarrier allocation is performed. In the meantime, when the $CQI_{SIC}$ (UE1) from the user equipment 200c is smaller than the $CQI_{SIC}$ (UE2) from the user equipment 200d, processing proceeds to step S23, where the user equipment 200c (UE1) is set as a resource priority UE and where subcarrier allocation is performed.

Specifically, the user equipment fed back a relatively-low-level CQI is taken as a resource priority UE, and subcarrier allocation is performed. When both of the user equipments failed to receive desired signals and when only one of the user equipments successfully received an interference signal, the user equipment failed to receive an interference signal acts as a resource priority UE.

Figure 29A:
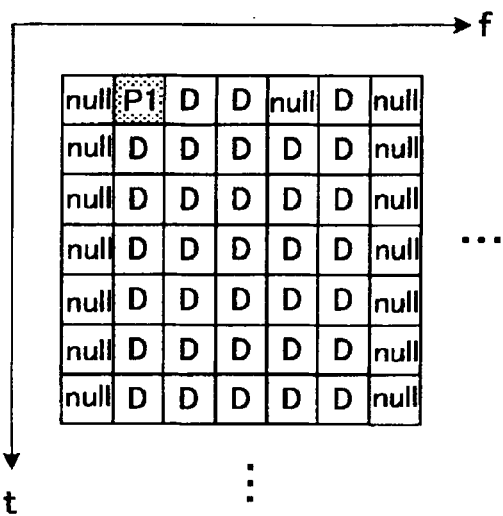
FIGS. 29A and 29B are schematic diagrams showing example allocation of a subcarrier pertaining to a transmission signal in the radio base station of the fourth embodiment.
Figure 29B:
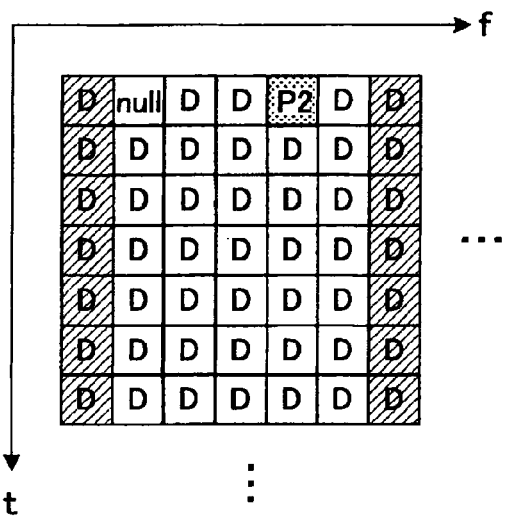

FIGS. 29A and 29B are schematic diagrams showing example subcarrier allocation relating to a transmission signal in the radio base station of the fourth embodiment. In FIGS. 29A and 29B, reference symbol "f" designates a frequency; "t" designates a time; P1 and P2 designate pilot signals; D designates data; and "null" designates no data, respectively.

FIG. 29A shows subcarrier allocation relating to a multicarrier signal (transmission data for a non-resource priority UE) transmitted to a non-resource priority UE that is not a resource priority UE for retransmission after subcarrier allocation. FIG. 29B shows subcarrier allocation relating to a multicarrier signal (transmission data for a resource priority UE) transmitted to a resource priority UE for retransmission after subcarrier allocation.

In this case, data are allocated to all of subcarriers of the multicarrier signal in connection with the resource priority UE. In the meantime, null is allocated to some of the subcarriers in connection with the non-resource priority UE, thereby protecting the remote user equipment (the resource priority UE) from occurrence of inter-user interference in subcarriers of specific frequencies. At a frequency of a subcarrier indicated by a hatch shown in FIG. 29B, transmission data addressed to the non-resource priority UE are null as shown in FIG. 29A, and an interference signal for the other user is not present. Thus, the resource priority UE is less susceptible to interference, and a receiving SINR for retransmission is significantly improved. The non-resource priority UE also must undergo retransmission in the fourth embodiment when compared with the third embodiment; hence, the number of subcarriers allocated null becomes smaller than the number of subcarriers allocated at the time of new transmission.

As mentioned above, in the fourth embodiment, even when both user equipments (UE1) 200c and (UE2) 200d failed to receive desired signals, receipt of an interference signal is determined. When at least one of the user equipments successfully received an interference signal, the interference signal is demodulated and stored in the buffer. Subcarriers are allocated in accordance with the pieces of $CQI_{SIC}$ fed back from the respective user equipment. When desired signals are retransmitted to the respective user equipments at the time of the next transmission, information about the interference signal of the past stored in at least one user equipment can be utilized for eliminating an interference stream; hence, the probability of successful receipt by both user equipments can be enhanced by subcarrier allocation. As a consequence, throughput of each of the user equipment is enhanced, and entire system throughput can be significantly enhanced.

Fifth Embodiment

A fifth embodiment is an example in which the third embodiment is partially changed, and is based on a case where the present invention is applied to the multiuser radio communication system configured in the same manner as that shown in FIG. 18. In the fifth embodiment, a slight modification is made to the configuration and operation of a radio base station 100D; however, the radio base station is analogous to its counterpart of the third embodiment in other respects. Elements corresponding to those described in connection with the third embodiment are assigned the same reference numerals through the drawings, and detailed explanations about the configuration and operation of the elements analogous to those described in connection with the third embodiment are omitted.

Figure 30:
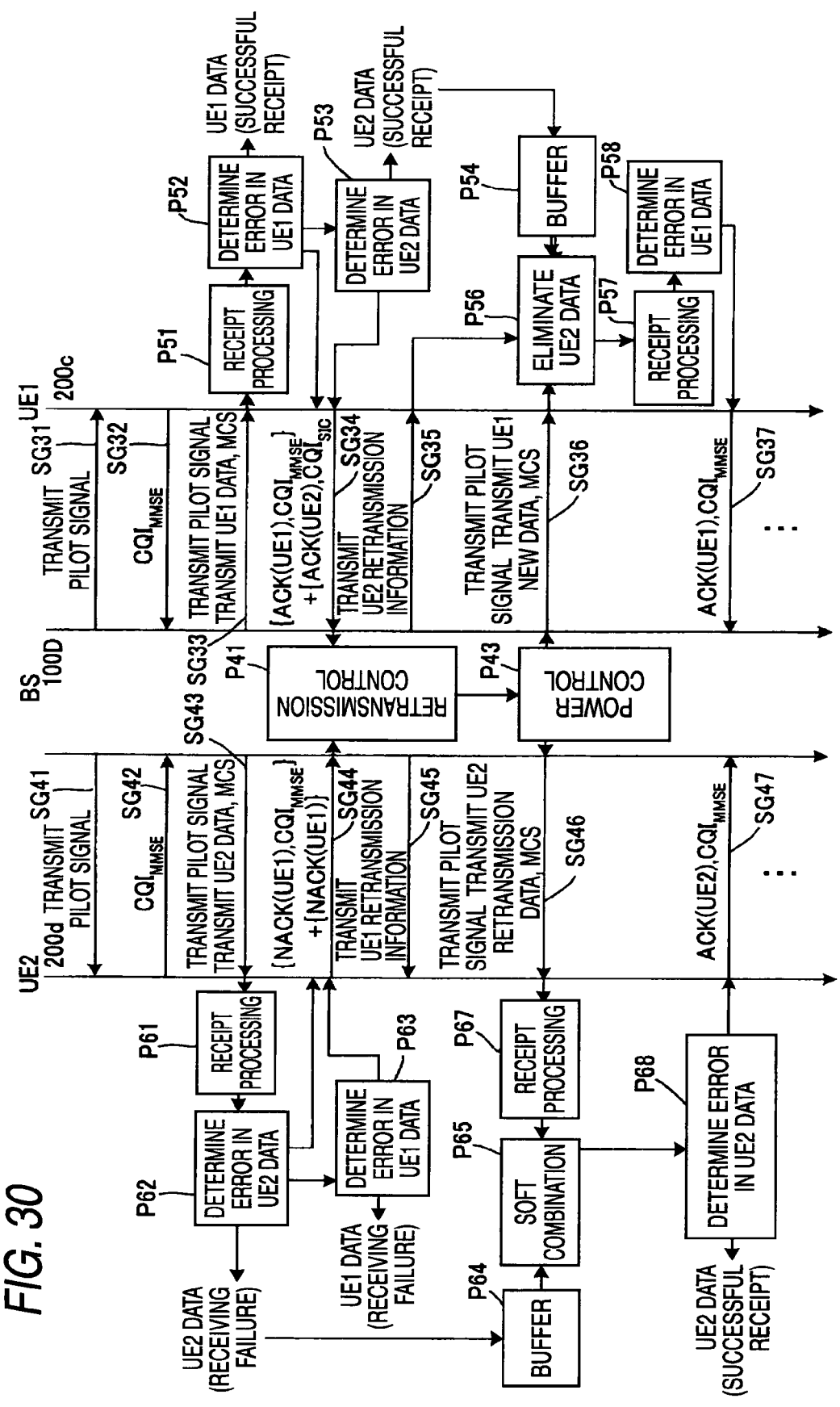
FIG. 30 is a sequence diagram showing the principal operation sequence of the multiuser radio communication system of a fifth embodiment of the present invention.

FIG. 30 is a sequence diagram showing the principal operation sequence of the multiuser radio communication system of the fifth embodiment. FIG. 30 shows operation performed when one user equipment (UE1) 200c successfully received a desired signal (UE1 data) and an interference signal (UE2 data) and when the other user equipment (UE2) 200d failed to receive the desired signal (UE2 data) and the interference signal (UE1 data), as in the case shown in FIG. 19.

The fifth embodiment shows, as an example modification to communication resource allocation, an example in which a change is made to allocation of transmission power to the respective user equipments. A radio base station (BS) 100D receives ACK/NACK control signals that are responses from the respective user equipments (UE1, UE2) 200c and 200d, and performs retransmission control processing P41 as in the third embodiment. Subsequently, processing for controlling power of transmission signals transmitted to the respective user equipments 200c and 200d is performed as communication resource distribution processing in accordance with the state of retransmission control (P43).

Power control processing P43 is processing for controlling, as communication resource distribution, a relative ratio of transmission power of a signal that is to be transmitted from an antenna 101 of the radio base station 100D and that is addressed to the user equipment (UE1) 200c to transmission power of a signal that is to be transmitted from an antenna 102 and that is addressed to the user equipment (UE2) 200d. When a signal is retransmitted to the user equipment (UE2) 200d that requires retransmission as a consequence of retransmission control processing P41, priority is provided to the user equipment (UE2) 200d that performs retransmission, and a distribution is changed in such a way that greater transmission power is allocated to the user equipment (UE2) 200d than to the other user equipment (UE1) 200c that does not perform retransmission. Similar transmission power allocation is performed even when the user equipment (UE2) 200d failed to receive a desired signal and successfully received only an interference signal.

Figure 31:
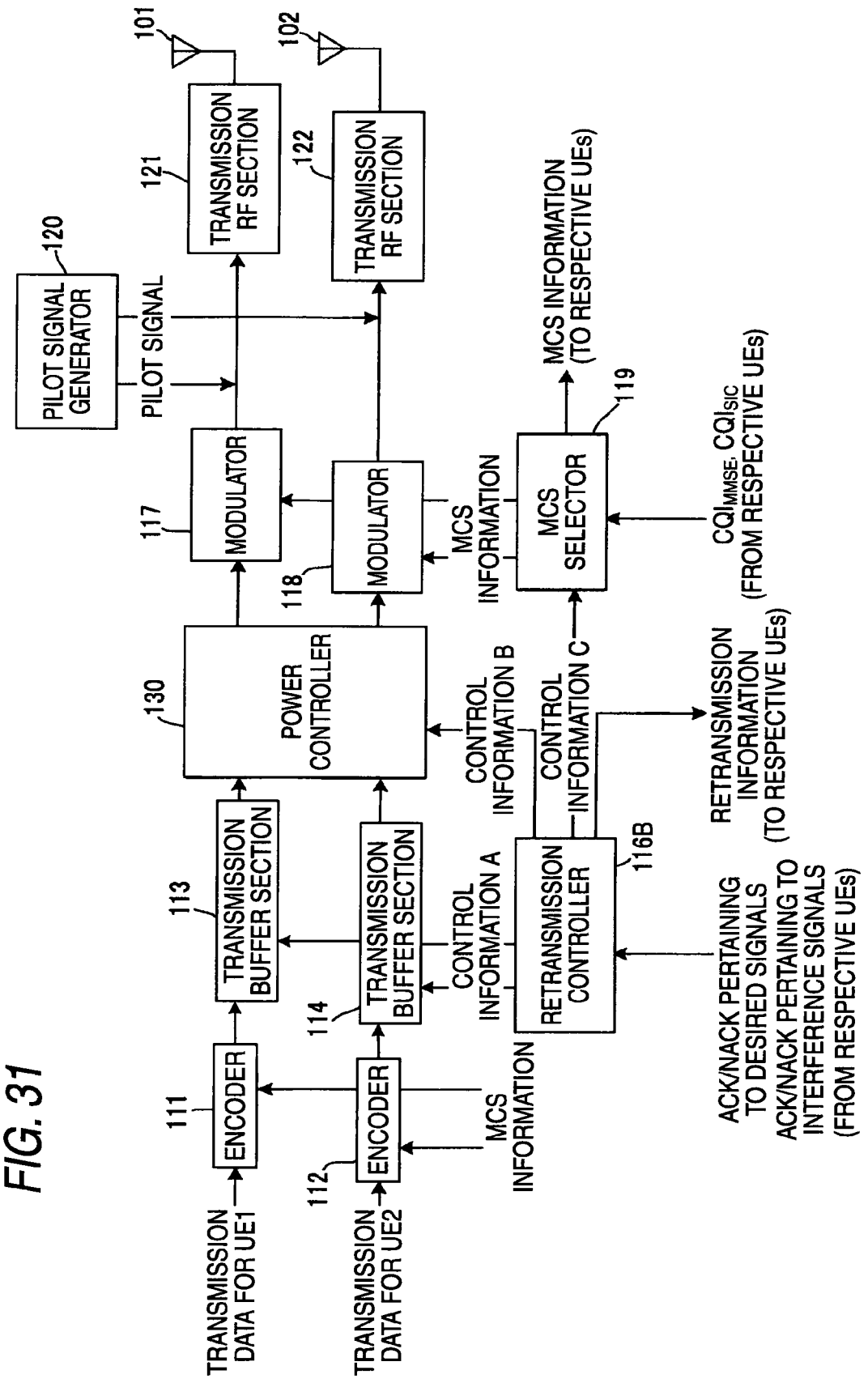
FIG. 31 is a block diagram showing an example configuration of the principal section of the radio base station in the multiuser radio communication system of the fifth embodiment.

The configuration and operation of the radio base station 100D of the fifth embodiment will now be described. FIG. 31 is a block diagram showing an example configuration of the principal section of the radio base station in the multiuser radio communication system of the fifth embodiment.

The radio base station 100D of the fifth embodiment is made up of the plurality of encoders 111 and 112 and the plurality of transmission buffer sections 113 and 114, which are respectively assigned to a plurality of users; the retransmission controller 116B; the plurality of modulators 117 and 118; the MCS selector 119; the pilot generator 120; the plurality of transmission RF sections 121 and 122; the plurality of antennas 101 and 102; and the power controller 130. Specifically, the power controller 130 is provided in place of the subcarrier allocator 115 in the configuration of the third embodiment shown in FIG. 20, and the radio base station is analogous to its counterpart of the third embodiment in other respects.

When the control information B showing performance of transmission power allocation as communication resource allocation is input from the retransmission controller 116B, the power controller 130 makes a change to transmission power allocation by means of; for instance, operation, such as that shown in FIG. 15 or 16, as in the case of the second embodiment. At this time, transmission power is allocated in such a way that greater transmission power is allocated to the user equipment received a response of NACK information pertaining to a desired signal; namely, a user equipment that has failed to receive a desired signal and performs retransmission.

As mentioned above, in the fifth embodiment, when one user equipment (UE1) 200c remains successfully received a desired signal and an interference signal and when the other user equipment (UE2) 200d remains failed to receive a desired signal and successfully or unsuccessfully received an interference signal, the user equipment 200c demodulates the signal, which is an interference signal and which is addressed to the user equipment 200d of the other station, and stores the signal in the buffer. Transmission power allocation is performed in such a way that a larger communication resource is allocated to the user equipment that performs retransmission. As a result, when the signal addressed to the other station (UE2) is retransmitted by means of the next transmission, information pertaining to the stored interference signal of the past can be utilized for eliminating an interference stream. Hence, a receiving SINR of the user equipment (UE1) of the own station is enhanced, and user throughput is improved. Further, the amount of interference on the user equipment (UE2) 200d from the signal addressed to the user equipment (UE1) 200c during retransmission is reduced, so that enhancement of the receiving SINR and an improvement in the probability of successful receipt can be attained. Consequently, the number of retransmission operations can be reduced, and the user throughput of the user equipment (UE2) 200d is enhanced. Therefore, entire system throughput can also be significantly improved. Further, the amount of interference originating from the other user equipment is reduced by transmission power control, and hence communication resource control performed by the base station becomes easier as in the case of the third embodiment as compared with the third embodiment.

Sixth Embodiment

A sixth embodiment shows a case where receiving statuses of the respective user equipments differ from those described in connection with the fifth embodiment. The sixth embodiment differs from the fifth embodiment in terms of the configuration and operation of a radio base station 100E. Specifically, the sixth embodiment is an example embodied by modifying a portion of the fourth embodiment and is based on the assumption that the present invention is applied to a multiuser radio communication system configured in the same manner as shown in FIG. 25. The sixth embodiment describes a condition (B) in the conditions for modifying the communication resource allocation described by reference to FIG. 21; namely, operation corresponding to receiving statuses shown in FIGS. 21(11), (12), and (15). Elements, which are shown in the drawings and which correspond to those described in connection with the fourth and fifth embodiments, are assigned the same reference numerals, and detailed descriptions about the configuration and operation of the elements that are the same as those described in connection with the fourth and fifth embodiments are omitted.

Figure 32:
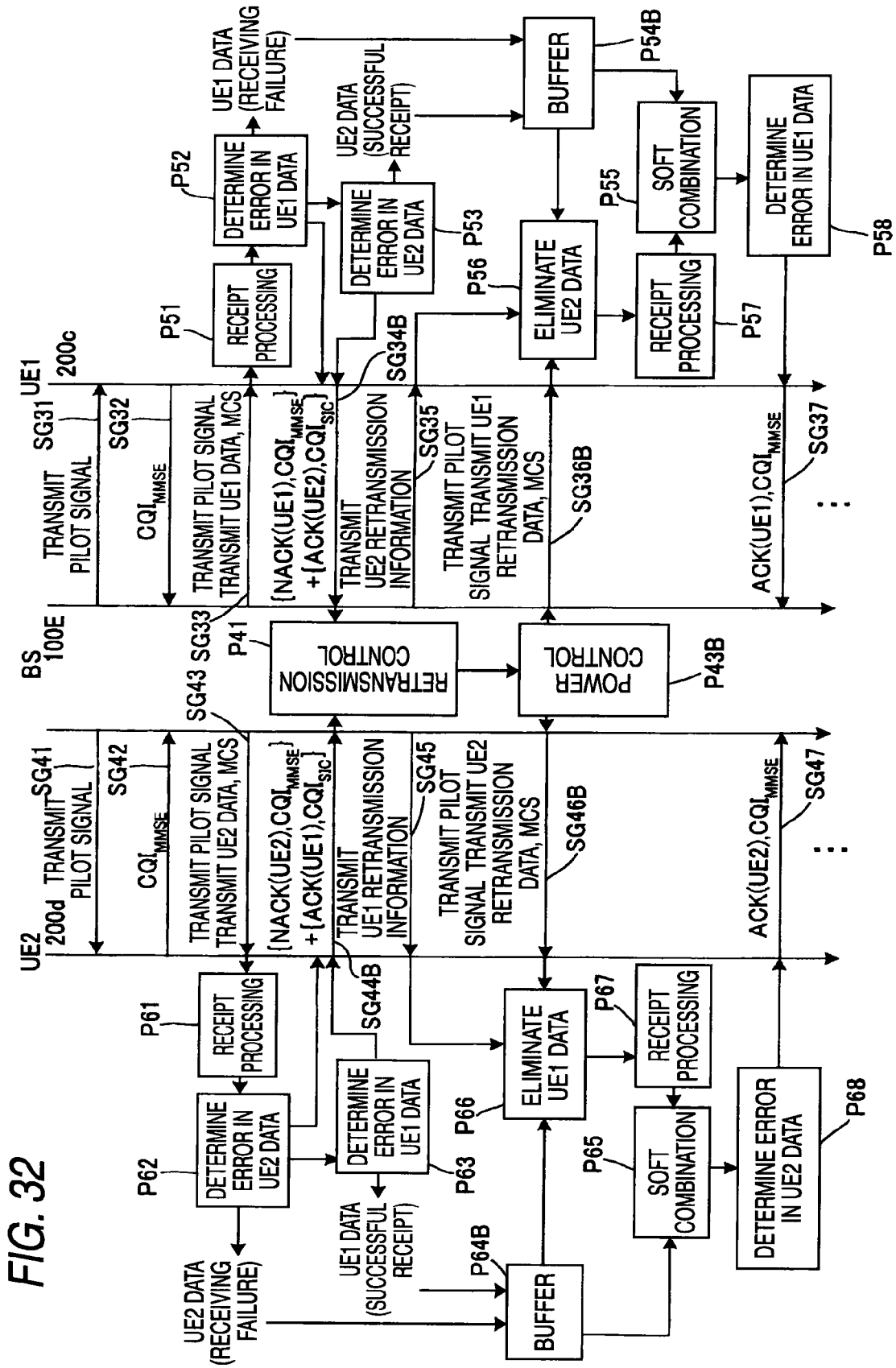
FIG. 32 is a sequence diagram showing the principal operation sequence of the multiuser radio communication system of a sixth embodiment of the present invention.

FIG. 32 is sequence diagram showing the principal operation sequence of the multiuser radio communication system of the sixth embodiment. FIG. 32 shows operation performed when both the user equipments (UE1) 200c and (UE2) 200d failed to receive their desired signals (UE1 data and UE2 data) and successfully received interference signals (UE2 data and UE1 data).

In the sixth embodiment, allocation of transmission power to the respective user equipments is changed as an example change to communication resource allocation as in the fifth embodiment. The radio base station (BS) 100E receives an ACK/NACK control signal, which is responses from the respective user equipments (UE1, UE2) 200c and 200d, and perform retransmission control processing P41 as in the third embodiment. Subsequently, processing for controlling power of transmission signals to be transmitted to the respective user equipments 200c and 200d is performed as communication resource distribution processing in accordance with the state of retransmission control (P43B).

In the embodiment shown in FIG. 32, the user equipment (UE1) 200c notifies the radio base station 100E of the NACK (UE1) signal pertaining to a desired signal and the ACK (UE2) signal pertaining to an interference signal. The user equipment (UE2) 200d notifies the radio base station 100E of the NACK (UE2) signal pertaining to a desired signal and the ACK (UE1) signal pertaining to an interference signal. In this case, the pieces of $CQI_{SIC}$ fed back from the respective user equipments are compared with each other, and a modification is made to communication resource distribution in such a way that the user equipment sent a smaller $CQI_{SIC}$ is prioritized. At this time, allocation of transmission power is changed in such a way that transmission power for the user equipment exhibiting a low priority level is relatively reduced and that transmission power for the user equipment exhibiting a high priority level is relatively increased.

The respective user equipments 200c and 200d eliminate data pertaining to an interference signal from the signal that is currently being received, through use of the received data pertaining to the interference signals of the past stored in the buffer (P56, P66), and combine the received data pertaining to the desired signals of the past stored in the buffer with currently-received retransmission data by means of soft combining (P55, P65).

Figure 33:
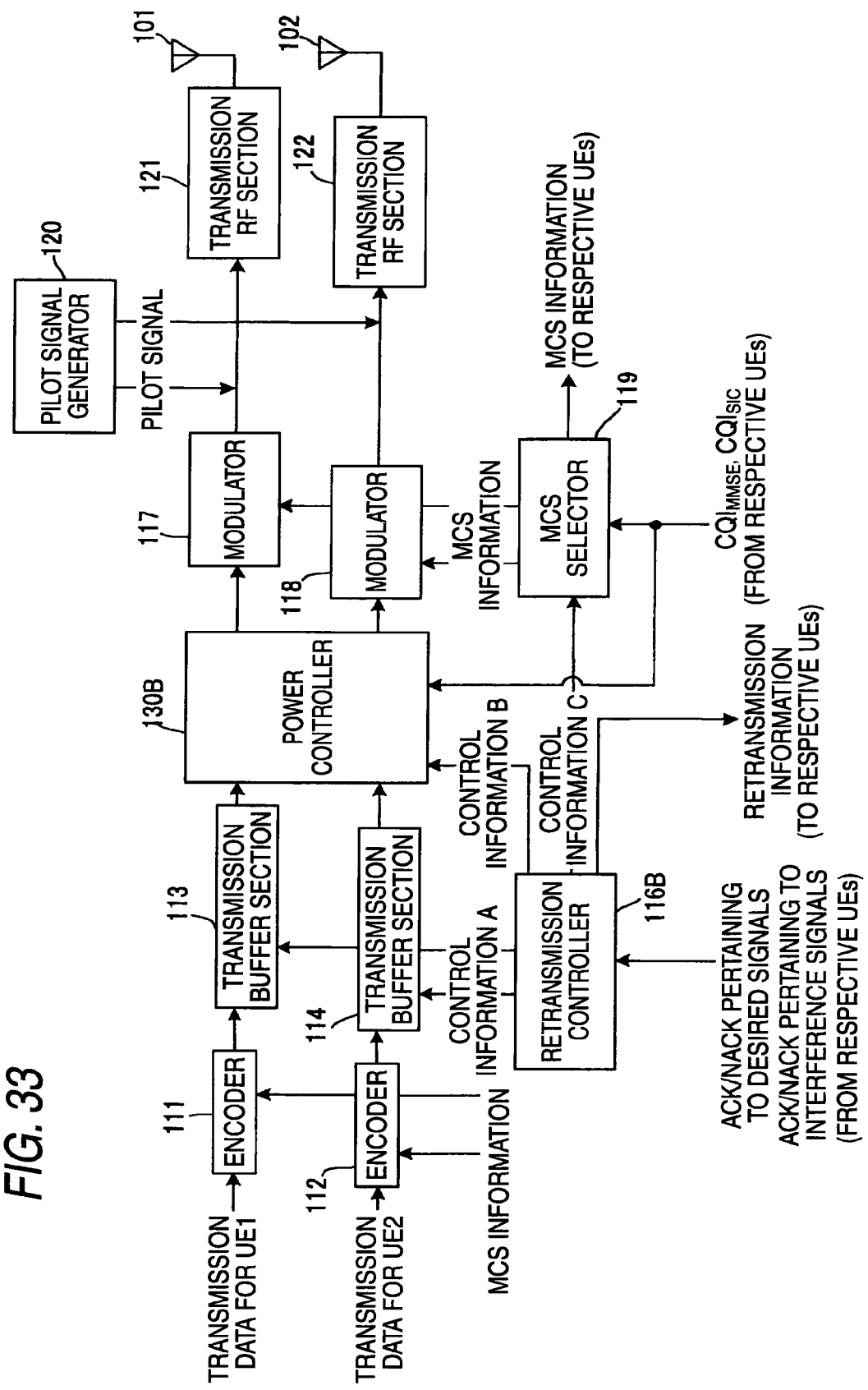
FIG. 33 is a block diagram showing an example configuration of the principal section of the radio base station in the multiuser radio communication system of the sixth embodiment.
Figure 35A:
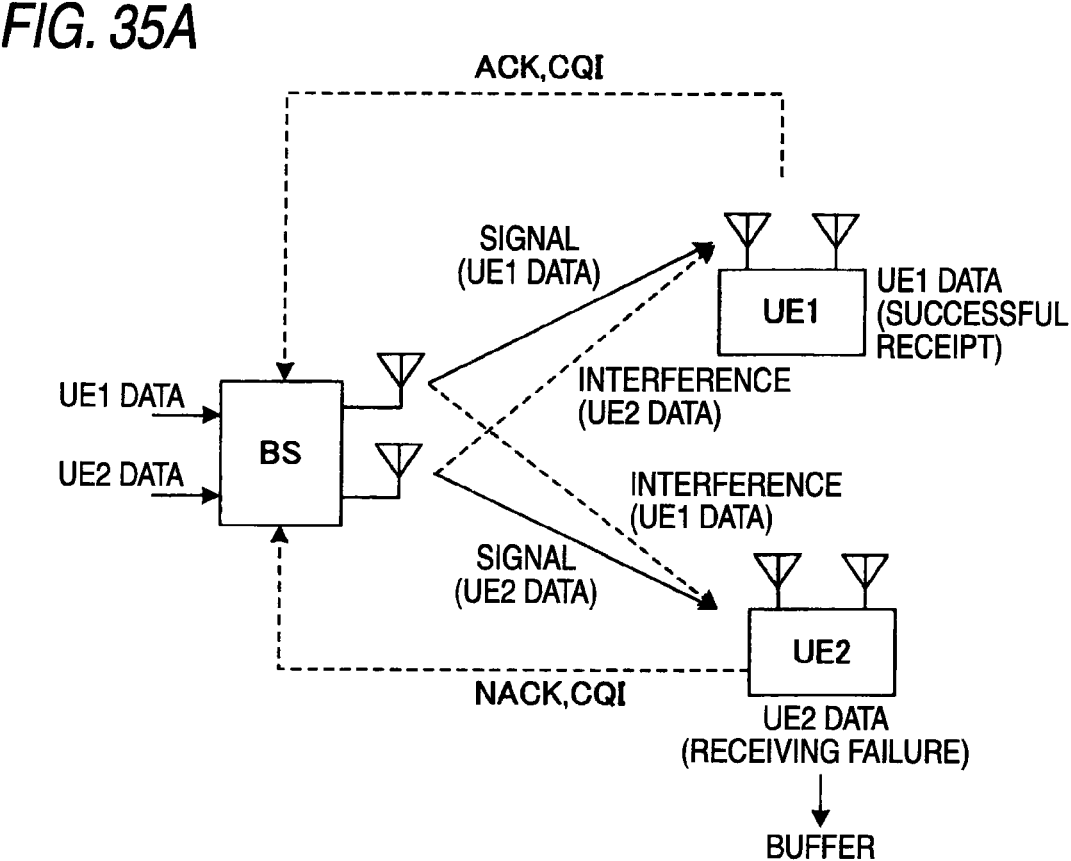
FIGS. 35A and 35B are block diagrams showing a configuration and operation of a related-art multiuser radio communication system.
Figure 35B:
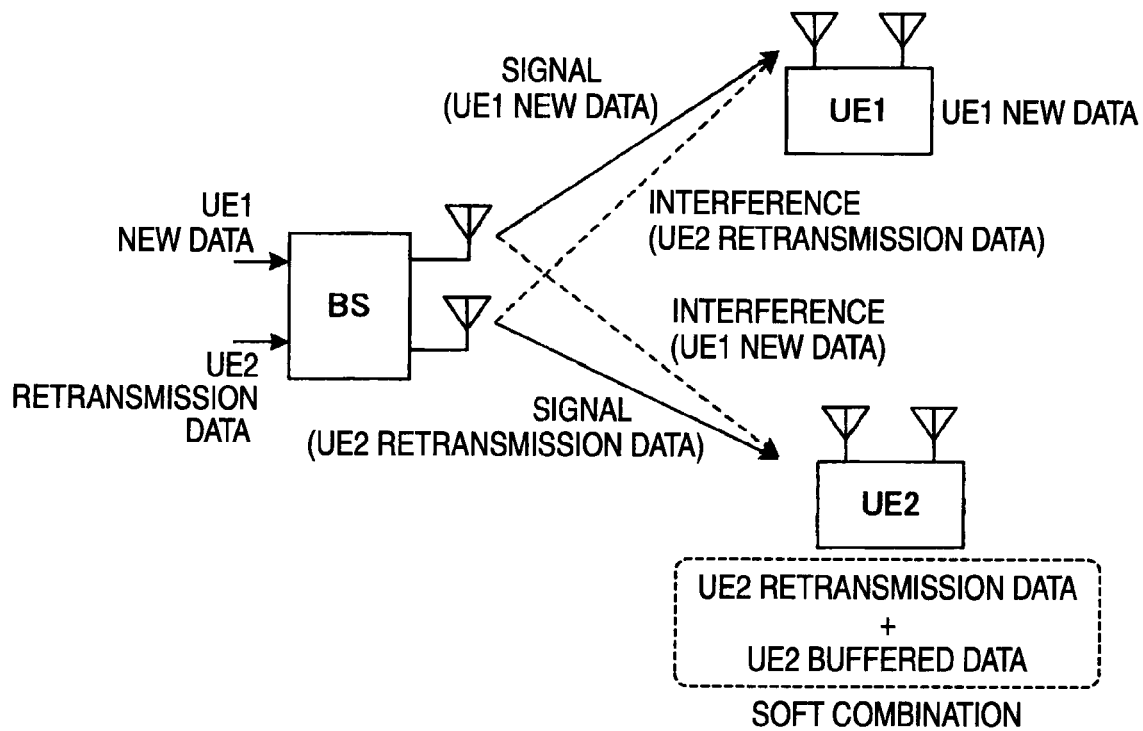

The configuration and operation of the radio base station 100E of the sixth embodiment will now be described. FIG. 33 is a block diagram showing an example configuration of the principal section of the radio base station in the multiuser radio communication system of the sixth embodiment.

The radio base station 100E of the sixth embodiment differs from its counterpart of the fifth embodiment in terms of operation of the power controller 130B. In other respects, the sixth embodiment is analogous to the fifth embodiment shown in FIG. 31. Since both the user equipment (UE1) 200c and the user equipment (UE2) 200d need retransmission of their desired signals, the power controller 130B allocates transmission power to either of the user equipments by priority. The control signal B from the retransmission controller 116B, which notifies performance of subcarrier allocation, and the pieces of $CQI_{SIC}$ from the respective user equipments 200c and 200d are input to the power controller 130B. At this time, the power controller 130B determines, in accordance with the pieces of $CQI_{SIC}$ fed back from the respective user equipments 200c and 200d, distribution of power between the user equipments in such a way that allocation of transmission power to one user equipment is prioritized, and performs transmission power control.

FIG. 34 is a view showing specific example transmission power control of the sixth embodiment. In the embodiment shown in FIG. 34, transmission power for the user equipment (UE1) 200c and the user equipment (UE2) 200d are controlled by use of an evaluation equation ρ using the $CQI_{SIC}$ shown in the following Equation (10).

[Equation 10]

$$\rho = CQI_{SIC}(UE1) - CQI_{SIC}(UE2) \qquad (10)$$

In this case, when the value of the evaluation equation ρ is less than −10; namely, when a difference between the pieces of $CQI_{SIC}$ fed back from both user equipments 200c and 200d is greater than 10 and when the $CQI_{SIC}$ fed back from the user equipment (UE2) 200d is greater, transmission power for the user equipment (UE1) 200c is increased by +5 dB, and transmission power for the user equipment (UE2) 200d is decreased by −5 dB. When the value of the evaluation equation ρ ranges from −10 to −3; namely, when the difference between the pieces of $CQI_{SIC}$ from both user equipments 200c and 200d ranges from 3 to 10 and when the $CQI_{SIC}$ from the user equipment (UE2) 200d is greater, transmission power for the user equipment (UE1) 200c is increased by +3 dB, and transmission power for the user equipment (UE2) 200d is decreased by −3 dB.

When the value of the evaluation equation ρ ranges from −3 to 3; namely, when the difference between the pieces of $CQI_{SIC}$ fed back from both user equipments 200c and 200d is less than 3, transmission power is not increased or decreased. Further, when the value of the evaluation equation ρ is ranges from 3 to 10; namely, when the difference between the pieces of $CQI_{SIC}$ fed back from both user equipments 200c and 200d ranges from 3 to 10 and when the $CQI_{SIC}$ fed back from the user equipment (UE1) 200c is greater, transmission power for the user equipment (UE1) 200c is decreased by −3 dB, and transmission power for the user equipment (UE2) 200d is increased by +3 dB. When the value of the evaluation equation ρ is greater than 10; namely, when the difference between the pieces of $CQI_{SIC}$ fed back from both user equipments 200c and 200d is greater than 10 and when the $CQI_{SIC}$ fed back from the user equipment (UE1) 200c is greater, transmission power for the user equipment (UE1) 200c is decreased by −5 dB, and transmission power for the user equipment (UE2) 200d is increased by +5 dB.

As mentioned above, in the sixth embodiment, even when both user equipments (UE1) 200c and (UE2) 200d failed to receive their desired signals, a determination is made as to the receipt of interference signals. When at least one of the user equipments successfully received an interference signal, the interference signal is demodulated and stored in a buffer. Transmission power is allocated in accordance with the pieces of $CQI_{SIC}$ fed back from the respective user equipments. When desired signals are retransmitted to the respective user equipments by means of the next transmission, information about the interference signals of the past stored in at least one of the user equipments can thereby be utilized for eliminating an interference stream; hence, the probability of successful receipt of both user equipments can be enhanced by transmission power allocation. As a consequence, throughput of the respective user equipments is enhanced, and entire system throughput can significantly be enhanced.

In the respective embodiments, the case of subcarrier allocation and the case of transmission power allocation have been described as the control of allocation of communication resources to the radio signals transmitted to the respective user equipments; however, another means can also be used. For instance, when a radio base station has three transmission antennas or more, it is also possible to control allocation of the number of antennas used for transmitting signals addressed to respective user equipments as communication resources.

Descriptions have been provided on the assumption that communication is performed by use of, as a communication signal, an OFDM signal that is a multicarrier signal. When means other than subcarrier allocation is used for controlling communication resources, the present invention can be likewise provided to another communication scheme as well as to the OFDM.

The foregoing respective embodiments illustrate, as retransmission control, the examples in which retransmission is performed when the remote station has failed to receive a signal in accordance with a response notified by the remote station (a radio receiving station). However, retransmission control is not limited to the cases. Even when various types of retransmission control are performed; for instance, when retransmission is automatically performed in a case where a timeout occurs after elapse of a predetermined period of time, the present invention is likewise applicable when operating conditions of the present invention stand.

The foregoing embodiments are based on the assumption that the radio transmission station and the radio receiving station each has two antennas. However, the present invention is likewise applicable even when the number of antennas is increased to; for instance, three or four, as required.

The radio communication apparatus and the retransmission control method of the present invention are applicable to a radio communication base station apparatus of a cellular system that provides mobile communication service; for instance, a mobile phone, or a radio communication mobile station device, and communication among the radio communication apparatuses. However, the present invention is not limited to them and applicable to various types of radio communication, so long as retransmission control is performed in the radio communication system that adopts multiuser MIMO.

According to the embodiments mentioned above, the multiuser MIMO system controls communication resource distribution during retransmission, whereby interference from signals addressed to other stations, which would arise when respective user equipments perform receiving operations, can be significantly reduced. The chance of the user equipment performed retransmission again failing to receive the signal is reduced. Therefore, the number of retransmission operations performed when a communication environment is deteriorated can be reduced, and entire system throughput can be enhanced.

The present invention is not limited to what has been described in connection with the embodiments. The present invention is also intended to be susceptible to modification and application conceived by those skilled in the art on the basis of the descriptions of the specification and well-known technology, and the modifications and applications also fall within a range for which protection is sought.

Although the respective embodiments have been described by reference to the case where the present invention is embodied by hardware. However, the present invention can also be embodied by soft.

The respective functional blocks used for describing the embodiments are typically implemented in the form of an LSI that is an integrated circuit. However, the blocks can also be individually implemented as a single chip, or the blocks may also be implemented as a single chip so as to include some or the entirety of the blocks. Although the word "LSI" is herein used, the integrated circuit may be referred to also as an IC, a system LSI, a super LSI, or an ultra LSI according to the degree of integration.

The technique for implementing an integrated circuit is not limited to the LSI. The functional blocks can also be implemented as a custom-designed circuit or a general-purpose processor. An FPGA (Field Programmable Gate Array) that enables programming after manufacture of an LSI or a reconfigurable processor that enables reconfiguration of connections or settings of circuit cells in an LSI can also be utilized.

Further, if technology for realizing an integrated circuit replaceable with an LSI comes along as a result of a progress in semiconductor technology or by means of another technique derived from the semiconductor technology, the functional blocks can naturally be integrated by use of the technology. Application of the biotechnology to integration of the functional blocks is potentially possible.

Although the present invention has been described in detail and by reference to the specific embodiments, it is manifest to the persons skilled in the art that the invention is susceptible to various alterations or modifications without departing from the spirit and scope of the present invention.

The present patent application is based on Japanese Patent Application No. 2007-017992 filed on Jan. 29, 2007 and Japanese Patent Application No. 2007-103953 filed on Apr. 11, 2007, the contents of which are incorporated herein by reference.

INDUSTRIAL APPLICABILITY

The present invention yields an advantage of enabling a multiuser MIMO system to significantly enhance entire system throughput at the time of retransmission and is useful for a radio communication system, a radio communication apparatus, a retransmission control method, and the like, which are applicable to a radio communication system adopting MIMO.

The invention claimed is:

1. A radio transmission apparatus, comprising:
a resource allocator wherein, in a case where data is previously transmitted by the radio transmission apparatus to a second radio reception apparatus, and then subsequently retransmission of the data is performed by the radio transmission apparatus to the second radio reception apparatus based on a receiving failure by the second radio reception apparatus of the previously transmitted data, the resource allocator allocates communication resources in accordance with whether or not a first radio reception apparatus has successfully demodulated a signal, comprising the previously transmitted data, transmitted by the radio transmission apparatus and addressed to the second radio reception apparatus; and
a transmitter which performs the retransmission to the second radio reception apparatus by use of the allocated communication resources, the retransmission providing a desired signal to the second radio reception apparatus.

2. The radio transmission apparatus according to claim 1, wherein the resource allocator that, when the first radio reception apparatus has successfully demodulated the signal addressed to the second radio reception apparatus, allocates the communication resources in such a way that the communication resource for the second radio reception apparatus becomes larger than the communication resource for the first radio reception apparatus.

3. The radio transmission apparatus according to claim 2, wherein the resource allocator reduces the communication resource to the first radio reception apparatus when the first radio reception apparatus has successfully demodulated the signal addressed to the second radio reception apparatus.

4. The radio transmission apparatus according to claim 1, wherein the radio transmission apparatus receives, from the first radio reception apparatus, quality information concerning signal quality achieved after elimination of a previous interference signal addressed to the second radio reception apparatus, and
wherein the resource allocator reduces in number a quantity of subcarriers allocated to the first radio reception apparatus based on said quality information, such that a communication resource for the second radio reception apparatus becomes larger than a communication resource for the first radio reception apparatus.

5. The radio transmission apparatus according to claim 1, wherein when a plurality of radio reception apparatuses which have failed to demodulate desired signals have successfully demodulated an interference signal addressed to other radio reception apparatus, the resource allocator compares receiving qualities for the radio reception apparatuses and allocates the communication resource to the second radio reception apparatus exhibiting poor receiving quality in preference to the first radio reception apparatus exhibiting superior receiving quality.

6. The radio transmission apparatus according to claim 3, comprising:
a retransmission information notification section that, when information showing unsuccessful receipt of a desired signal to the own station is received from the second radio reception apparatus, notifies respective radio reception apparatuses of retransmission information about performance of retransmission.

7. The radio transmission apparatus according to claim 1, wherein, the resource allocator changes allocation of subcarriers.

8. The radio transmission apparatus according to claim 1, wherein, the resource allocator changes allocation of transmission power.

9. The radio transmission apparatus according to claim 1, wherein the resource allocator allocates the communication resources in accordance with a receiving quality information of the signal addressed to the second radio reception apparatus in the first radio reception apparatus.

10. A radio reception apparatus, comprising:
a demodulator that demodulates a signal transmitted from a radio transmission apparatus and addressed to another station;
an error determiner that determines whether the signal addressed to the other station has been demodulated successfully, and generates information indicating a determination result;
a quality calculator that calculates quality information concerning receiving signal quality that is achieved after the radio reception apparatus eliminates the signal addressed to the other station as an interference signal; and
a notification section that notifies the radio transmission apparatus of both of the information indicating the determination result and the quality information.

11. The radio reception apparatus according to claim 10, comprising:
an other-addressed signal buffer section that holds demodulated data pertaining to the signal addressed to the other station when the signal addressed to the other station has been demodulated successfully; and
an interference eliminator that performs an interference elimination by use of the held and demodulated data when a next signal transmitted from the radio transmission apparatus is received.

12. The radio reception apparatus according to claim 11, comprising:
a retransmission information receiver that receives retransmission information transmitted by the radio transmission apparatus to the other station,
wherein the interference eliminator performs an interference elimination by use of demodulated data held in the other-addressed signal buffer section when transmission to the other station is retransmission.

13. The radio reception apparatus according to claim 11, comprising:
an own-addressed signal buffer section that, when an error is in a result of receipt of a signal addressed to the own station and transmitted from the radio transmission apparatus, holds data pertaining to the signal addressed to the own station; and
a combiner that receives a signal retransmitted from the radio transmission apparatus, and combines the held data pertaining to the signal addressed to the own station with data pertaining to the retransmitted signal.

14. The radio reception apparatus according to claim 11, comprising:
an other-addressed signal information response section that, when the signal addressed to the other station has been demodulated successfully, feeds back to the radio transmission apparatus information showing successful receipt of the signal addressed to the other station.

15. The radio reception apparatus according to claim 14, comprising:
a receiving status determiner that determines a receiving status of the signal addressed to the own station,
wherein the other-addressed signal buffer section and the other-addressed signal information response section performs operations, respectively, only when the receiving status is a predetermined threshold value or more.

16. The radio reception apparatus according to claim 14, comprising:
a retransmission information receiver that receives retransmission information transmitted from the radio transmission apparatus to another radio reception apparatus,
wherein the other-addressed signal buffer section and the other-addressed signal information response section performs operations, respectively, only when received information whose retransmission is required by the other radio reception apparatus.

17. A radio communication base station equipped with the radio transmission apparatus according to claim 1.

18. A radio communication mobile station equipped with the radio transmission apparatus according to claim 1.

19. A retransmission control method, comprising:
allocating, in a case where data is previously transmitted by a radio transmission apparatus to a second radio reception apparatus, and then subsequently retransmission of the data is performed by the radio transmission apparatus to the second radio reception apparatus based on a receiving failure by the second radio reception apparatus of the previously transmitted data, communication resources in accordance with whether or not a first radio reception apparatus has successfully demodulated a signal, comprising the previously transmitted data, transmitted by the radio transmission apparatus and addressed to the second radio reception apparatus; and
performing retransmission to the second radio reception apparatus by use of the allocated communication resources, the retransmission providing a desired signal to the second radio reception apparatus.

20. The retransmission control method of claim 19, wherein the step of allocating includes reducing in number a quantity of subcarriers allocated to the first radio reception apparatus based on quality information concerning signal quality achieved at the first radio reception apparatus upon its elimination of the signal addressed to the second radio reception apparatus as an interference signal, such that a communication resource for the second radio reception apparatus becomes larger than a communication resource for the first radio reception apparatus.

* * * * *